(12) United States Patent
Jardine

(10) Patent No.: US 12,358,507 B2
(45) Date of Patent: Jul. 15, 2025

(54) VEHICLE CONTROL SYSTEM AND METHOD

(71) Applicant: JAGUAR LAND ROVER LIMITED, Coventry (GB)

(72) Inventor: Fraser Jardine, Rugby (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 427 days.

(21) Appl. No.: 17/294,376

(22) PCT Filed: Nov. 14, 2019

(86) PCT No.: PCT/EP2019/081313
§ 371 (c)(1),
(2) Date: May 14, 2021

(87) PCT Pub. No.: WO2020/099555
PCT Pub. Date: May 22, 2020

(65) Prior Publication Data
US 2022/0135039 A1    May 5, 2022

(30) Foreign Application Priority Data
Nov. 14, 2018   (GB) ..................... 1818525

(51) Int. Cl.
*B60W 30/18*    (2012.01)
*B60W 10/04*    (2006.01)
(Continued)

(52) U.S. Cl.
CPC ...... *B60W 30/18163* (2013.01); *B60W 10/04* (2013.01); *B60W 10/20* (2013.01);
(Continued)

(58) Field of Classification Search
CPC ..... B60W 30/18159; B60W 30/18163; B60W 50/14; B60W 50/0097; B60W 30/18145;
(Continued)

(56) References Cited

U.S. PATENT DOCUMENTS 5,369,591 A * 11/1994 Broxmeyer .............. G08G 1/22
340/436
6,115,652 A    9/2000 Sato
(Continued)

FOREIGN PATENT DOCUMENTS

CN    103204163 A    7/2013
CN    106604853 A    4/2017
(Continued)

OTHER PUBLICATIONS

Chinese Office Action corresponding to Chinese application 201980088253.X, dated Apr. 22, 2023, 14 pages.
(Continued)

*Primary Examiner* — Yuri Kan
(74) *Attorney, Agent, or Firm* — Troutman Pepper Locke LLP; Dustin B. Weeks; Nicholas H. Doss

(57) ABSTRACT

There is disclosed a control system and a method for a host vehicle operable in an autonomous mode. The control system comprises one or more controllers. The speed and/or path of the vehicle in the autonomous mode is appropriate to a driving context.

20 Claims, 12 Drawing Sheets

(51) Int. Cl.
*B60W 10/20* (2006.01)
*B60W 60/00* (2020.01)

(52) U.S. Cl.
CPC ....... *B60W 60/001* (2020.02); *B60W 2552/10* (2020.02); *B60W 2552/53* (2020.02); *B60W 2710/20* (2013.01); *B60W 2720/10* (2013.01); *B60W 2720/12* (2013.01); *B60W 2720/24* (2013.01)

(58) Field of Classification Search
CPC .... G08G 1/22; G01C 21/3658; B62D 15/025; G06V 20/58
See application file for complete search history.

(56) References Cited

U.S. PATENT DOCUMENTS

| | | | | |
|---|---|---|---|---|
| 2008/0091318 | A1* | 4/2008 | Deng | B62D 15/025 |
| | | | | 701/41 |
| 2015/0367778 | A1 | 12/2015 | Vladimerou | |
| 2016/0272203 | A1* | 9/2016 | Otake | B60W 50/14 |
| 2017/0197626 | A1 | 7/2017 | Jammoussi et al. | |
| 2017/0274898 | A1* | 9/2017 | Nakamura | B60W 30/18163 |
| 2017/0341647 | A1 | 11/2017 | Rajvanshi et al. | |
| 2017/0341653 | A1* | 11/2017 | Kubota | G01C 21/3658 |
| 2019/0080610 | A1 | 3/2019 | Kokaki | |
| 2019/0106107 | A1 | 4/2019 | Miura | |

FOREIGN PATENT DOCUMENTS

| | | |
|---|---|---|
| CN | 107415945 A | 12/2017 |
| DE | 102018107502 A1 | 10/2018 |
| EP | 3187389 A1 | 7/2017 |
| GB | 2562612 A | 11/2018 |

OTHER PUBLICATIONS

International Search Report corresponding to International Application No. PCT/EP2019/081313, dated Apr. 8, 2020, 6 pages.
Written Opinion corresponding to International Application No. PCT/EP2019/081313, dated Apr. 8, 2020, 5 pages.
Combined Search and Examination Report corresponding to Great Britain Application No. GB1818525.6, dated May 13, 2019, 7 pages.

* cited by examiner

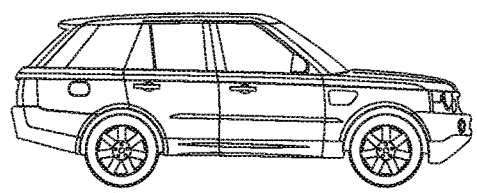
Fig. 1
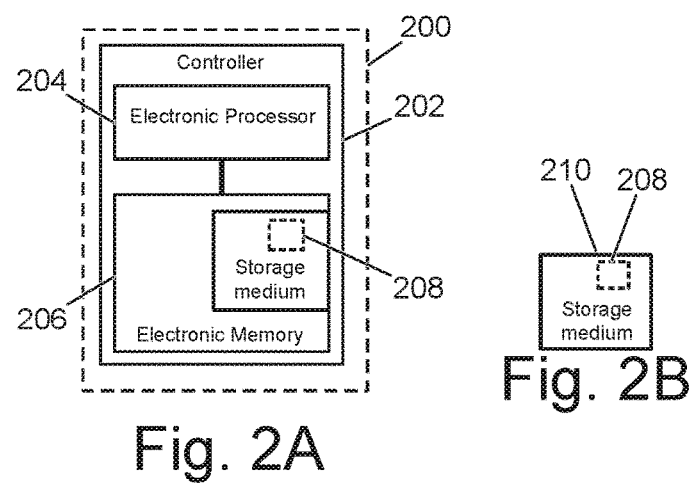
Fig. 2A
Fig. 2B
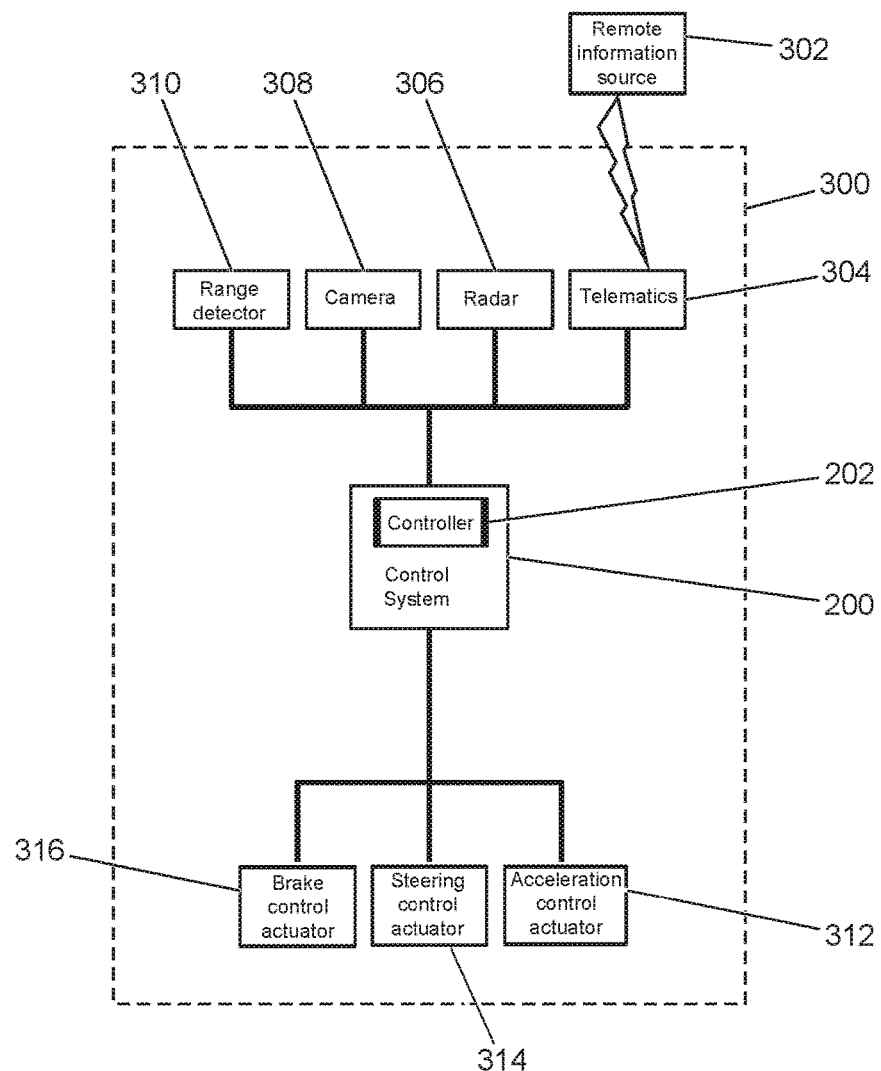
Fig. 2C

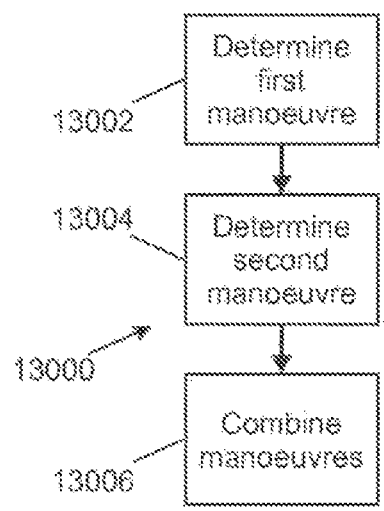
Fig. 26
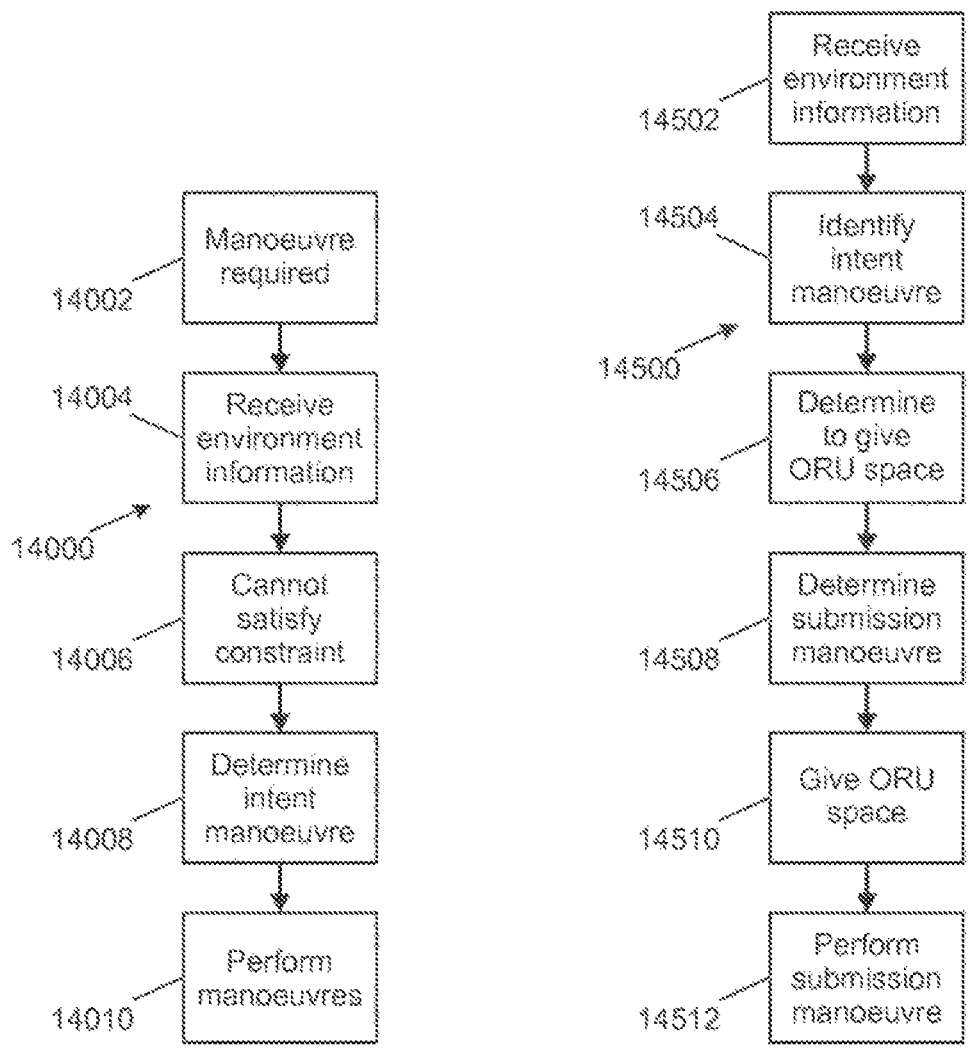
Fig. 27
Fig. 28

VEHICLE CONTROL SYSTEM AND METHOD

TECHNICAL FIELD

The present disclosure relates to a vehicle control system and method. In particular, but not exclusively it relates to a vehicle control system and method for a vehicle operable in an autonomous mode.

Aspects of the invention relate to a control system, a method, a vehicle, computer software, and a non-transitory computer-readable storage medium.

BACKGROUND

It is known for a vehicle to host a system that enables the host vehicle to operate in accordance with a predefined autonomous mode. The host vehicle may be instructed to operate in accordance with the predefined autonomous mode by a user (occupant) of the host vehicle i.e. via an input device at which a user input is received to control operation of the predefined autonomous mode.

The occupant may desire for the speed and path of the host vehicle in the autonomous mode to be appropriate to a driving context. The driving context may relate to factors such as the environment outside the host vehicle. The environment includes infrastructure and other road users (ORUs). The driving context may relate to the specific preferences of the occupant. The driving context may relate to the condition of the host vehicle.

It is an aim of the present invention to address disadvantages of the prior art.

SUMMARY OF THE INVENTION

Aspects and embodiments of the invention provide a control system, a method, a vehicle, computer software, and a non-transitory computer-readable storage medium.

In what follows, several aspects are described. Each sentence that starts "According to an aspect . . . " or "According to another aspect . . . " is an independent statement in the manner of an independent claim. The independent statement ends at a full stop. Each independent statement is self-contained such that it can be converted to an independent claim without incorporating any subject matter from elsewhere in the application. Subsequent sentences containing the term 'may' and before the next aspect are dependent statements in the manner of dependent claims. Each dependent statement ends at a full stop. Like a dependent claim, said dependent statements are optional, hence the term 'may'. Each dependent statement is intended to depend on the immediately preceding independent statement, and any other dependent statements therebetween except where dependency on a specific statement(s) is needed for antecedent basis. Dependent statements can be converted to dependent claims. Statements of advantage are provided throughout which are intended to discuss but not necessarily limit any of the statements they address. This application provides basis to remove the claim set as originally filed and construct a new claim set starting from any other independent statement or other subject matter defined herein, without needing to include any of the features from the claims as filed. In other words, the scope of the claims as filed is not intended to have any limiting effect on what might later be claimed.

According to an aspect of the invention there is provided a control system for a host vehicle operable in an autonomous mode, the control system comprising one or more controllers, the control system configured to: determine a bifurcation of a first lane into a plurality of lanes; and cause control of the speed and/or direction of the host vehicle as the host vehicle approaches the bifurcation, in dependence on the determined bifurcation. This advantageously enables the host vehicle to approach bifurcations in a manner that is predictable to its occupant and to other road users. Without such functionality, the host vehicle may attempt to remain centred as the first lane widens, which may cause vehicle to exit the autonomous mode if the lane width exceeds a threshold width, or the host vehicle may continue and snap into one of the plurality of lanes which may be confusing to the occupant and other road users.

The one or more controllers may collectively comprise: at least one electronic processor having an electrical input for receiving the information; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the causing the control.

The control system may be configured to determine a lateral distance from a lane position within the first lane to a lane position within at least one of the plurality of lanes. The lateral distance may be from a first target lane position between lateral edges of the first lane to a second target lane position between lateral edges of the at least one of the plurality of lanes. The control system may be configured to determine a longitudinal distance to a start of at least one of the plurality of lanes. The start of the at least one of the plurality of lanes may be associated with a start location of a road marking denoting a lateral edge of at least one of the plurality of lanes. The control may be dependent on the longitudinal distance and the lateral distance. This advantageously enables a smoother manoeuvre through the bifurcation.

The control may cause the host vehicle to follow a curve-shaped planned path, wherein a first end of the curve is colinear with a lane position within the first lane and a second end of the curve is colinear with a lane position within one of the plurality of lanes. The curve may be clothoidal or sigmoidal. This advantageously enables a smoother manoeuvre through the bifurcation.

A determination of a path associated with the control of the speed and/or direction may be constrained by at least one constraint associated with a derivative of lateral displacement of the host vehicle with respect to longitudinal displacement of the host vehicle or time. The constraint may be associated with the second derivative. Which one of the plurality of lanes the host vehicle enters and/or a speed of the host vehicle through the bifurcation may be dependent on the constraint. This advantageously enables a smoother manoeuvre through the bifurcation.

The control system may be configured to select a target one of the plurality of lanes and plan a path to enter the target lane, wherein the target lane is selected in dependence on at least one of: a requirement to select a nearside available lane (reduces inconvenience to other road users wishing to overtake on the offside lane); a constraint associated with a derivative of lateral displacement of the host vehicle with respect to longitudinal displacement of the host vehicle or time (enables a smooth manoeuvre through the bifurcation); or a navigation constraint (so that a subsequent manoeuvre is not required).

The control of the direction may comprise causing a steering subsystem of the host vehicle to control steering of the host vehicle to follow a planned path of the host vehicle determined in dependence on the processing.

The determining the bifurcation may utilise map data. This advantageously enables the manoeuvre to be planned in advance.

According to another aspect of the invention there is provided a method for controlling a host vehicle operable in an autonomous mode, the method comprising: determining a bifurcation of a first lane into a plurality of lanes; and causing control of the speed and/or direction of the host vehicle as the host vehicle approaches the bifurcation, in dependence on the processing.

According to an aspect of the invention there is provided a control system for a host vehicle operable in an autonomous mode, the control system comprising one or more controllers, the control system configured to: determine a traffic condition, beyond a first sensing range of the host vehicle; associate the traffic condition with a first lane of a multi-lane highway comprising a plurality of lanes in a first direction including the first lane; and cause control of a direction of the host vehicle before the host vehicle reaches the location of the traffic condition to change lane from one of the plurality of lanes to another of the plurality of lanes of the multi-lane highway, in dependence on the traffic condition being associated with the first lane. This advantageously reduces the chance of the host vehicle being disrupted or boxed in by other traffic moving out of the first lane.

The one or more controllers may collectively comprise: at least one electronic processor having an electrical input for receiving the information; and at least one electronic memory device electrically coupled to the at least one electronic processor and having instructions stored therein; and wherein the at least one electronic processor is configured to access the at least one memory device and execute the instructions thereon so as to cause the host vehicle to perform the determining, the associating and the causing the control.

The lane change may be performed at a greater time and/or distance from the traffic condition than a lane change associated with a vehicle overtaking function of the host vehicle. This advantageously reduces the chance of the host vehicle being boxed in by other traffic. The lane change may be farther before the host vehicle reaches the traffic condition for changing from an offside lane to a nearside lane, compared to changing from a nearside lane to an offside lane. This advantageously reduces the chance of the host vehicle being boxed in by other traffic while remaining compliant with highway law.

The control may be performed in dependence on confirmation of the traffic condition using information from one or more sensors of the host vehicle having the first sensing range, and/or from communication with another road user proximal to the traffic condition. This verification advantageously reduces the impact of a false positive determination. The traffic condition may comprise a slower-moving or stationary traffic queue in the first lane. The method advantageously reduces the chance of being stuck in traffic.

The traffic condition may be associated with a junction and wherein the control system may be configured to determine in dependence on navigation information whether the host vehicle is to exit the multi-lane highway at the junction, wherein if the host vehicle is to exit the multi-lane highway at the junction and the one lane is a second lane different from the first lane, the another lane is the first lane. This advantageously reduces the chance of traffic blocking access to a junction.

The traffic condition may comprise a closure of at least one of the plurality of lanes, wherein the associating comprises determining that the closure is of at least the first lane, and wherein if the one lane is the first lane, the another lane is a second lane different from the first lane. This advantageously reduces the chance of unnecessarily waiting in traffic for the first lane to clear until the closure is visible and it is apparent that a lane change is needed.

The determining and/or the associating may utilise dynamic information received from a remote information source. The determining and/or the associating may utilise at least one of: map data comprising information on junctions; road sign information comprising information on junctions; dynamic map data comprising information on lane closures; or dynamic traffic data comprising information on traffic conditions. This advantageously enables traffic conditions to be anticipated before other road users are aware of them.

The control system may be configured to select the another lane from the plurality of lanes, in dependence on one or more of: a determination that traffic speed in the another lane is faster than traffic speed in a different one or more of the plurality of lanes; or a navigation constraint. This advantageously enables travel using the fastest available lane. The control of the direction may comprise causing a steering subsystem of the host vehicle to control steering of the host vehicle to follow a planned path of the host vehicle determined in dependence on the determining.

According to another aspect of the invention there is provided a method for controlling a host vehicle operable in an autonomous mode, the method comprising: determining a traffic condition, beyond a first sensing range of the host vehicle; associating the traffic condition with a first lane of a multi-lane highway comprising a plurality of lanes in a first direction including the first lane; and causing control of a direction of the host vehicle before the host vehicle reaches the location of the traffic condition to change lane from one of the plurality of lanes to another of the plurality of lanes of the multi-lane highway, in dependence on the traffic condition being associated with the first lane.

According to an aspect of the invention there is provided a control system for a host vehicle operable in an autonomous mode and a non-autonomous mode, the control system comprising one or more controllers, the control system configured to: cause the host vehicle to enter the autonomous mode in response to a user activation signal during driving of the host vehicle; and in dependence on the user activation signal, cause a request for user navigation input from an occupant of the host vehicle. This advantageously provides an easier to use autonomous mode. Fewer user inputs are required to activate the autonomous mode because a navigation constraint is not required in advance. Further, the occupant is reminded to input a navigation constraint. The occupant is reminded quickly, in dependence on the user activation signal, to reduce the chance of a junction being missed.

The one or more controllers may collectively comprise: at least one electronic processor having an electrical input for receiving the user activation signal; and at least one electronic memory device electrically coupled to the at least one electronic processor and having instructions stored therein; and wherein the at least one electronic processor is configured to access the at least one memory device and execute the instructions thereon so as to cause the host vehicle to perform the causing the host vehicle to enter the autonomous mode and the causing the request for user navigation input. Causing the request for user navigation input may be performed once the host vehicle has entered the autonomous mode. This advantageously provides a safer vehicle because the occupant can take their eyes off the road to make the navigation input.

Until the requested user navigation input is received, the autonomous mode may be configured to control the host vehicle to remain on a road on which the host vehicle is currently driving. This advantageously provides a more flexible autonomous mode because the autonomous mode can control the host vehicle without a navigation constraint.

The requested user navigation input may comprise a location and/or a route. The location may comprise at least one of: a destination; a waypoint; or a location associated with transitioning from the autonomous mode to the non-autonomous mode. The location associated with transitioning from the autonomous mode to the non-autonomous mode may be a junction. This advantageously provides an occupant with at least the ability to relax during a highway journey until a required junction is approached. The request for user navigation input may comprise suggesting one or more locations and/or routes. The suggested one or more locations may comprise a location at which the host vehicle has previously been. The suggested one or more locations may comprise a location toward which the host vehicle is travelling.

At least one of the one or more suggestions may be dependent on processing information indicative of a pattern of use of the host vehicle. The suggested one or more locations may comprise a location visited at a recurring time and/or day and/or date. Advantageously, this enables a reduced number of user navigation inputs, at least when the control system correctly predicts the user navigation input. The control system may be configured to cause downloading of dynamic map data and/or dynamic traffic data from a remote information source in dependence on the processing. A scheduling of the downloading may be dependent on the processing. Advantageously, the processing of the information indicative of the pattern of use of the host vehicle enables a more reliable download of dynamic data.

There may be provided a system, comprising: the control system, including at least a first controller, wherein the at least a first controller is arranged to output a signal for causing the request for user navigation input; and notification means configured to receive the signal and to output a user notification in dependence on the signal, the user notification requesting user navigation input. The notification means may comprise a human-machine interface configured to present the user notification. The system may comprise an input apparatus configured to receive the requested user navigation input and to output the user navigation input to the control system in dependence thereon.

According to another aspect of the invention there is provided a method for controlling a host vehicle operable in an autonomous mode and a non-autonomous mode, the method comprising: causing the host vehicle to enter the autonomous mode in response to a user activation signal during driving of the host vehicle; and in dependence on the user activation signal, causing a request for user navigation input from an occupant of the host vehicle.

According to an aspect of the invention there is provided a control system for a host vehicle operable in an autonomous mode, the control system comprising one or more controllers, the control system configured to: process information indicative of a pattern of use of the host vehicle; and cause downloading of dynamic map data and/or dynamic traffic data from a remote information source in dependence on the processing. This advantageously improves the likelihood of success or reduces the likelihood of failure of the download. For example, the downloads could be scheduled to avoid locations and/or times of inhibited connectivity. Fewer wasted download attempts results in less energy usage and less data usage. Further, more up-to-date dynamic data may result in a more reliable autonomous mode.

The one or more controllers may collectively comprise: at least one electronic processor having an electrical input for receiving the information; and at least one electronic memory device electrically coupled to the at least one electronic processor and having instructions stored therein; and wherein the at least one electronic processor is configured to access the at least one memory device and execute the instructions thereon so as to cause the host vehicle to perform the processing and the causing downloading. The dynamic map data and/or dynamic traffic data download may be scheduled in dependence on the processing. The download schedule may be a time and/or a location of the host vehicle, at which the download is to commence or not commence.

The control system may be configured to determine a time and/or a location, at which a condition associated with downloading dynamic map data and/or dynamic traffic data is satisfied or not satisfied. The satisfaction or non-satisfaction of the condition at a particular time or location may be determined in dependence on information indicative of at least one of: availability of network coverage at the particular time or location; an indication of one or more past successful downloads at the particular time or location; or a characteristic indicative of a time taken to perform the download, at the particular time or location.

The dynamic map data and/or dynamic traffic data download may be scheduled to commence before a time or before the host vehicle reaches a location, associated with non-satisfaction of the condition, or wherein the downloading may be scheduled to commence at a time or at a location of the host vehicle associated with satisfaction of the condition. The dynamic map data and/or dynamic traffic data download may be at least partially over a cellular network while the host vehicle is being driven.

At least one path planning algorithm of the host vehicle may be configured to use the dynamic map data and/or dynamic traffic data when planning a path of the host vehicle during autonomous driving in the autonomous mode. The information may comprise an indication of a location at which the host vehicle has previously been and/or may be indicative of a temporal pattern of use of the host vehicle.

The dynamic map data and/or dynamic traffic data download may be scheduled to commence in dependence on an expected route and/or destination and/or timing of use of the host vehicle as determined by the processing of the information, without a navigation system of the host vehicle having received a user navigation input comprising a location and/or a route. The dynamic map data and/or dynamic traffic data dynamically may update periodically, wherein the period may be from the range of a plurality of minutes to one or more months. The dynamic map data may comprise information on at least one of: roadworks; lane closures; speed limit changes; weather conditions; road surface conditions, and/or the dynamic traffic data may comprise information on at least one of: traffic conditions; an emergency vehicle location.

According to another aspect of the invention there is provided a method for controlling a host vehicle operable in an an autonomous mode, the method comprising: processing information indicative of a pattern of use of the host vehicle; and causing downloading of dynamic map data and/or dynamic traffic data from a remote information source in dependence on the processing. According to another aspect of the invention there is provided a control system for a host vehicle operable in an autonomous mode, the control system comprising one or more controllers, the control system configured to: determine a requirement for the host vehicle within a first lane to manoeuvre into a second lane to overtake a road user; cause an increase of separation of the host vehicle from the road user in dependence on the determination; subsequently cause acceleration of the host vehicle towards the road user, such that the host vehicle achieves a higher speed than the road user; and cause a manoeuvre of the host vehicle into the second lane to perform the overtake. This advantageously reduces an obstruction of the host vehicle to other road users, because the host vehicle matches or approaches a potentially higher traffic speed in the second lane before moving into the second lane.

The one or more controllers may collectively comprise: at least one electronic processor having an electrical input for receiving information associated with the road user; and at least one electronic memory device electrically coupled to the at least one electronic processor and having instructions stored therein; and wherein the at least one electronic processor is configured to access the at least one memory device and execute the instructions thereon so as to cause the host vehicle to perform the determining a requirement, the causing an increase of separation, the subsequently causing acceleration, and the causing a manoeuvre.

The control system may be configured to check whether one or more abort conditions is satisfied, wherein if the one or more abort conditions is not satisfied, the host vehicle completes the manoeuvre into the second lane, and wherein if the one or more abort conditions is satisfied, the host vehicle remains in the first lane and reduces a rate of closure to the road user.

Satisfaction of at least one of the abort conditions may be determined by checking for another road user within the second lane. This advantageously reduces an obstruction of the host vehicle to other road users such as a fast-approaching road user in the second lane. Satisfaction of at least one of the abort conditions may be determined by checking a third lane for another road user converging with or alongside the host vehicle, wherein the third lane is on an opposite side of the first lane to the second lane. This advantageously reduces an obstruction of the host vehicle to other road users, because the host vehicle can subsequently abort the overtake without losing its current slot in the first lane to the other road user from the third lane.

The control system may be configured to check at least one of the abort conditions before the host vehicle manoeuvres into the second lane. The control system may be configured to check at least one of the abort conditions at least after the host vehicle has commenced accelerating towards the road user. This advantageously ensures that fast-approaching vehicles that were outside the first sensing range can be detected. The increased separation and/or acceleration may be dependent on one or more of: at least one speed-dependent variable associated with the host vehicle and/or the road user; at least one variable associated with another road user behind the host vehicle; a variable associated with infrastructure. The awareness of other road users or infrastructure advantageously reduces an obstruction of the host vehicle to other road users in front of/behind the host vehicle, because the host vehicle may change its speed smoothly and predictably and leave stopping distance for other road users.

According to another aspect of the invention there is provided a method for controlling a host vehicle operable in an autonomous mode, the method comprising: determining a requirement for the host vehicle within a first lane to manoeuvre into a second lane to overtake a road user; causing an increase of separation of the host vehicle from the road user in dependence on the determination; subsequently causing acceleration of the host vehicle towards the road user, such that the host vehicle achieves a higher speed than the road user; and causing a manoeuvre of the host vehicle into the second lane to perform the overtake.

According to an aspect of the invention there is provided a control system for a host vehicle operable in an autonomous mode, the control system comprising one or more controllers, the control system configured to: determine a requirement for the host vehicle within a first lane to manoeuvre into a second lane to perform an overtake; check whether an abort condition is satisfied, wherein satisfaction of the abort condition is determined by checking a third lane for another road user converging with or alongside the host vehicle before the host vehicle manoeuvres into the second lane to perform the overtake, wherein the third lane is on an opposite side of the first lane to the second lane; and if the abort condition is satisfied, cause the host vehicle to remain in the first lane. This advantageously reduces the chance of a traffic conflict, because it is ensured that the host vehicle is likely to retain its place in traffic in case of a last-minute abort of the manoeuvre.

The one or more controllers may collectively comprise: at least one electronic processor having an electrical input for receiving information for enabling the determination; and at least one electronic memory device electrically coupled to the at least one electronic processor and having instructions stored therein; and wherein the at least one electronic processor is configured to access the at least one memory device and execute the instructions thereon so as to cause the host vehicle to perform the determining a requirement, the checking whether the abort condition is satisfied, and the causing the host vehicle to remain in the first lane.

The control system may be configured to: check whether a second abort condition is satisfied, wherein if the abort condition and the second abort condition are not satisfied, the host vehicle completes the manoeuvre into the second lane, and wherein if any one or more of the abort condition and the second abort condition is satisfied, the host vehicle remains in the first lane. Satisfaction of the second abort condition may be determined by checking for another road user within the second lane.

The overtake may be an overtake of a road user, wherein the control system may be configured to increase separation of the host vehicle from the road user to be overtaken in dependence on the determination; subsequently cause acceleration of the host vehicle towards the road user to be overtaken, such that the host vehicle achieves a higher speed than the road user to be overtaken; and manoeuvre the host vehicle into the second lane to perform the overtake. The control system may be configured to check the abort condition (relating to the third lane) at least after the host vehicle has commenced accelerating towards the road user to be overtaken. The amount of the increased separation and/or acceleration may be dependent on one or more of: at least one speed-dependent variable associated with the host vehicle and/or the road user to be overtaken; at least one variable associated with another road user behind the host vehicle; a variable associated with infrastructure.

According to another aspect of the invention there is provided a method for controlling a host vehicle operable in an autonomous mode, the method comprising: determining a requirement for the host vehicle within a first lane to manoeuvre into a second lane to perform an overtake; checking whether an abort condition is satisfied, wherein satisfaction of the abort condition is determined by checking a third lane for another road user converging with or alongside the host vehicle before the host vehicle manoeuvres into the second lane to perform the overtake, wherein the third lane is on an opposite side of the first lane to the second lane; and if the abort condition is satisfied, causing the host vehicle to remain in the first lane.

According to another aspect of the invention there is provided a method for controlling a host vehicle operable in an autonomous mode, the method comprising: determining a requirement for the host vehicle within a first lane to manoeuvre into a second lane; checking whether an abort condition is satisfied, wherein satisfaction of the abort condition is determined by checking a third lane for another road user converging with or alongside the host vehicle before the host vehicle manoeuvres into the second lane, wherein the third lane is on an opposite side of the first lane to the second lane; and if the abort condition is satisfied, causing the host vehicle to remain in the first lane.

According to an aspect of the invention there is provided a control system for a host vehicle operable in an autonomous mode, the control system comprising one or more controllers, the control system configured to: determine whether a condition is satisfied, wherein satisfaction of the condition requires at least an indication that a change of separation between at least two objects external to the host vehicle, is a value or is within a range; and inhibit a change of lanes of the host vehicle if the condition is satisfied. The value may be substantially zero. The range may be within one kilometer per hour of zero. The condition advantageously reduces the uncertainty associated with a lane change, by indirectly checking for a relationship between the objects such as whether the objects are coupled to one another. The coupling may be unseen to sensing means of the host vehicle.

The one or more controllers may collectively comprise: at least one electronic processor having an electrical input for receiving information associated with the at least two objects; and at least one electronic memory device electrically coupled to the at least one electronic processor and having instructions stored therein; and wherein the at least one electronic processor is configured to access the at least one memory device and execute the instructions thereon so as to cause the host vehicle to perform the determining whether the condition is satisfied, and the inhibiting a change of lanes.

The inhibiting a change may comprise at least one of: increasing a required separation distance from a lead object and/or a rear object; or aborting a process for changing lanes to slot the host vehicle between the two objects. The control system may be configured to control a speed of the host vehicle to enable the objects to pass the host vehicle or to cause the host vehicle to pass the objects, when the condition is satisfied. This advantageously enables a lane change to be performed as soon as possible.

Satisfaction of the condition may be dependent on a classification of at least one of the objects by a classification process. Satisfaction of the condition may require at least one of the objects to be classified as at least a portion of a heavy goods vehicle. The indication of the change of separation may be checked in dependence on the objects being classified as belonging to separate road users. The inhibiting a change of lanes may be not performed unless at least the objects are in an adjacent lane to a lane of the host vehicle, wherein the lane and adjacent lane are for travel in a same direction. The inhibiting a change of lanes may be not performed unless at least the objects are within a threshold distance of each other. The inhibiting a change of lanes may be not performed unless at least one of the objects is ahead of the host vehicle and another of the objects is behind the host vehicle. The inhibiting a change of lanes may be not performed unless the change is at the value or within the range for at least a predetermined time. This advantageously increases the certainty that a relationship between the objects exists.

According to another aspect of the invention there is provided a method for controlling a host vehicle operable in an autonomous mode, the method comprising: determining whether a condition is satisfied, wherein satisfaction of the condition requires at least an indication that a change of separation between at least two objects external to the host vehicle, is a value or is within a range; and inhibiting a change of lanes of the host vehicle if the condition is satisfied.

According to another aspect of the invention there is provided a method for controlling a host vehicle operable in an autonomous mode, the method comprising: determining whether a condition is satisfied, wherein satisfaction of the condition requires at least an indication that a change of separation between at least two objects external to the host vehicle, is a value or is within a range; and controlling the host vehicle in dependence on whether the condition is satisfied.

According to an aspect of the invention there is provided a control system for a host vehicle operable in an autonomous mode, the control system comprising one or more controllers, the control system configured to: determine whether at least one object detected in a path of the host vehicle satisfies one or more criteria of a drifting airborne object; wherein control of a direction and/or speed of the host vehicle is dependent on the determining. This advantageously reduces unnecessary deviations from a planned path of the host vehicle, because lightweight overrunable objects such as drifting plastic bags are not necessary to avoid.

The one or more controllers may collectively comprise: at least one electronic processor having an electrical input for receiving information indicative of the object; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the control. Determining that the object satisfies the one or more criteria may lower a priority of changing the path and/or speed of the host vehicle to avoid the object. Determining whether the object satisfies the one or more criteria may comprise determining a ground plane and determining that the object is airborne with respect to the ground plane. The ground plane may be determined with reference to map data. Determining whether the object satisfies the one or more criteria may comprise determining a kinematic behaviour of the object. The determined kinematic behaviour may comprise at least one of: a change of one or more components of acceleration;

acceleration of the object in a direction different from a direction of gravitational pull while the object is airborne; a deformation of the object.

According to another aspect of the invention there is provided a method for controlling a host vehicle operable in an autonomous mode, the method comprising: determining whether at least one object detected in a path of the host vehicle satisfies one or more criteria of a drifting airborne object; wherein control of a direction and/or speed of the host vehicle is dependent on the determining.

According to an aspect of the invention there is provided a control system for a host vehicle operable in an autonomous mode, the control system comprising one or more controllers, the control system configured to: determine that the host vehicle must stop at least partially within a lane, in response to an internal hazard associated with the host vehicle; and cause control of a direction of the host vehicle to cause the host vehicle to stop in a position laterally offset from a centre of the lane, in dependence on the determination. This advantageously reduces disruption to other road users, because even though the host vehicle has to stop in a lane, it attempts to create a corridor for other road users to pass with reduced lateral deviation.

The one or more controllers may collectively comprise: at least one electronic processor having an electrical input for receiving information indicative that the host vehicle must stop at least partially within a lane; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the causing control. The control may comprise changing a rate at which the host vehicle laterally deviates from the centre of the lane in dependence on a position and/or a distance and/or a speed. The determination may be based upon a first determination that the host vehicle must stop, and a second determination that a designated stopping location separate from the lane cannot be reached. The amount of offset may be constrained by at least one constraint.

The control system may be configured to: determine at least one property of terrain detected to a side of the lane, wherein the side of the lane corresponds to a side of the offset; and control the amount of offset and/or planned speed of the host vehicle while stopping in dependence on the or each at least one property of terrain. The control system may be configured to determine the or each at least one property of terrain when a speed of the host vehicle is below a value. The at least one property of the terrain may comprise an indication of surface roughness and/or surface friction.

The control system may be configured to: determine that at least one object detected to a side of the lane is an obstruction to opening of a door of the host vehicle, wherein the side of the lane corresponds to a side of the offset; and control the amount of offset in dependence on the determined obstruction. The amount of offset may be constrained by a minimum required opening envelope of the door, wherein the opening envelope is sufficient for an occupant to exit the host vehicle. The object may be a traffic barrier.

The control system may be configured to control whether the offset is in a nearside direction or an offside direction, in dependence on one or more of: a requirement to select a nearside available lane; detection of which lateral boundary of a road comprising the lane is closest to the host vehicle; detection of how many lane changes are required to reach a lateral boundary of the road.

The internal hazard may comprise at least one of: an occupant of the host vehicle is determined to be non-responsive; a fault with the host vehicle. The fault may comprise one or more of: power failure; communication failure; or sensor failure. The occupant may be determined to be non-responsive in dependence on a failure by the occupant to take control of the host vehicle during a handover process from the autonomous mode to a non-autonomous mode of the host vehicle. Propulsive torque availability by a prime mover of the host vehicle may be inhibited at least between the determination that the host vehicle must stop and the host vehicle stopping.

According to another aspect of the invention there is provided a method for controlling a host vehicle operable in an autonomous mode, the method comprising: determining that the host vehicle must stop at least partially within a lane, in response to an internal hazard associated with the host vehicle; and causing control of a direction of the host vehicle to cause the host vehicle to stop in a position laterally offset from a centre of the lane, in dependence on the determination.

According to an aspect of the present invention there is provided a control system for a host vehicle operable in an autonomous mode, the control system comprising one or more controllers, the control system configured to: determine that the host vehicle must stop, in response to an internal hazard associated with the host vehicle, wherein propulsive torque availability by a prime mover of the host vehicle is inhibited at least between the determination that the host vehicle must stop and the host vehicle stopping; and cause control of a direction of the host vehicle to cause the host vehicle to perform at least a lane change from a first lane to a second lane while stopping. This advantageously reduces disruption to other road users, because the host vehicle is not constrained to staying in lane and can change lanes for reaching a more desirable stopping location.

The one or more controllers may collectively comprise: at least one electronic processor having an electrical input for receiving information indicative that the host vehicle must stop; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the causing control.

The control system may be configured to: determine a target stop location corresponding to one of: a hard shoulder; an emergency refuge area; or a layby; and determine that at least the lane change is required to reach the target stop location. The control system may be configured to: determine at least one constraint for when and/or where the host vehicle must stop; and determine the target stop location only if the location of the stop location satisfies the constraint. The target stop location may be selected from a plurality of candidate stop locations. The target stop location and/or the one or more lane changes may be planned in dependence on processing map data. The control system may be configured to cause the lane change prior to causing the host vehicle to increase braking to reduce a speed of the host vehicle. The internal hazard may comprise at least one of: an occupant of the host vehicle is determined to be non-responsive; determination of a fault with the host vehicle. The fault may comprise one or more of: power failure; communication failure; or sensor failure. The occupant may be determined to be non-responsive in dependence on a failure by the occupant to take control of the host vehicle during a handover process from the autonomous mode to a non-autonomous mode of the host vehicle. The inhibition may be caused by the prime mover becoming inoperable. The inhibited availability of propulsive torque may comprise a limit on how much and/or for how long propulsive torque is usable for stopping the host vehicle. The first lane and the second lane may be for travel in a same direction and part of a highway on which stopping is prohibited except in emergencies.

According to another aspect of the present invention there is provided a method for controlling a host vehicle operable in an autonomous mode, the method comprising: determining that the host vehicle must stop, in response to an internal hazard associated with the host vehicle, wherein propulsive torque availability by a prime mover of the host vehicle is inhibited at least between the determination that the host vehicle must stop and the host vehicle stopping; and causing control of a direction of the host vehicle to cause the host vehicle to perform at least a lane change from a first lane to a second lane while stopping.

According to another aspect of the present invention there is provided a method for controlling a host vehicle operable in an autonomous mode, the method comprising: determining that the host vehicle must stop, in response to an internal hazard associated with the host vehicle; and causing control of a direction of the host vehicle to cause the host vehicle to perform at least a lane change from a first lane to a second lane while stopping.

According to an aspect of the present invention there is provided a control system for a host vehicle operable in an autonomous mode, the control system comprising one or more controllers, the control system configured to: determine one or more characteristics associated with at least one road user ahead of the host vehicle changing its lateral position away from a current lane of the host vehicle, wherein at least one of the one or more characteristics is associated with a rate of change associated with the road user changing its lateral position; and cause anticipatory control of at least one subsystem of the host vehicle in dependence on the determination, such that a potential undetected hazard in the current lane can be mitigated. This advantageously results in better anticipation of external hazards, because the external hazard can be detected indirectly via its effects on other road users before it has entered the line of sight of the sensing means of the host vehicle.

The one or more controllers may collectively comprise: at least one electronic processor having an electrical input for receiving information indicative of the one or more characteristics; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the causing control.

At least one of the characteristics may be associated with a similarity of lateral motions by a plurality of road users ahead of the host vehicle changing their lateral positions away from the current lane of the host vehicle.

The similarity may be determined by comparing one or more of: lateral displacements caused by the changing their lateral positions; when and/or where the changing their lateral positions begins; or rates of change associated with the changing their lateral positions. The similarity may be determined when at least one of the one or more comparisons is within a similarity threshold.

The control system may be configured to determine the one or more characteristics associated with the road user using at least one sensor on the host vehicle having a direct or indirect line of sight to at least a portion of the road user below an underside of a second road user between the host vehicle and the road user and/or through a glasshouse of the second road user. An approximate location of the potential undetected hazard may be estimated in dependence on the at least one characteristic. The anticipatory control may comprise at least one of: increasing seatbelt tension; adjusting an electronically adjustable seat to an optimal position for airbag effectiveness; closing one or more windows; reducing a brake pad lost motion; applying braking force; increasing a following distance behind a road user ahead of the host vehicle; or reducing a speed of the host vehicle. A scale of the anticipatory control may be dependent on the characteristics and/or dependent on an occupant comfort constraint.

The control system may be configured to determine whether the one or more characteristics are associated with non-evasive lateral movement, in dependence on map data and/or a confidence parameter, and wherein the causing control is not performed if the characteristics are associated with non-evasive lateral movement.

According to another aspect of the present invention there is provided a method for controlling a host vehicle operable in an autonomous mode, the method comprising: determining one or more characteristics associated with at least one road user ahead of the host vehicle changing its lateral position away from a current lane of the host vehicle, wherein at least one of the characteristics is associated with a rate of change associated with the road user changing its lateral position; and causing anticipatory control of at least one subsystem of the host vehicle in dependence on the determination, such that a potential undetected hazard in the current lane can be mitigated.

According to another aspect of the present invention there is provided a method for controlling a host vehicle operable in an autonomous mode, the method comprising: determining one or more characteristics associated with at least one road user ahead of the host vehicle changing its lateral position, wherein at least one of the characteristics is associated with a rate of change associated with the road user changing its lateral position; and causing anticipatory control of at least one subsystem of the host vehicle in dependence on the determination, such that a potential undetected hazard in the current lane can be mitigated.

According to an aspect of the present invention there is provided a control system for a host vehicle operable in an autonomous mode, the control system comprising one or more controllers, the control system configured to: determine a traffic disruption; associate the traffic disruption with a first lane; and cause control of a direction of the host vehicle to cause the host vehicle to increase a lateral offset of the host vehicle from a centre of a current lane of the host vehicle adjacent to the first lane, wherein the lateral offset is in a direction away from the first lane, while remaining within the current lane, in dependence on the associating.

This advantageously reduces potential disruption to the host vehicle, because the laterally offset lane position means that less lateral deviation of the host vehicle is required if the host vehicle suddenly needs to further increase its lateral distance from the traffic disruption. Further, visibility around some traffic disruptions is improved. Further, the host vehicle may be less likely to get stuck in traffic. Further, speed and danger perceived by an occupant may reduce when lateral separation between two objects moving at different velocities increases.

The one or more controllers may collectively comprise: at least one electronic processor having an electrical input for receiving information indicative of the traffic disruption; and at least one electronic memory device electrically coupled to the at least one electronic processor and having instructions stored therein; and wherein the at least one electronic processor is configured to access the at least one memory device and execute the instructions thereon so as to cause the host vehicle to perform the determining, the associating, and the causing control. The amount of lateral offset may be constrained by a required minimum lateral separation distance from a road user within an adjacent lane.

The traffic disruption may be associated with a junction meeting the first lane and wherein the control system is configured to determine in dependence on navigation information whether the host vehicle is to exit a highway comprising the current lane and the first lane at the junction, wherein if the host vehicle is to exit the multi-lane highway at the junction, the direction of the lateral offset is instead towards the first lane or the lateral offset is not increased. The traffic disruption may comprise temporary street furniture and the associating comprises determining that the temporary street furniture at least partially intrudes into a first side of the first lane, the first side being a farthest side from the current lane. The traffic disruption may comprise a slow-moving or stopped traffic queue in the first lane. The causing control may cause the host vehicle to be in a target laterally offset position by the time the host vehicle has slowed to match a speed of a traffic queue. The traffic disruption may comprise a closure of a lane, and wherein the associating comprises determining that the closure is of at least said first lane.

The control system may be configured to, after the causing control, cause further control of the host vehicle to change lane to a second lane that is to a same side of the centre of the current lane as the lateral offset, in dependence on a traffic-aware lane changing algorithm determining a gap in traffic in the second lane. The determining the traffic disruption may utilise at least one of: map data comprising information on junctions; road sign information comprising information on junctions; dynamic map data comprising information on lane closures; dynamic traffic data comprising information on traffic conditions; information from one or more front and/or rear sensors on the host vehicle with line of sight to the traffic disruption and/or one or more other road users.

The lateral offset may be controlled in dependence on a detected lateral offset of one or more other road users ahead of and/or behind the host vehicle. The lateral offset may be controlled in dependence on detection of at least one of: a motorcycle; an emergency services vehicle, filtering through traffic.

The traffic disruption may comprise a wide load of a road user, wherein the associating comprises determining an indication that a lateral edge of the wide load is within a threshold proximity of a first side of the first lane and/or at least partially intrudes into the first side of the first lane, the first side being a farthest side from the current lane.

According to another aspect of the present invention there is provided a method for controlling a host vehicle operable in an autonomous mode, the method comprising: determining a traffic disruption; associating the traffic disruption with a first lane; and causing control of a direction of the host vehicle to cause the host vehicle to increase a lateral offset of the host vehicle from a centre of a current lane of the host vehicle adjacent to the first lane, wherein the lateral offset is in a direction away from the first lane, while remaining within the current lane, in dependence on the associating.

According to another aspect of the present invention there is provided a method for controlling a host vehicle operable in an autonomous mode, the method comprising: determining a traffic disruption; associating the traffic disruption with a first lane; and causing control of a direction of the host vehicle to cause the host vehicle to increase a lateral offset of the host vehicle from a centre of a current lane of the host vehicle, wherein the current lane is the same as or is adjacent to the first lane, wherein the lateral offset is in a direction away from the first lane, while remaining within the current lane, in dependence on the associating.

According to an aspect of the present invention there is provided a control system for a host vehicle operable in an autonomous mode, the control system comprising one or more controllers, the control system configured to: determine that a steering manoeuvre of the host vehicle is required; and cause control of at least one directional illumination source to direct illumination towards an intended path of the host vehicle associated with the steering manoeuvre, prior to commencement of the steering manoeuvre. This advantageously improves useful visibility of the host vehicle and improves signalling to other road users, because the intended path is particularly well illuminated and the illumination shows other road users the intended path.

The one or more controllers may collectively comprise: at least one electronic processor having an electrical input for receiving information indicative that a steering manoeuvre is required; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the causing control. The direction of the illumination may be controlled to illuminate at least a portion of a target lane associated with the required steering manoeuvre. The directional illumination source may be configured to project one or more beams of light. The control system may be configured to control a shape of at least one of the one or more beams in dependence on the determining that a steering manoeuvre is required. Controlling the shape may comprise changing a width of the beam and/or causing the beam to project an arrow head. The directional illumination source may be comprised in at least one front headlamp module.

The directional illumination source may comprise a matrix lamp (headlamp) having a plurality of pixels, wherein the causing control comprises causing a determining of one or more subsets of a plurality of pixels of the matrix lamp and increasing or causing illumination of said one or more subsets of pixels. The control system may be configured to cause one or more turn signals located on a side of the host vehicle towards the direction of the required steering to illuminate in dependence on the required steering. The control system may be configured to cause a periodicity associated with the illumination to be associated with a periodicity associated with the illumination of the turn signals. The periodicity may comprise a periodicity of an intensity of the illumination. The periodicity associated with the illumination may be in phase with the periodicity associated with the illumination of the turn signals. The directed illumination may be within a field of view of at least one visual camera of the host vehicle, and wherein an output of the visual camera is associated with at least one function for controlling autonomous driving in the autonomous mode. The causing control may be performed if the required steering is for causing the host vehicle to move by an extent that requires the host vehicle to yield to any other road users with right-of-way, otherwise the causing control is not performed. The causing control may be performed if the required steering is for causing the host vehicle to change lanes.

According to another aspect of the present invention there is provided a system, comprising: the control system of any preceding claim, including at least a first controller, wherein the at least a first controller is arranged to output a signal for causing control of the directional illumination source; and the directional illumination source configured to receive the signal and to direct its output illumination in dependence on the signal.

According to another aspect of the present invention there is provided a method for controlling a host vehicle operable in an autonomous mode, the method comprising: determining that a steering manoeuvre of the host vehicle is required; and causing control of at least one directional illumination source to direct illumination towards an intended path of the host vehicle associated with the steering manoeuvre, prior to commencement of the steering manoeuvre.

According to an aspect of the present invention there is provided a control system for a host vehicle, the control system comprising one or more controllers, the control system configured to: cause control of at least one directional illumination source to direct illumination towards a path of the host vehicle associated with a steering manoeuvre.

According to a further aspect of the invention there is provided a control system for a host vehicle operable in an autonomous mode, the control system comprising one or more controllers, the control system configured to: determine a requirement for a first manoeuvre comprising a lateral motion of the host vehicle; determine a requirement for a second manoeuvre comprising a lateral motion of the host vehicle, wherein the first manoeuvre and the second manoeuvre are non-simultaneous; and combine the first manoeuvre with the second manoeuvre to generate a third manoeuvre that is substantially continuous.

This provides the advantage of an autonomous mode that is more comfortable for vehicle occupants. Prior autonomous vehicles may, for example, perform a manoeuvre such as changing lanes unnecessarily early on approaching a location for another manoeuvre such as following a change in road curvature, and consequently have to disturb the lateral acceleration of the occupants twice. Combining the manoeuvres avoids this.

The one or more controllers may collectively comprise: at least one electronic processor having an electrical input for receiving information from which the requirement to perform the first and/or second manoeuvre is determined; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the combining. The first manoeuvre may comprise a lane change from a first lane to a second lane. The second manoeuvre may comprise following at least part of a curve on a road on which the host vehicle is travelling. Combining the first manoeuvre and the second manoeuvre may comprise delaying or advancing the first manoeuvre to generate the third manoeuvre. Combining the first manoeuvre and the second manoeuvre may comprise delaying the first manoeuvre until after the requirement to perform the second manoeuvre is determined. This provides the advantage of a more comfortable vehicle, because the host vehicle will postpone the first manoeuvre even though a second manoeuvre is not yet planned, waiting for a convenient opportunity to combine them. Combining the first manoeuvre and the second manoeuvre may be subject to a constraint, wherein the constraint comprises at least one of: a navigation-dependent constraint; a constraint associated with reducing energy use of the host vehicle; or a constraint associated with avoiding an object. This provides the advantage that disruption to road users is minimised. Combining the first manoeuvre and the second manoeuvre may comprise smoothing lateral force on an occupant of the host vehicle associated with the first and second manoeuvres. The smoothing may comprise changing a cornering radius for at least part of the second manoeuvre to perform at least part of the first manoeuvre. The smoothing may comprise controlling a path of the host vehicle to cause all lateral forces for the first manoeuvre to act continuously in a first lateral direction. The smoothing may comprise transforming a clothoidal or sigmoidal path for the first manoeuvre into a substantially spiroidal path. The smoothing provides the advantage of a more comfortable vehicle, because lateral acceleration can be kept in a single direction. Prior vehicles may impart lateral accelerations with opposite signs, even when changing lanes on curves. The first manoeuvre may be required by a first autonomous mode function and wherein the second manoeuvre may be required by a second different autonomous mode function.

According to a further aspect of the invention there is provided a method of controlling a host vehicle operable in an autonomous mode, the method comprising: determining a requirement for a first manoeuvre comprising a lateral motion of the host vehicle; determining a requirement for a second manoeuvre comprising a lateral motion of the host vehicle, wherein the first manoeuvre and the second manoeuvre are non-simultaneous; and combining the first manoeuvre with the second manoeuvre to generate a third manoeuvre that is substantially continuous.

According to a further aspect of the invention there is provided a control system for a host vehicle operable in an autonomous mode, the control system comprising one or more controllers, the control system configured to: determine a requirement for a first manoeuvre; determine a requirement for a second manoeuvre, wherein the first manoeuvre and the second manoeuvre are non-simultaneous; and combine the first manoeuvre with the second manoeuvre to generate a third manoeuvre that is substantially continuous.

According to a further aspect of the invention there is provided a control system for a host vehicle operable in an autonomous mode, the control system comprising one or more controllers, the control system configured to: determine a manoeuvre requirement indicative of a required manoeuvre of the host vehicle to be performed; receive environment information indicative of the environment in the vicinity of the host vehicle; determine, in dependence on the manoeuvre requirement and the received environment information, that the required manoeuvre cannot be carried out while satisfying a first manoeuvring constraint; determine an intent manoeuvre to signal to another road user the intention of the host vehicle to carry out the required manoeuvre; and cause the host vehicle to complete the intent manoeuvre and the required manoeuvre in dependence on whether at least one second manoeuvring constraint is satisfied; wherein the second manoeuvring constraint associated with the intent manoeuvre is different from the first manoeuvring constraint associated with the required manoeuvre.

This provides the advantage of improved communication between road users. Provision of dynamic cues (intent manoeuvres) to other road users helps the host vehicle to create manoeuvring opportunities, particularly in heavy traffic.

The one or more controllers may collectively comprise: at least one electronic processor having an electrical input for receiving the environment information; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the causing. Determining whether the second manoeuvring constraint is satisfied may comprise determining whether another road user performs a submission manoeuvre. This provides the advantage of improved communication between road users. Recognition of dynamic cues (submission manoeuvres) from other road users helps the host vehicle to identify manoeuvring opportunities and to recognise when to yield to other road users. The submission manoeuvre may be associated with the another road user creating or maintaining a space for a path for the host vehicle. If the second manoeuvring constraint is not satisfied, at least the required manoeuvre may be aborted. The first manoeuvring constraint may be not satisfied, at least in part, because performing the required manoeuvre would force the another road user to change its position in traffic and/or its speed and/or its course. The intent manoeuvre may be configured to emphasise at least one of: dive; rebound; squat; weight transfer. This provides the advantage of improved communication with other road users, in a human-recognisable manner. A quick steering or torque output creates a perceptible dive, rebound, squat or weight transfer, to emphasise an intent to stop, speed up, create a space, or take up a space. If the required manoeuvre is in a first lateral direction the intent manoeuvre may not be in a second lateral direction, and/or if the required manoeuvre comprises one of accelerating or braking the intent manoeuvre may not be the other of accelerating or braking. This provides the advantage that the intent manoeuvre may be clearer to other road users.

According to a further aspect of the invention there is provided a control system for a host vehicle operable in an autonomous mode, the control system comprising one or more controllers, the control system configured to: receive environment information indicative of the environment in the vicinity of the host vehicle; identify an intent manoeuvre indicative of an intention of another road user to perform a manoeuvre; determine, in dependence on the received environment information and identified intent manoeuvre, a requirement for the host vehicle to modify control of the host vehicle to allow the another road user sufficient space to perform the manoeuvre; determine a submission manoeuvre to signal to the another road user that the host vehicle is allowing the another road user sufficient space to perform the manoeuvre; modify the control to allow the sufficient space; and cause the host vehicle to perform the submission manoeuvre.

The one or more controllers may collectively comprise: at least one electronic processor having an electrical input for receiving the environment information; and at least one electronic memory device electrically coupled to the at least one electronic processor and having instructions stored therein; and wherein the at least one electronic processor is configured to access the at least one memory device and execute the instructions thereon so as to cause the host vehicle to perform the determining, the modifying and the causing. The submission manoeuvre may be associated with the host vehicle creating or maintaining a space for a path for the other road user. The submission manoeuvre may be configured to emphasise at least one of: dive; rebound; squat; weight transfer. The control system may be configured to cause the host vehicle to perform a space creation manoeuvre to create the sufficient space. If the space creation manoeuvre is in a first lateral direction the submission manoeuvre may not be in a second lateral direction, and/or if the space creation manoeuvre comprises one of accelerating or braking the submission manoeuvre may not be the other of accelerating or braking. This provides the advantage that the submission manoeuvre may be clearer to other road users.

According to a further aspect of the invention there is provided a method for a host vehicle operable in an autonomous mode, the method comprising: determining a manoeuvre requirement indicative of a required manoeuvre of the host vehicle to be performed; receiving environment information indicative of the environment in the vicinity of the host vehicle; determining, in dependence on the manoeuvre requirement and the received environment information, that the required manoeuvre cannot be carried out while satisfying a first manoeuvring constraint; determining an intent manoeuvre to signal to another road user the intention of the host vehicle to carry out the required manoeuvre; and causing the host vehicle to complete the intent manoeuvre and the required manoeuvre in dependence on whether at least one second manoeuvring constraint is satisfied; wherein the second manoeuvring constraint associated with the intent manoeuvre is different from the first manoeuvring constraint associated with the required manoeuvre.

According to a further aspect of the invention there is provided a method for a host vehicle operable in an autonomous mode, the method comprising: receiving environment information indicative of the environment in the vicinity of the host vehicle; identifying an intent manoeuvre indicative of an intention of another road user to perform a manoeuvre; determining, in dependence on the received environment information and identified intent manoeuvre, a requirement for the host vehicle to modify control of the host vehicle to allow the another road user sufficient space to perform the manoeuvre; determining a submission manoeuvre to signal to the another road user that the host vehicle is allowing the another road user sufficient space to perform the manoeuvre; modifying the control to allow the sufficient space; and causing the host vehicle to perform the submission manoeuvre.

According to a further aspect of the invention there is provided a vehicle comprising any one or more of the control systems described herein.

According to a further aspect of the invention there is provided computer software that, when executed, is arranged to perform any one or more of the methods as described herein.

According to a further aspect of the invention there is provided a non-transitory, computer-readable storage medium storing instructions thereon that, when executed by one or more electronic processors, causes the one or more electronic processors to carry out any one or more of the methods as described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example of a host vehicle;
FIG. 2A illustrates an example of an electronic controller;
FIG. 2B illustrates an example of a computer-readable storage medium;
FIG. 2C illustrates an example of a system;
FIG. 26 illustrates an example of a method;
FIG. 27 illustrates an example of a method;
and
FIG. 28 illustrates an example of a method.

DETAILED DESCRIPTION

Figure 3:
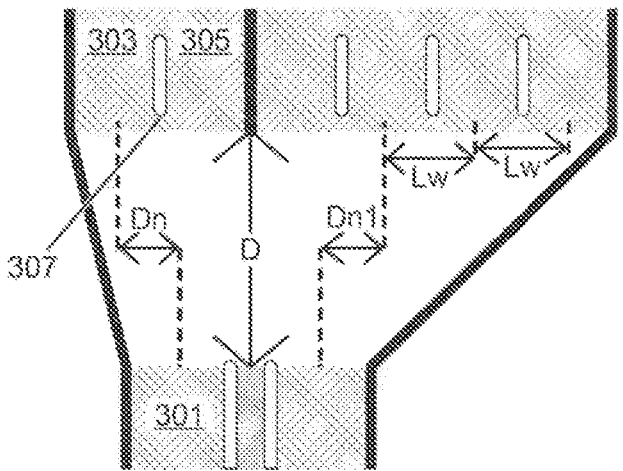
FIG. 3 illustrates an example of a highway with a bifurcation.

FIG. 1 illustrates an example of a vehicle 10 in which embodiments of the invention can be implemented. In some, but not necessarily all examples, the (host) vehicle 10 is a passenger vehicle, also referred to as a passenger car or as an automobile. Passenger vehicles generally have kerb weights of less than 5000 kg. In other examples, embodiments of the invention can be implemented for other applications, such as industrial vehicles.

The host vehicle 10 may comprise any appropriate prime mover (not shown) or a plurality of prime movers. An example of a prime mover is an internal combustion engine.

Another example of a prime mover is an electric motor. The vehicle may be an electric vehicle or a hybrid-electric vehicle.

The host vehicle 10 may be operable in an autonomous mode. The host vehicle 10 may also be operable in a non-autonomous mode.

A control system 200 is shown in FIG. 2A which may implement, at least in part, the functionality of the autonomous mode. The control system 200 may implement, at least in part, the functionality of the non-autonomous mode. The control system 200 may comprise means to cause any one or more of the methods described herein to be performed, at least in part.

The control system 200 may comprise one or more (electronic) controllers 202. One controller 202 is shown in FIG. 2A.

The controller 202 of FIG. 2A includes at least one electronic processor 204; and at least one electronic memory device 206 electrically coupled to the electronic processor 204 and having instructions 208 (e.g. a computer program) stored therein, the at least one electronic memory device 206 and the instructions 208 configured to, with the at least one electronic processor 204, cause any one or more of the methods described herein to be performed.

The control system 200 may be supplied separately from or together with any input devices and any actuators controlled by the control system 200.

FIG. 2B illustrates a non-transitory computer-readable storage medium 210 comprising the computer program 208 (computer software).

FIG. 2C shows an example of a system 300 for a vehicle such as the host vehicle 10 of FIG. 1. The system 300 may implement, at least in part, the functionality of the autonomous mode.

The system 300 comprises the control system 200. The system 300 may comprise one or more actuators for operation by at least the control system 200 in at least the autonomous mode. The actuators may be operably (directly or indirectly) coupled to one or more outputs of one or more controllers of the control system 200.

The actuators may comprise one or more torque control actuators. The torque control actuators are for controlling torque received at one or more road wheels of the host vehicle 10.

The torque control actuators may comprise a brake control actuator 316.

The brake control actuator 316 comprises any appropriate means for controlling a negative torque received by road wheels of the host vehicle 10.

In an implementation, the brake control actuator 316 may comprise a friction brake actuator for applying friction brakes of the host vehicle 10.

The brake control actuator 316 may be operated in dependence on an output signal such as a brake demand signal output from the control system 200, in the autonomous mode.

The torque control actuators may comprise an acceleration control actuator 312.

The acceleration control actuator 312 comprises any appropriate means for controlling a positive torque received by road wheels of the host vehicle 10, for instance means for controlling a torque output of the prime mover.

In an implementation, the acceleration control actuator 312 may comprise a throttle position actuator for controlling an opening degree of a throttle for an internal combustion engine.

The acceleration control actuator 312 may be operated in dependence on an output signal such as a torque demand signal output from the control system 200, in the autonomous mode.

The actuators may comprise a steering control actuator 314. The steering control actuator is part of a steering subsystem of the host vehicle 10, for controlling the direction of the host vehicle 10.

The steering control actuator 314 comprises any appropriate means for controlling a direction of the host vehicle 10, for instance means for controlling a steering angle of front road wheels of the host vehicle 10.

In an implementation, the steering control actuator 314 may comprise a motor for actuating a steering rack of the host vehicle 10. Additionally or alternatively, the steering control actuator 314 may comprise a friction brake actuator, configured to control a braking torque differential between left and right wheels of the host vehicle 10.

The steering control actuator 314 may be operated in dependence on an output signal such as a steering signal output from the control system 200, in the autonomous mode.

One or more of the actuators 312, 314, 316 may be operable automatically by the control system 200 in the autonomous mode. One or more of the actuators may be operable under manual control by a vehicle occupant in the non-autonomous mode.

The system 300 may comprise one or more input devices 304, 306, 308, 310. The input devices may be coupled to one or more inputs of one or more controllers of the control system 200.

The signals to the actuators may be dependent on signals from the input devices.

The input devices may comprise sensing means 306, 308, 310, such as one or more sensor units. The sensing means may enable machine vision for autonomous driving.

The sensing means outputs to the control system 200 environment information indicative of the environment in the vicinity of the host vehicle 10. The environment information is indicative of one or more environment characteristics, e.g. road type, presence of other road users, road markings, road priorities, etc.

The sensing means may be configured for or suitable for attachment to the host vehicle 10. The sensing means may comprise an optical sensor such as a (visual) camera 308. An optical sensor is for imaging in the visible light spectrum.

The sensing means may comprise range detection means 310. The term "range detection means" will be understood to mean any sensing means for detecting sensor data indicative of a range of a target object from the host vehicle 10. The range detection means 310 may comprise a rangefinder. The range detection means 310 may comprise a laser rangefinder. The laser rangefinder may comprise a lidar sensor. The control system 200 with at least one of the sensing means may be arranged to capture a doppler shift in an emitted signal. The sensing means may comprise a radar sensor 306. The sensing means may comprise an ultrasound sensor (not shown).

The system 300 may comprise a plurality of the input devices, each input device representing a different sensing modality. For example, the system 300 may comprise lidar sensors, radar sensors and cameras. This redundancy improves safety and enables autonomous driving in various environments such as driving at night or through fog.

The sensing means may be capable of detecting objects within a first sensing range. The first sensing range may be, at most, a maximum line of sight distance from the sensing means. The first sensing range may be from approximately 80 m to approximately 100 m from the location of the sensing means.

Objects may be recognised by a classification process (algorithm) of the control system 200. Objects which may be classified may include one or more of: automobiles; heavy goods vehicles; motorcycles or pushbikes; emergency services vehicles; road signs and their instructions (including temporary street furniture such as traffic cones); and road markings and their instructions. The locations of the objects may be determined, for example using range detection means 310. Which lane the objects are in may be determined. A relative speed between the host vehicle 10 and an object may be determined, which may indicate whether a separation (also referred to as headway, inter-vehicular distance, following distance) from the object is increasing or decreasing and at what rate. The movement of the objects may be tracked using optical flow analysis for example.

The sensing means collectively provide a field of view around the host vehicle 10. The field of view may extend 360 degrees horizontally around the host vehicle 10 or less. The collective field of view also extends vertically by any appropriate amount. The individual sensor units may be located at the front, rear and/or sides of the host vehicle 10. Sensor units may be located at corners of the host vehicle 10. Sensor units may be located on wing mirrors of the host vehicle 10. Some sensor units may be located high on the host vehicle 10, such as above the waist of the host vehicle 10. Some sensor units may be at bumper height or lower.

The input devices may communicate with the control system 200 using any appropriate electronic communication network. Similarly, the actuators may be configured for drive-by-wire operation, therefore communication between the control system 200 and the actuators may also be via any appropriate electronic communication network. Redundancy may be provided by implementing multiple communication networks and/or backup controllers in the control system 200 and/or backup power supplies coupled to independent power sources (e.g. batteries). Example communication networks include a Controller Area Network (CAN), an Ethernet network, a Local Interconnect Network, a FlexRay™ network or the like.

The system 300 may comprise a telematics unit 304. The telematics unit 304 may comprise one or more controllers. The telematics unit 304 may be a telematics control unit (TCU). The illustrated TCU does not form part of the control system 200 but it may do in other examples. The TCU may be configured at least to function as a vehicle software update client. The TCU may comprise an antenna arrangement. The antenna arrangement may be configured as a receiver, a transmitter or as a transceiver. This enables software updates to be obtained from a remote (offboard) information source 302 such as a server, another vehicle according to a vehicle-to-vehicle (V2V) communication model, or external infrastructure according to a vehicle-to-infrastructure (V2I) communication model.

The TCU may be configured to download software-over-the-air (SOTA) updates for installation in the host vehicle 10. Software components for SOTA updates could include at least one of: executable code, configuration data, graphics, map data, dynamic data such as dynamic map data and dynamic traffic data and weather data, audio calibration, multimedia, and firmware.

SOTA updates are received via a wireless communication network, such as a cellular network. The host vehicle 10 may subscribe to a cellular network service. The TCU may comprise a subscriber identity such as an international mobile subscriber identity (IMSI) number, to facilitate access to the cellular network. A subscriber identity module (SIM) may be installed in the host vehicle 10 to enable the TCU to access the IMSI and therefore the cellular network. An operator of the cellular network may associate the IMSI with a customer account and bill the customer for data usage and/or access to the cellular network. Additionally or alternatively, the TCU may comprise means to access a short-range communication network such as a wireless local area network or a wireless personal area network. The TCU may comprise means, such as a universal serial bus interface, for wired communication with the remote information source 302. Advantageously, SOTA functionality enables the dynamic data to be downloaded while the host vehicle 10 is undergoing a journey. This enables substantially live updates. The telematics unit 304 may be configured to schedule the SOTA downloads from the remote information source 302 according to push or pull methods. Client-server, V2V and/or V2I communication models could be used. The telematics unit 304 may be configured to perform the downloads periodically at a predetermined interval which may depend on the download payload. For instance, the interval for downloading dynamic traffic data may range from the order of minutes to the order of hours. The interval for downloading dynamic map data may range from the order of minutes to the order of months. The interval for downloading non-dynamic data may range from the order of months to the order of years, or it may need to be manually updated at a dealership.

Dynamic traffic data as described above may be obtained via a SOTA update and/or a service provider application programming interface. Dynamic traffic data comprises substantially live information on traffic conditions. For example, the dynamic traffic data may indicate slow moving or stopped traffic. The dynamic traffic data may be associated with one or more metrics associated with traffic density, flow rate, speed, inter-vehicular distance, or journey time. The metrics may indicate a current condition, a change, or an expected condition. The metrics may be associated with particular locations and/or with particular times. Falling speeds/flow rates/inter-vehicular distances and rising densities/journey times are indicators of traffic conditions.

The dynamic traffic data enables a traffic condition to be determined. The traffic condition could be determined by comparing a current condition with a change or expected condition. A traffic condition could be determined when at least one threshold is passed such as an absolute or relative threshold. The relative threshold could be a statistical significance threshold, for example.

The dynamic traffic data may have sufficient resolution, granularity and/or detail to enable the traffic condition to be associated with a specific lane of a highway, from a plurality of lanes for travel in a same direction. This enables certain lanes to be avoided before a traffic queue is reached.

Dynamic map data as described above may comprise information that enables map data stored onboard the host vehicle 10 to be supplemented. The map data may be used by the control system 200 and/or a navigation subsystem of the host vehicle 10 for route planning. Map data indicates at least roads and junctions. Locations may be indicated by map data via global position coordinates. The navigation subsystem may be configured to receive user navigation inputs defining navigation constraints. Navigation constraints may comprise one or more of a destination, a waypoint, a navigation route or acceptable routes, an avoidance setting (e.g. avoidance of toll roads), a target to be reduced/minimised such as minimum distance or minimum travel time, or a target to be achieved such as a time of departure or arrival. Once a navigation route has been selected, the selected navigation route may impose navigation constraints on the autonomous mode, to enable autonomous navigation.

The dynamic map data and dynamic traffic data may be compatible with said map data. Dynamic map data may comprise indications of at least one of the following conditions: traffic conditions such as roadworks and/or lane closures; speed limit changes such as variable speed limit changes imposed by permanent variable speed limit systems; weather conditions; or road surface conditions. Examples of roadworks include road closures, lane closures and traffic diversion routes. Examples of lane closures include blocked lanes, whether caused by roadworks, broken down vehicles or other causes. Examples of road surface conditions include potholes, loose or broken surface material, low friction hazards (e.g. ice or spilled liquids), or objects in the road (e.g. lost cargo). The indications may specify one or more locations such as where the condition starts and/or ends. The indications may specify which lane or lanes the condition applies to. The indications enable certain lanes or roads to be avoided before a traffic queue is reached. The above indications may be available by analysis of data from the sensing means, however for a much shorter range. Indications from multiple sources, such as the dynamic map data and the sensing means, may be combined to improve certainty.

The map data, dynamic map data and/or dynamic traffic data may comprise a fine level of granularity. For example, the individual lanes for travel in a same direction on a highway may be distinguishable. The map data and/or dynamic map data may comprise a high level of detail. For example, indications of road markings and/or road sign (traffic sign) information may be distinguishable from the data. Distinguishable road markings may comprise indications of lane boundaries. Distinguishable lane boundaries may be indicated by lane boundary markings in the data or may be indirectly indicated by lane centre position information in the data. The map data and/or dynamic map data may be of any suitable format that enables an identification of an instruction regarding a lane, a junction, a right of way (priority) or caution.

The control system 200 may further be configured to determine a highway law applicable to the host vehicle's current location and/or to a planned location or route of the host vehicle 10. The control system 200 may be configured to apply information associated with the applicable highway law to correctly identify instructions from the map data and/or dynamic map data. For example, if a planned route is in the United Kingdom the control system 200 may be configured to recognize road markings or traffic (road) sign information in a manner that corresponds to the requirements of the Highway Code. This is advantageous because the same road markings or signs can have different legal meanings in different highway jurisdictions.

The additional detail from the map data and/or dynamic map data may enable not only improved route planning by a navigation subsystem, but also improved path planning for the autonomous mode. For example, the control system 200 may process the map data and/or dynamic map data to determine which lanes the host vehicle 10 will travel on at which points on a journey. The control system 200 may further determine when lane changes may need to occur as directed by road signs or other information from the data. Certain lanes can be avoided or moved out of before a traffic queue is reached. Further, the dynamic data may define a second sensing range of machine vision, farther than the first sensing range. For example, the dynamic data may at least cover an entire route planned by the navigation subsystem and may cover one or more alternative routes in case of a later route recalculation. This enables certain lanes or roads to be avoided. The dynamic data may cover a regional, national or even international area. However, a greater coverage area may adversely affect a time taken to download updated dynamic data.

The input devices may define one or more sensing modes for detecting objects or contexts such as road markings, road signs or traffic conditions, etc. The map data/dynamic data may define a further sensing mode for detecting at least some of the same objects or contexts. Therefore, some objects and contexts can be determined from plural modes of information. The control system 200 may be configured to aggregate the multi-modal information and process the aggregated data to increase a confidence score of at least one property of the object or context. The property may relate to a presence or absence of the object or context, its location, its size, or anything else useful for autonomous mode driving. This advantageously enables a realistic indication of a driving context within at least the first sensing range. A required manoeuvre may only be performed if the confidence score is above a threshold.

A decision to perform a manoeuvre may be made on the basis of information from a longer-range low-trust sensing mode such as map data and/or dynamic data, but it may be required that the information leading to the decision is subsequently verified using a shorter-range high-trust sensing mode such as the sensing means, for the manoeuvre to be performed. For example, information from the sensing means may be used to verify that information from the map data/dynamic data is accurate, before one or more planned manoeuvres are performed. The longer-range low-trust sensing mode may correspond to map data and/or dynamic data. The shorter-range high-trust sensing mode may correspond to one or more of the above-described sensing means.

Other dynamic data that may be obtainable by the control system 200, e.g. via the TCU, may include dynamic traffic data indicative of an emergency services vehicle location. The dynamic traffic data may indicate if an emergency services vehicle is approaching. This provides advance warning for the host vehicle 10 to manoeuvre out of a position in which it would obstruct the emergency services vehicle. The data may be received from client-server, V2V and/or V2I communication.

The host vehicle 10 may additionally comprise at least one human-machine interface (HMI) (not shown), facilitating access to one or more of the functions of the control system 200 described herein, and/or for presenting one or more outputs of the control system 200 described herein to the occupant (e.g. driver). The presentation may use visual means, audio means or any other appropriate means. User inputs to the HMI may be via touch, gesture or sound-based commands, or any other appropriate means. The HMI may comprise one or more of an output HMI, an input HMI, or an input-output HMI. Examples of output HMI in a vehicle include a centre console display, an instrument cluster display, audio speakers, a head-up display, a rear seat occupant display, a haptic feedback device, or the like. Examples of input HMI include touchscreens, manual actuators such as buttons and switchgear, and sensors for speech command recognition or non-touch gesture recognition. The input HMI may be close to a driver's seat. Advantageously, some input HMI may be located on the steering wheel.

A handover process may be implemented for initiating the autonomous mode, which will now be described. The control system 200 may be configured to receive at least one signal indicative of a suitability of initiation of the autonomous mode. The received signal may be indicative of a vehicle characteristic. The received signal may be indicative of a user characteristic. The received signal may be indicative of an environment characteristic. The received signal may be from the sensing means, or from another part of the control system 200 such as an algorithm that processes the map data and/or dynamic data.

The control system 200 may be configured to cause output of an availability signal indicative of an availability of the autonomous mode in dependence on the received signal, for example for presentation to the occupant via an HMI. If no availability signal is output, the host vehicle 10 is not operable to enter the autonomous mode. The control system 200 may be configured to determine whether to transmit the availability signal in dependence on at least one of the vehicle characteristic, the user characteristic, or the environment characteristic. One or more criteria associated with one or more of the characteristics may need to be satisfied, for the availability signal to be transmitted. An indication of the availability signal may be continuously presented to the occupant until at least one of the criteria is no longer satisfied. The availability signal may be continuously presented to the occupant until a user input is received in response to the availability signal. Examples of the user input and examples of the criteria are defined below.

The control system 200 may be configured to receive the user input in the form of a user activation signal indicative of the occupant's request to initiate the autonomous mode in response to the availability signal. The user input may be made via HMI. The user activation signal may be received during driving of the host vehicle 10, in other words while the host vehicle 10 is in a travelable state. For example, the host vehicle 10 may be in the non-autonomous mode. The control system 200 may be configured to output a driving mode signal to cause the host vehicle 10 to initiate the autonomous mode in response to the user activation signal. Initiating the autonomous mode may comprise a transition phase during which control of vehicle movement is transitioned away from the occupant to the control system 200. A duration of the transition phase may be dependent on one or more of the vehicle characteristic, the user characteristic or the environment characteristic to ensure a smooth transition.

The environment characteristic may be indicative of an environment external to the host vehicle 10 and in the vicinity of the host vehicle 10. The environment may be a driving environment. The driving environment may be a current driving environment while the host vehicle 10 is being driven. The driving environment may be indicative of a type of road on which the host vehicle 10 is driving. Optionally, the control system 200 may be configured not to transmit the availability signal unless at least the environment characteristic satisfies a road type criterion. The environment characteristic may be indicative of other environments too.

The road type criterion may be satisfied if the environment characteristic is indicative that the host vehicle 10 is travelling on a required type of road. The required type may be a motorway. Articles 1(j) and 25 of the Vienna convention on road traffic define the term motorway. A motorway may be referred to as a freeway or highway in some countries. The term 'highway' is used in this document. For those countries which have not ratified the above convention, their highways are defined herein as those which possess many or all of the following characteristics of a highway:

Use of the road is prohibited to pedestrians, animals, cycles, mopeds unless they are treated as motor cycles, and all vehicles other than motor vehicles and their trailers, and to motor vehicles or motor-vehicle trailers which are incapable, by virtue of their design, of attaining on a flat road a speed specified by domestic legislation. This indication may be provided by a road sign;

Drivers are forbidden to have their vehicles standing or parked elsewhere than at marked parking sites; if a vehicle is compelled to stop, its driver shall endeavour to move it off the carriageway and also off the flush verge and, if he is unable to do so, immediately signal the presence of the vehicle at a distance so as to warn approaching drivers in time;

Drivers are forbidden to make U-turns, to travel in reverse, and to drive on to the central dividing strip, including the crossovers linking the two carriageways;

Drivers emerging on to a motorway shall give way to vehicles travelling on it;

The road is specially signposted as a motorway;

The road does not cross at level with any road, railway or tramway track, or footpath;

The road does not serve properties bordering on it;

The road is provided, except at special points or temporarily, with separate carriageways for the two directions of traffic, separated from each other either by a dividing strip not intended for traffic.

The road type criterion may not be satisfied if the road is of another type and/or does not possess all or at least certain ones of the above characteristics. For example, some roads are main roads that possess many of the above characteristics but allow pedestrians and non-motorized vehicles to use the roads. The availability signal may not be transmitted for such roads.

In other examples, the required type of road may be another type of road rather than a highway, or the requirement may merely be that the host vehicle 10 is not on a certain type of road such as a minor or urban road. Optionally, the road may be required to possess multiple lanes in a direction of travel of the host vehicle 10 to satisfy the road type criterion. In other examples, there may be no road type criterion for entering the autonomous mode.

The driving environment such as the type of road may be determined directly from metadata in the map data. The metadata may be indicative that the road is a highway. Alternatively, the required type may be determined indirectly from indications that the road possesses one or more of the above characteristics. Indications of the above characteristics may be determined by recognition of relevant road signs or road markings conveying these requirements, or by recognition of infrastructure such as a dividing strip. This may be detected by the sensing means and recognized by an object classification algorithm or determined from the map data or dynamic map data.

The environment characteristic may be indicative of a current weather condition in the vicinity of the host vehicle 10 or an upcoming weather condition to be encountered by the host vehicle 10. Information indicative of a weather condition may be indicative of rain falling on the host vehicle 10. The information may be indicative of the presence of snow or ice on the ground. The information may be indicative of at least one of a temperature, a humidity, a wind speed, a visibility, atmospheric pressure, precipitation. The control system 200 may be configured to not output the availability signal unless at least one weather criterion is satisfied, weather criterion may be satisfied if an indicated weather condition is a predetermined acceptable weather condition or is not a predetermined unacceptable weather condition. A weather criterion may be satisfied if an indicated temperature is within a predetermined acceptable temperature range. A weather criterion may be satisfied if an indicated humidity is within a predetermined acceptable humidity range. A weather criterion may be satisfied if an indicated atmospheric pressure is within a predetermined acceptable pressure range. The weather condition may be determined from a sensor on the host vehicle 10 or from information downloaded from an offboard weather service.

The user characteristic may be indicative of a current user characteristic of the occupant of the host vehicle 10 while the host vehicle 10 is being driven by the occupant. The user characteristic may be indicative of an awareness of the occupant of the vehicle. Information indicative of the awareness of the occupant may be obtained from one or more user sensors (not shown). The one or more user sensors may comprise at least one of a camera 308 and a physiological sensor to capture data indicative of the awareness of the occupant. The control system 200 may be configured not to output the availability signal unless at least one awareness criterion is satisfied. The occupant's awareness may need to be above a predetermined awareness threshold to satisfy the awareness criterion. In an implementation, the awareness may be quantified by numerical indicators such as a frequency or length of time for which the occupant's gaze has not been within a predefined area associated with driving, a blink rate, a head pose angle, or the like. In other words, the autonomous mode may be unavailable to the occupant of the host vehicle 10 if the occupant is not sufficiently aware to be able to resume control of the host vehicle 10 from the autonomous mode if required. In some examples, the occupant characteristic may relate to a physiological state. To satisfy a physiological criterion for the availability signal, quantifiable indicators such as heart rate or brain activity may be detected using one or more biometric sensors.

The user characteristic may be indicative of a separation of at least a part of the occupant from one or more controls of the host vehicle 10. For example, the user characteristic may be indicative of whether one or more hands of the occupant are on the steering wheel. The availability signal may be determined not to be output unless at least a non-separation criterion is satisfied. The non-separation criterion may be satisfied if one or more hands of the occupant are on the steering wheel.

The vehicle characteristic may be indicative of a current vehicle characteristic of the host vehicle 10 while the host vehicle 10 is being driven. The vehicle characteristic may be indicative of a current speed of the host vehicle 10. Information indicative of the current speed could be obtained from a speed sensor (not shown). The availability signal may be determined not to be output unless at least a speed criterion is satisfied. The speed criterion may be satisfied if an indicated current speed of the host vehicle 10 is within a predetermined acceptable speed range, such as less than an upper limit of about 130 kilometres per hour. Other vehicle characteristics may be checked too such that the availability signal is determined not to be output in one or more of the following situations: a tyre pressure is outside a predetermined acceptable range; an oil level is below a predetermined threshold; a fuel level is below a predetermined threshold; the host vehicle 10 is towing; a loaded weight of the host vehicle 10 exceeds a predetermined threshold; or a state of health of one or more components of the host vehicle 10, e.g. a traction battery, is outside a predetermined acceptable state of health.

The vehicle characteristic may be indicative of a detection range of one or more of the sensing means. The detection range may be less than the first sensing range in certain conditions, particularly weather conditions such as fog. The availability signal may be determined not to be output unless at least a detection range criterion is satisfied. The detection range criterion may be satisfied if the received signal is indicative that the detection range of the one or more sensing means is greater than a predetermined range threshold. The autonomous mode may be unavailable to the occupant of the host vehicle 10 if the detection range of the one or more sensors does not meet the predetermined range threshold.

Once the transition phase is entered, control of the host vehicle 10 moves away from the occupant and to the control system 200 of the host vehicle 10. The transition phase may comprise modifying a vehicle movement in preparation for the end of the transition phase. For example, a steering of the host vehicle 10 may be controlled autonomously during the transition phase to substantially centre the host vehicle 10 within a lane of the road. A braking torque of the host vehicle 10 may be controlled autonomously during the transition phase to control a distance of the host vehicle 10 from a further vehicle ahead of the host vehicle 10 along a road. During the transition phase, the host vehicle 10 may also continue to respond to manual control inputs from the occupant. As the transition phase progresses, the host vehicle 10 may become less responsive to user control until the host vehicle 10 is controlled fully autonomously in the autonomous mode. The occupant is informed of progress through the transition phase by the transition signal described hereinbefore.

Once the transition phase is complete, the control system 200 controls the host vehicle 10 in the autonomous mode. SAE International's J3016 defines six levels of driving automation for on-road vehicles. The term autonomous mode as used herein will be understood to cover any of the SAE levels three or higher, such that the control system 200 will control all aspects of the dynamic driving task. At levels four or five, one or more aspects of one or more of the handover processes described herein for transitioning to and/or from the autonomous mode may not be implemented.

Driver-assistance functions such as cruise control, adaptive cruise control, a lane change assistance function, or a lane keeping function, are at a lower level of autonomy than the autonomous mode.

In the autonomous mode the occupant may not be required to keep one or more hands on the steering wheel, so a monitoring step requiring the occupant to keep one or more hands on the steering wheel may be omitted. In other implementations, the autonomous mode may require the monitoring step. Whether the hand(s) are on the steering wheel may be determined using any appropriate sensing means such as a touch sensor or camera or steering wheel torque/angle sensor. The monitoring may be performed periodically or continuously. If the hands are not on the steering wheel, one or more prompts may be issued.

The host vehicle 10 may comprise a driver distraction function. One or more distraction criteria associated with the driver distraction function may be inhibited upon entering the autonomous mode. For example, in the non-autonomous mode the driver distraction function may alert the occupant when their gaze points outside a predetermined area such as the windscreen. The alert may be transmitted when the gaze is outside the predetermined area for a threshold duration and/or frequency. In the autonomous mode the driver distraction function may be disabled or the predetermined thresholds may be modified to become more permissive.

While the host vehicle 10 is in the autonomous mode, one or more algorithms are implemented for controlling speed and/or direction of the host vehicle 10. The control system 200 transmits the output signals to the actuators in dependence on the algorithms. The algorithms may comprise at least some of: a lane centring algorithm; a lane change algorithm; a path planning algorithm; a speed control algorithm; a machine learning algorithm. The algorithms may be context-aware. The algorithms may process information from one or more of the sensing means; map data; dynamic data; and navigation constraints. For example, the algorithms may be traffic-aware from the dynamic traffic data. The algorithms may interoperate with each other to determine the output signals. The algorithms may plan variations of the output signals over a future period of driving.

Algorithms for autonomous driving are known and include regression algorithms, classification algorithms, clustering, and decision matrix algorithms. Cost or loss functions may be employed to find optimal paths and speeds and minimize risk to humans.

The lane centring algorithm is for keeping the host vehicle 10 within a predetermined lateral position (target lane position) within lane lateral edges (lane boundaries). The lane boundaries may be identified by specific road markings under the relevant highway law. If road markings are not visible, for instance due to faded paint, a putative lane and/or its boundaries may be identified based on detection of a traffic corridor of other road users driving in a detected consistent manner, e.g. in lines.

The lane position may be off-center on occasion, dependent on detected characteristics such as environment characteristics, e.g. other road users or infrastructure proximal to a lane boundary. This provides a reassuring separation between the host vehicle 10 and lateral objects. A minimum separation from one or both lane boundaries may be maintained. The minimum separation may be around 0.3 to 0.6 metres from the nearside boundary, optionally 0.5 metres.

The lane change algorithm may be for keeping the host vehicle 10 within a nearside lane if required by applicable highway law. The lane change algorithm may enable the host vehicle 10 to manoeuvre from a first lane to a second lane to avoid detected traffic. The lane change algorithm may enable the host vehicle 10 to implement a vehicle overtaking function to overtake another road user. The lane change algorithm may enable the host vehicle 10 to change lanes to follow a navigation route. A turn signal/indicator of the host vehicle 10 may be flashed automatically just before the lane change is performed.

Keeping the host vehicle 10 within a nearside lane may be the responsibility of a nearside bias function of the lane change algorithm. The nearside bias function may require a nearside lane to be selected in normal driving conditions. The nearside bias function may comprise one or more parameters that define constraints to be met. The constraints may be for lane hogging avoidance. An example constraint may be to delay changing lane from a nearside lane to an offside lane to overtake other road users until the overtake can be performed within a threshold time. A related constraint may be to change lane from the offside lane back to the nearside lane following an overtake as soon as possible.

The threshold time may be the time spent outside the nearside lane without overtaking another road user in the nearside lane. The threshold may depend on applicable highway law but tends to be of the order of tens of seconds rather than minutes.

Whether a lane change is performed may depend on a space availability signal indicative of a presence of a space in front of or behind another road user of a size sufficient to accommodate the host vehicle 10, should the host vehicle 10 need to change lanes to occupy that space. The space availability signal may be determined in dependence on inputs from the sensing means. The space availability signal may affect where, when and/or how fast a manoeuvre is performed. For example, the space availability signal may be used by the speed control algorithm when the lane change algorithm determines a requirement for a lane change. The space may be in a target lane for the lane change. The space may be between a lead (downstream) other road user and a rear (upstream) other road user. The space may be a current or expected space. The control system 200 may be configured to determine if the expected space will have a size sufficient to accommodate the host vehicle 10 at a predetermined time in the future. Determination of the expected space may depend on a detected indication of a relative speed of the other road user or users. The speed may be controlled in dependence on the space availability signal, for example to ensure that the space in front of and behind the host vehicle 10 is of a sufficient, e.g. above-threshold, detected size. The threshold size is an example of a manoeuvring constraint to be satisfied before the manoeuvre can be performed. The threshold may depend on the speed of the host vehicle 10. The speed of the host vehicle 10 may be controlled before the lane change. The speed may be controlled to be close to a speed of a lead other road user, a speed of a rear other road user, or between both.

The path planning algorithm may be for planning a specific path to be followed. Planning the path comprises determining one or more manoeuvre requirements indicative of required manoeuvres of the host vehicle 10. A manoeuvre is defined herein as a change of speed or course. Changing course may be performed using the steering control actuator.

Absent of navigation constraints, the path may follow the highway as far as possible. With navigation constraints, the path may follow those portions of the navigation route during which the autonomous mode is on or available. The path may extend beyond the first sensing range. The portion of the path within the first sensing range may be optimised. Examples of optimisations include reducing/minimizing targets such as derivatives of velocity (acceleration, jerk) when steering the host vehicle 10. Cost functions or the like may be used to perform optimisations.

The speed control algorithm is for planning a required speed of the host vehicle 10 to be followed using the torque control actuators. The speed control algorithm may enable functions such as adaptive cruise control, overtaking speed boost, and lane changes. The speed control algorithm may also be for complying with a speed limit detected using road sign recognition or map data. The speed may be controlled in advance of traffic conditions beyond the first sensing range, indicated for example by the dynamic data. The speed control algorithm may determine a speed to maintain a required separation from a lead object and/or rear road user, i.e. a required headway, in accordance with adaptive cruise control methodologies.

The machine learning algorithm is for controlling one or more parameters of one or more of the other algorithms, in dependence on information indicative of past use of the host vehicle 10. The information may be indicative of past use of the host vehicle 10 in the autonomous mode and/or the non-autonomous mode. The information may be indicative of inputs such as steering inputs, acceleration inputs and braking inputs. The information may be indicative of environment characteristics. The information may be associated with information from the sensing means. The information may be associated with traffic conditions, road works or the like. The information may be indicative of locations of the past use. The information may be indicative of a temporal pattern of use of the host vehicle 10. For example, the times of the past use may have been recorded. The temporal pattern may enable locations visited at a recurring time and/or day and/or date to be established, such as a workplace. The information may be used for training of the machine learning algorithm. Machine learning enables an optimization of vehicle behavior for repeated journeys. Further, at least some of the parameters may be user-settable using HMI according to preference.

Whether a manoeuvre is performed may be subject to one or more manoeuvring constraints. If a manoeuvring constraint cannot be satisfied, the path planning algorithm may need to modify the manoeuvre or an abort condition for aborting the manoeuvre may even be satisfied. In an example, the abort condition may be satisfied when the cost of performing the manoeuvre is high. The abort condition may be satisfied when the cost of performing the manoeuvre is higher or a threshold amount higher than the cost of performing a different manoeuvre. If an abort condition is satisfied, the manoeuvre is not performed. The abort conditions may be checked just before performing the manoeuvre. An example check for satisfaction of the abort condition comprises continually detecting objects as described above. An object may render an intended manoeuvre or already planned path inappropriate. A static object obstructing the path may be such an object. Examples include roadworks or debris intersecting the path. Another road user, whether moving or not, may also render the manoeuvre or path inappropriate. The check may be dependent on an expected trajectory of the other road user relative to the planned path of the host vehicle 10. If the other road user is predicted to need to change its speed and/or course as a result of the manoeuvre by the host vehicle 10, the abort condition may be satisfied. The check may depend on detection of signals of intent from the other road users such as turn signals. If an abort condition is satisfied, the host vehicle 10 may remain in the autonomous mode and the speed and/or path may be re-planned accordingly.

In certain circumstances, the autonomous mode may need to hand control at least partially back to the occupant by switching to the non-autonomous mode. The non-autonomous mode may be entirely non-autonomous or may be less autonomous than the autonomous mode. The non-autonomous mode may require manual control or at least supervision by a human driver. The non-autonomous mode may comprise one or more driver assistance functions. For example, the non-autonomous mode may comprise at least one of the following functions: cruise control; adaptive cruise control; lane keeping assistance; braking assistance; overtaking assistance; parking assistance.

The control system 200 may be configured to receive at least one further signal indicative of a requirement to switch from the autonomous mode to the non-autonomous mode. The further signal may be indicative of a vehicle characteristic. The further signal may be indicative of a user characteristic. The further signal may be indicative of an environment characteristic. The further signal may be from the sensing means, or from another part of the control system 200 such as an algorithm that processes the map data and/or dynamic data.

The control system 200 may be configured to cause output of a user prompt signal in dependence on the further signal, for example if it is determined that a required highway exit junction approached by the host vehicle 10 is within a threshold driving time and/or distance. The user prompt signal may prompt the occupant to take an action to enable the host vehicle 10 to transition out of the autonomous mode. If the occupant takes the prompted action, the host vehicle 10 transitions out of the autonomous mode. If the occupant does not take the prompted action, the occupant may be determined to be non-responsive which is an internal hazard associated with the host vehicle 10, therefore the control system 200 may determine a requirement to stop the host vehicle 10 and cause the host vehicle 10 to stop accordingly. In some examples, the requirement to stop may be determined before the user prompt signal is output, for example in dependence on a vehicle characteristic, user characteristic and/or environment characteristic. For example, a failure of a vehicle component may have occurred or the occupant may be unconscious.

The user prompt signal may be presented to the occupant via HMI. The control system 200 may be configured to receive a user readiness signal from the occupant in response to the user prompt signal. The user readiness signal may be transmitted in dependence on user actuation of HMI or a vehicle control such as the steering wheel. In one example, the HMI comprises a plurality of input HMIs on the steering wheel. The input HMI may comprise buttons or any other appropriate means. The input HMIs may be located at left and right sides of the steering wheel with reference to a centred steering wheel, i.e. no steering lock applied. The input HMIs may be located such that at least one digit of each the occupant's hands can remain at least partially hooked over the circumferential tube-like member of the steering wheel, at 9 o'clock and 3 o'clock or 10 o'clock and 2 o'clock positions, when the input HMIs are actuated by the occupant's hands. The input HMIs may need to be pressed concurrently and/or for a threshold duration.

Additionally or alternatively, the user readiness signal may be transmitted in dependence on user actuation of a vehicle control such as the steering wheel, accelerator pedal or brake pedal. For example, turning the steering wheel or depressing the pedal by more than a threshold amount causes the user readiness signal to be transmitted. In other examples, the HMI could take any other appropriate form.

The control system 200 may be configured to determine whether a user readiness signal has been received within a predetermined period of time from the user prompt signal. For example, the predetermined period of time may be from the range approximately 10 seconds to several minutes, depending on the required trade-off between user reaction time and maximum autonomous mode driving time. If the autonomous mode is for highway driving only, the predetermined period of time may be longer, in the order of minutes rather than seconds. For example, the predetermined period of time may be two or more minutes. The predetermined period of time may depend on the level of autonomy of the host vehicle 10, and may be greater for level four than for level three. The predetermined period of time may vary in use in dependence upon the vehicle characteristic, the user characteristic and/or the environment characteristic. The predetermined period of time may be settable by the occupant although may not be below a minimum time. The control system 200 may be configured to output one or more reminder signals for presentation to the occupant via HMI, between transmitting the user prompt signal and receiving the user readiness signal. For example, the reminder signal may comprise at least one of an audible alert, a haptic alert, a visual alert. A characteristic of the reminder signals such as a frequency, volume, number of output HMIs employed, may vary for each subsequent reminder signal. In an implementation, the user prompt signal at 0 seconds causes an audible instruction, a first reminder signal at 20 seconds causes another audible instruction, and subsequent reminder signals at 30, 40, 50 seconds etc., each cause a combination of an audible instruction, and haptic pulses through the driver's seat and/or steering wheel.

The environment characteristic, vehicle characteristic and/or user characteristic may be as described above, wherein the user prompt signal is transmitted if one or more of the criteria described above are no longer satisfied. Additionally or alternatively, different environment characteristics, vehicle characteristics and/or user characteristics may be defined for the determination whether to transmit the user prompt signal.

Regarding the environment characteristic, the control system 200 may be configured to transmit the user prompt signal in response to a current or upcoming change of driving environment. The upcoming change may be within a threshold distance or driving time. The change may be caused by non-satisfaction of the road type criterion and/or weather criterion as described above. Additionally or alternatively the change may be caused by detection of one or more of: a traffic light on the road; a toll booth on the road; an off-ramp from the road for following a navigation route. The off-ramp may specifically be for leaving a highway onto a minor road, rather than for transitioning from one highway to another highway.

Regarding the user characteristic, the control system 200 may be configured to transmit the user prompt signal in response to a changed user characteristic. For example, the change may be caused by non-satisfaction of the awareness criterion and/or the physiological criterion. In an implementation, the user prompt signal may be transmitted if the occupant is drowsy or unconscious.

Regarding the vehicle characteristic, the control system 200 may be configured to transmit the user prompt signal in response to a changed vehicle characteristic. For example, the change may be caused by non-satisfaction of the detection range criterion or any other of the criterion or situations described earlier. Additionally or alternatively, the change may be caused by a determination of a fault with the host vehicle 10, which is defined as a type of internal hazard associated with the host vehicle 10. The fault may be caused by one or more of: power failure; communication failure; or sensing means failure. The power failure may comprise an electrical power failure such as a failure of the power supply and/or backup power supply. The power failure may comprise a mechanical power failure such as an inhibited availability of propulsive torque from the prime mover, which may be caused by the prime mover becoming inoperable or entering a limp home mode. The mechanical power failure may correspond to a failure of a drivetrain component such as the transmission or differential. The mechanical power failure may correspond to a failure of an actuator with a responsibility for the dynamic driving task in autonomous mode. The power failure may comprise failure of headlamps at night. The communication failure may comprise a failure of one or more of the electronic communication networks. The communication failure may comprise a failure of one or more controllers with a responsibility for the dynamic driving task in autonomous mode. The communication failure may comprise a failure of a domain controller. The sensing means failure may comprise a failure of one or more of the sensing means. The fault may trigger a determination that the host vehicle 10 is to stop. The user prompt signal may be transmitted to enable the occupant to control how the host vehicle 10 is stopped. The control system 200 may be configured to stop the host vehicle 10 without driver intervention.

Various methods will now be described for being performed during autonomous driving in the autonomous mode. At least some of the methods are in accordance with one or more aspects of the present invention. The control system 200 could be configured to implement one or more of the methods. Computer software could be configured to, when executed, perform one or more of the methods via the control system 200.

With reference to FIG. 3, FIG. 4, FIG. 5 and FIG. 6, there is provided a method 400, 500 for controlling the host vehicle 10 operable in the autonomous mode (and, in some examples, operable in the non-autonomous mode), the method comprising: determining 401, 501 a bifurcation of a first lane into a plurality of lanes; and causing 403, 515 control of the speed and/or direction of the host vehicle 10 as the host vehicle 10 approaches the bifurcation, in dependence on the processing.

For context, an example of a bifurcation on a highway is a transformation from a first number of lanes to a second number of lanes. Usually, this is accompanied by a widening of the upstream lane(s). A road user approaching a bifurcation is given a choice of multiple lanes for continuing on the highway. The multiple lanes are for remaining on the highway (at least past a proximal junction) and are not marked as off-ramps.

Another example of a bifurcation occurs at a re-opening of a closed lane following a hazard or roadworks. Traffic in the nearest adjacent lane may have a choice between remaining in their current lane or moving over to the now-reopened lane without signalling. For off-highway implementations, bifurcations may occur on minor multi-lane roads, junction lanes, etc. For example, bifurcations may occur on roundabouts to enable choosing between spiralling out from a centre of the roundabout or continuing around the roundabout.

A road with a bifurcation comprises a pre-bifurcation region, a bifurcation region and a post-bifurcation region. The pre-bifurcation region comprises any number of lanes for travel in a first direction. FIG. 3 illustrates a first lane 301 in the pre-bifurcation region. The post-bifurcation region comprises a greater number of lanes than the pre-bifurcation region. FIG. 3 illustrates a plurality of lanes 303, 305 in the post-bifurcation region. The plurality of lanes comprises a second lane 303 and a third lane 305. The bifurcation is a region in which it is difficult for the path planning algorithm to guide the host vehicle 10, due to an absence of lane boundaries and/or due to larger than expected lane widths.

The transition from the bifurcation region to the post-bifurcation region may be defined as a start location 307 of at least one of the plurality of lanes 303, 305. In FIG. 3 the start location 307 is denoted by a start of a road marking indicative of a lane boundary. The road marking indicative of a lane boundary is of the type that road users are forbidden to straddle. Therefore, manoeuvring should be completed upstream of the end of the bifurcation region, in other words before the host vehicle 10 reaches the end of the bifurcation region. Another example of a start location 307 is a location of a conversion from a first road marking that is not indicative of a lane boundary (e.g. short dashed line with a small segment-to-gap ratio) to a second road marking that is indicative of a lane boundary (e.g. long dashed line with a large segment-to-gap ratio).

The first and second road markings may be colinear, the only difference therebetween being a characteristic such as segment length, gap length, segment-to-gap ratio, paint colour and/or line thickness. Whether a road marking is indicative of a lane boundary depends on applicable highway law which associates the characteristics with specific meanings such as lane boundaries. The control system 200 may be configured to associate a road marking having a predetermined characteristic or characteristics with a lane boundary.

The lane boundary in FIG. 3 is the shared right edge of the second lane 303 and the left edge of the third lane 305. It would be appreciated that the lanes could be divided by other detectable means such as dividing strips or traffic barriers.

In some examples, the start location 307 may not be dependent on road markings. For example, the start location 307 could be defined as a location at which a closed lane reopens. This may be indicated by a road sign such as temporary road furniture such as a final traffic cone along a series of traffic cones, for example.

The bifurcation region extends upstream from the start location 307. The bifurcation region represents a space within which road users are permitted to alter their lateral positions to enter their preferred post-bifurcation lane. The width of the space may increase and may become greater than the width of the first lane 301, allowing a large amount of lateral movement. This may create a chance of overtaking or undertaking by other road users, particularly if the host vehicle 10 does not control its lateral position assertively in the manner of a human driver who knows where they are going.

The bifurcation region extends upstream from the start location 307 by a longitudinal distance D. D defines the length of the bifurcation region. The distance D may be sufficiently high for a given speed limit to enable road users to smoothly enter their preferred lanes without straddling post-bifurcation lane boundaries.

It may be unclear at what location the first lane 301 ends and the bifurcation region begins if there are no road markings or signs that would indicate such a transition. Therefore, the length of D may be a predetermined value associated with an assumed length of the bifurcation region. In other examples, D may be extend between the start location 307 and a known upstream reference location. D may be variable. D may depend on the specific bifurcation.

The start location and/or known upstream reference location may be indicated by map data/dynamic data. The known reference location may be a location at which the first lane 301 starts to widen, or some other indicator of the start of the bifurcation region. Other indicators include, for example, the location of a road sign or road marking warning drivers of the bifurcation and/or instructing them to get in lane.

In other examples, the start location 307 may be unknown and the known upstream reference location may be known. The parameter D may extend downstream from the upstream reference location. In a use case, the upstream reference location may correspond to a location at which a previously closed lane re-opens, as indicated by a last traffic cone or a road sign.

Figure 4:
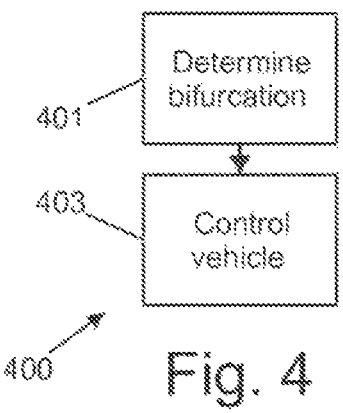
FIG. 4 illustrates an example of a method.

FIG. 4 illustrates a method 400. The method 400 comprises at block 401 determining a bifurcation of a first lane

301 into a plurality of lanes. A bifurcation may be identifiable in various ways. For example, the bifurcation may be indicated by metadata in the map data or dynamic data. A bifurcation may be identifiable by analysing features in the map data such as lane boundaries. A bifurcation may be identifiable using the sensing means; however, the bifurcation would have to be in the first sensing range so there would not be much time to perform the method and optimise the host vehicle speed/position. A bifurcation may be distinguishable from the data associated with the machine learning algorithm. Off-ramps may be an ignored type of bifurcation.

The method comprises at block 403 causing control of the speed and/or direction of the host vehicle 10 as the host vehicle 10 approaches the bifurcation, in dependence on the determined bifurcation. The awareness of the bifurcation means that the speed/direction can be controlled smoothly to avoid lane straddling or snapping into a lane in the post-bifurcation region, unwanted oscillations in the bifurcation region, or an unnecessary transition to the non-autonomous mode. The control may be performed by one or more of the output signals described above.

Figure 5:
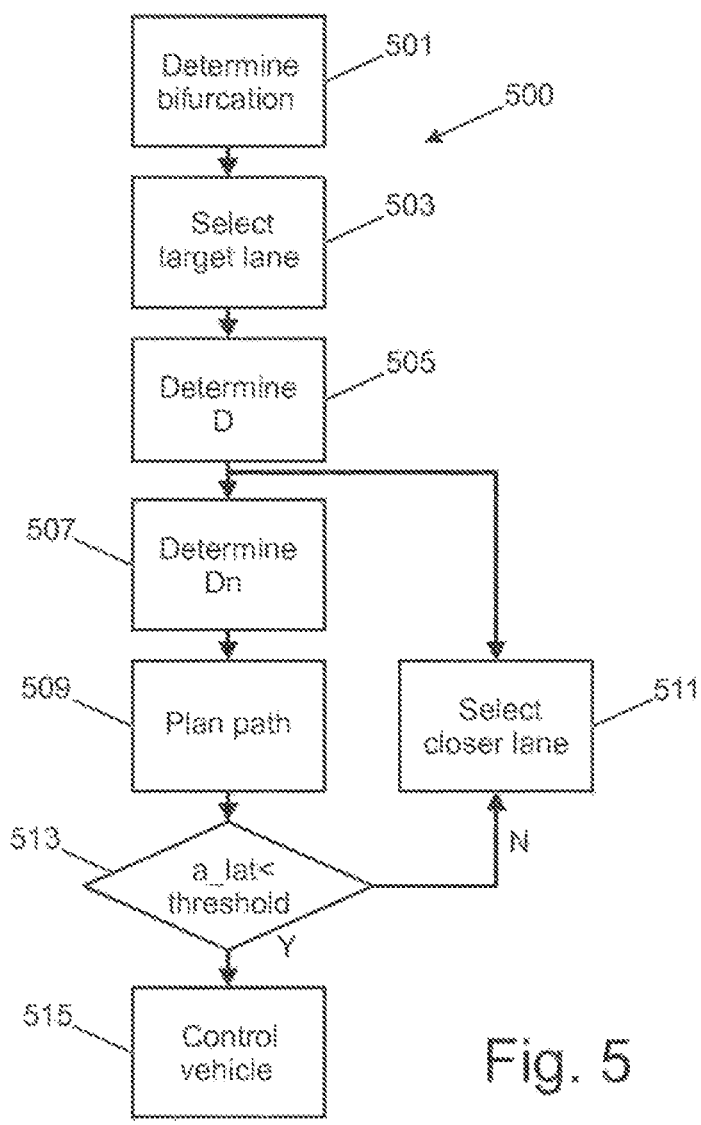
FIG. 5 illustrates an example of a method.

FIG. 5 illustrates a method 500. Block 501 is the same as block 401. Block 515 is the same as block 403. Blocks 501, 503, 505, 507, 509, 511, 513 and 515 represent a bifurcation control strategy. The bifurcation control strategy may be for enabling a particularly smooth manoeuvre through the bifurcation region. The particular strategy of FIG. 5 calculates the trajectory of the host vehicle 10 from the first lane 301 to one of the plurality of lanes for continued travel on the highway. If the trajectory does not exceed a lateral acceleration or jerk limit, the lane is selected as a target lane. If it does, the next lane is selected and the limit is checked again.

At block 503, the method 500 comprises selecting a target one of the plurality of lanes and planning a path to enter the target lane. That is, a single one of the plurality of lanes is selected as the target lane. The target lane may be selected from the map data. The target lane may be selected in dependence on a requirement to select a nearside available lane. The target lane may be selected by the nearside bias function. The requirement may be enforceable under applicable highway law. This prevents lane-hogging. In some examples, the target lane may be selected in dependence on a requirement to initially select a lane with the minimum lateral separation from the first lane 301, i.e. the closest available lane.

The lane may be non-selectable if it is not legally available, for example if the lane is a carpool lane or a public-transport only lane. The target lane may be selected in dependence on a navigation constraint.

The navigation constraint may require the target lane to be available for continuing along a planned navigation route. In an implementation, the target lane may be a most nearside available lane that enables the host vehicle 10 to continue along a planned navigation route.

At block 505, the method 500 comprises determining a longitudinal distance D to a start of at least one of the plurality of lanes. The at least one lane may be the target lane, at least to start with. The start location 307 and/or upstream reference location may be determined. The longitudinal distance D may be a fixed predetermined distance stored in the electronic memory device. For instance, D could be from approximately 10 to approximately 50 metres. In an implementation, D may be approximately 15 metres. The longitudinal distance D may be user-programmable. Alternatively, the longitudinal distance D may be dependent on the detected bifurcation. For example, the longitudinal distance D may be indicative of the distance from the known upstream reference location and the known start location 307 of the post-bifurcation region.

At block 507, the method 500 comprises determining a lateral distance (Dn or Dn1 in FIG. 3) from a lane position within the first lane 301 to a lane position within at least one of the plurality of lanes. The at least one lane may be the target lane. The lateral distance may be from a first target lane position between lateral edges of the first lane 301 to a second target lane position between lateral edges of the target lane. The first target lane position may be in the lane centre. The second target lane position may be in the lane centre. Or, one or both of them may be off-centre, but maintaining a required minimum separation from the lane boundaries. The control may be dependent on the determined lateral distance. The first and second target lane positions may be determined by the lane centring algorithm.

In an example implementation of block 507, the lateral distance Dn is determined from known or assumed geometric information concerning the road. Lane widths Lw may be taken into account. Lane widths may be detected or predetermined values, such as from the range approximately 2.5 metres to approximately 3.5 metres. In some examples, the lane widths may all be assumed to be the same width for computational efficiency.

One way of calculating Dn involves first calculating an offset of the target lane compared to the first lane 301. The offset could be calculated in various ways, for example using parameters. A first parameter may be a lateral separation of the first target lane position from a reference point. A second parameter may be a lateral separation of the second target lane position from the reference point. In some examples, determining the second parameter could involve adding a number of lane widths Lw corresponding to a lane number assigned to the target lane. For example, if the target lane is the fourth lane from the reference point, three lane widths Lw could be added and then half a lane width. To determine the lateral offset Dn required to enter the target lane, the difference between the first parameter and the second parameter may be determined.

At block 509, the method comprises planning a curve-shaped path of the host vehicle 10 from the first lane 301 to the target lane, for the host vehicle 10 to follow. The path may be dependent on the longitudinal distance D and the lateral distance Dn.

Figure 6:
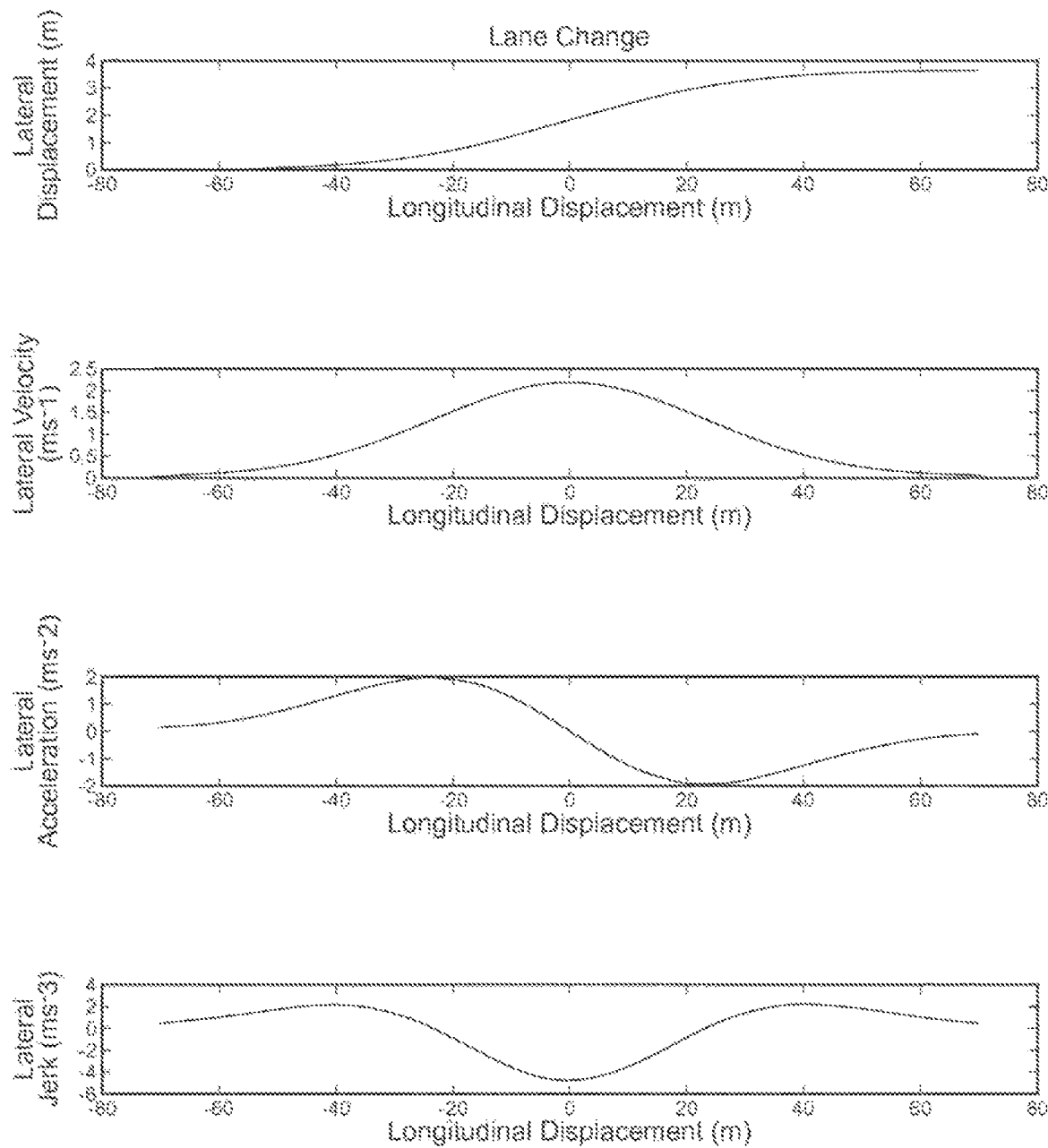
FIG. 6 illustrates an example of graphs of lateral position, lateral velocity, lateral acceleration and lateral jerk, of a vehicle.

An example path is shown in the top graph of FIG. 6. A first end of the curve may be colinear with a lane position within the first lane 301 such as the first target lane position. A second end of the curve may be colinear with a lane position within one of the plurality of lanes such as the second target lane position.

In FIG. 6, the y-axis distance from the first end to the second end of the curve may be Dn which may be a scalable value as described. The x-axis distance from the first end to the second end may be D which may be fixed or variable as described.

The curve between the first and second ends may be clothoidal or sigmoidal in shape. Other curves may be usable in some examples. The curve may be symmetrical in the manner of a normal cumulative distribution function (CDF). Alternatively, the curve may be skewed to achieve a specific rate of early or late steering or avoid anticipated obstructions such as a kerb when the road does not widen at a uniform rate.

The second, third and bottom graphs of FIG. 6 express the y-axis as lateral velocity, lateral acceleration and lateral jerk respectively. These are the first, second and third derivatives of lateral position with respect to longitudinal position. Notably, the path plan of FIG. 6 does not take into account vehicle speed. The lateral velocity, acceleration and jerk are with respect to longitudinal distance and therefore normalized by vehicle speed. In other examples, they may be with respect to time if expected vehicle speed is known and used in the calculation. Therefore, the lane selection at block 503 and block 511 could be dependent on expected vehicle speed. Dependence on vehicle speed may give more flexibility over lane selection in case vehicle speed is low, and less flexibility over lane selection in case vehicle speed is high.

It may be desirable to reduce lateral acceleration and/or jerk. Therefore, the method progresses to block 513 which checks one or more constraints associated with at least one of the above derivatives. In the specific example of block 513 as shown in FIG. 5, the constraint is associated with lateral acceleration. Block 513 checks whether the maximum lateral acceleration of the host vehicle 10 is below a threshold. The constraint could be pre-determined or a variable. The constraint could be speed-dependent. The constraint could be user-selectable. The constraint could be location-dependent, i.e. fixed for different bifurcations. The threshold could be from the range approximately 0.05 g to 0.2 g (if speed is considered) or a normalised equivalent (if speed is not considered).

If the derivative is not within the constraint, the method may perform block 511 and then loop back to between blocks 505 and 507 or earlier. At block 511, the method modifies at least one parameter that affects the derivative until the derivative is within the constraint. For example, the parameter may comprise lateral distance Dn, wherein Dn may be reduced. One way of reducing the lateral distance is to force the selection of another lane as the target lane, as shown in the illustrated example of block 511. This reduces the rate of change of lateral position, which therefore reduces the peak lateral velocity and the peak lateral acceleration and jerk. Another way may be to control the first target lane position and second target lane position.

Additionally or alternatively, the parameter to be modified may comprise vehicle speed, wherein vehicle speed may be reduced. The vehicle speed may be reduced with or without modifying the lateral distance.

Once the derivative is within the constraint, the method continues to block 515 which is the same as block 403. In some examples, the longitudinal distance D may be increased if legally permitted.

Many variations or adaptations to the method 500 of FIG. 5 are possible. For example, dynamic traffic data could affect lane selection. The constraint could be checked when approaching the bifurcation to see if a lower-than expected vehicle speed would enable a more nearside lane to be selected, than originally planned. The constraint could be omitted entirely. The criterion for selecting a lane may be different. For example, the initial target lane could be that which is laterally closest to the first lane 301 which may not be the most nearside lane.

Figure 7:
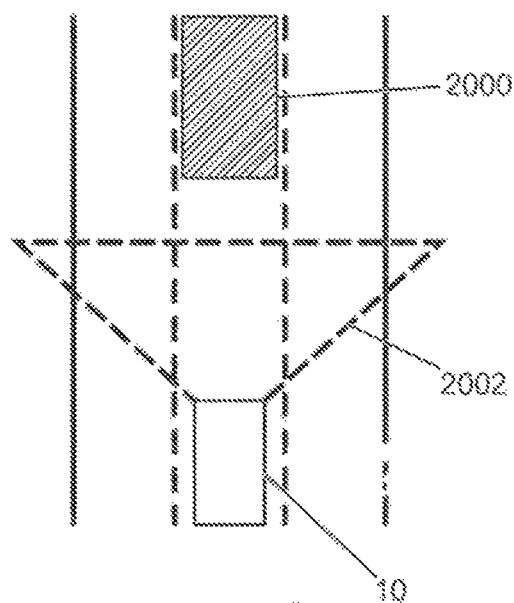
FIG. 7 illustrates an example of a host vehicle on a highway.
Figure 8:
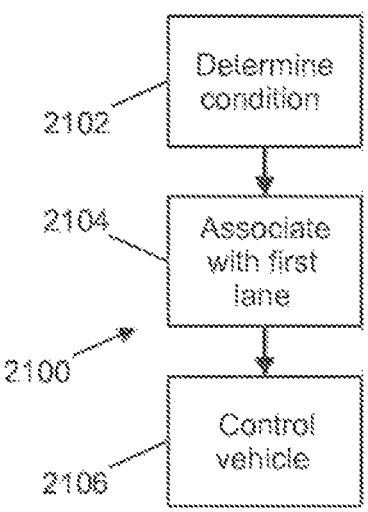
FIG. 8 illustrates an example of a method.
Figure 9:
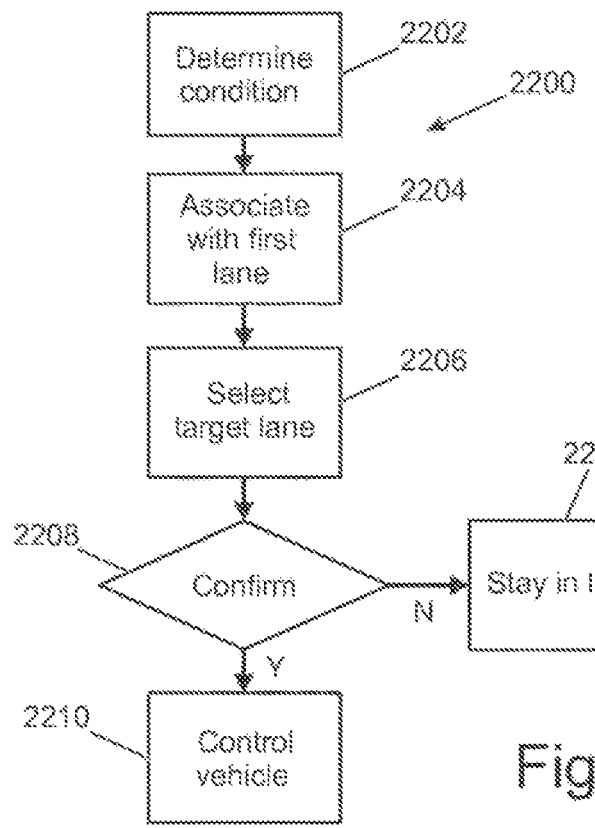
FIG. 9 illustrates an example of a method.

With reference to FIGS. 7 to 9, there is provided a method 2100, 2200 for controlling the host vehicle 10 operable in the autonomous mode (and, in some examples, operable in the non-autonomous mode), the method comprising: determining 2102, 2202 a traffic condition 2000, beyond a first sensing range of the host vehicle 10; associating 2104, 2204 the traffic condition 2000 with a first lane of a multi-lane highway comprising a plurality of lanes in a first direction including the first lane; and causing 2106, 2210 control of a direction of the host vehicle 10 before the host vehicle 10 reaches the location of the traffic condition 2000 to change lane from one of the plurality of lanes to another of the plurality of lanes of the multi-lane highway, in dependence on the traffic condition 2000 being associated with the first lane.

By way of context, on highways road users will try to change lanes earlier than they normally would to avoid or anticipate a traffic condition as soon as the driver has line of sight to the traffic condition and becomes aware of it. Often, they will increase their speed upon changing lanes, which unfortunately boxes in other road users in front of them who may wish to perform the same manoeuvre.

Vehicles in an autonomous mode are reliant on sensing means for performing a driving task and may not be capable of an earlier-than-normal lane change, causing them to react to the traffic condition later than human drivers.

Sometimes, autonomous vehicles may be in the optimum lane for a traffic condition, but they may not stay in the optimum lane. They may automatically leave the lane to overtake another road user, causing the vehicle to 'lose its place' in the traffic. The vehicle may have to try and push back in, disrupting traffic flow. Consequently, autonomous vehicles may get stuck in traffic and/or boxed in frequently and may disrupt the flow of traffic. The methods 2100 and 2200 disclosed herein alleviate these problems.

FIG. 7 illustrates an example operating scenario. The host vehicle 10 is in the autonomous mode and is on a highway. In FIG. 7 there are multiple available lanes for travel in the intended direction. A traffic condition 2000 is ahead of the host vehicle 10 in the same lane as the host vehicle 10. In other examples, the traffic condition may be in a different lane from the host vehicle 10. The traffic condition 2000 is beyond the first sensing range so is undetectable by the sensing means, and the traffic condition 2000 may also be beyond a line of sight of the occupant.

In some examples, the traffic condition 2000 may comprise a slower-moving or stationary traffic queue. In some examples, the traffic queue may be entering the lane, such as from a highway on-ramp. In some examples, the traffic condition 2000 such as the traffic queue may be associated with a junction. For example, the traffic queue may be caused by road users entering the lane from the highway on-ramp or the traffic queue may be for exiting the highway at a highway off-ramp. A traffic condition 2000 may not be determined if there is no traffic queue associated with the junction.

In some examples, the traffic condition 2000 comprises a closure of a lane, with or without a traffic queue. There may be no choice but to exit the closed lane.

FIG. 8 illustrates an example method 2100. At block 2102, the method comprises determining the traffic condition 2000. The traffic condition 2000 is beyond the first sensing range of the host vehicle 10. The traffic condition 2000 may be determined by processing any appropriate information that indicates traffic conditions beyond the first sensing range. For example, the information may indicate traffic conditions within the second farther sensing range. The information may be dynamic. The information may comprise the map data and/or dynamic data as described earlier. The information may comprise information associated with traffic from V2V or V2I communication. The dynamic data may be from a remote information source 302 as described earlier. The dynamic data may be substantially live and may be updated periodically as described earlier.

The dynamic map data may comprise information on lane closures as previously described. The dynamic traffic data may comprise information on traffic conditions such as traffic queues as previously described. The map data and/or dynamic map data may comprise information on traffic conditions such as lane closures. The location of the traffic condition may be determined.

The road signs may be permanent road signs. In some examples, road sign information comprises temporary signs such as lane closure warning signs, which are typically temporary and occur during roadworks and/or at certain times of day or in response to hazardous obstructions such as crashed vehicles.

The map data may comprise information on locations associated with junctions such as junction locations, on-ramp locations, off-ramp locations, or a combination thereof. The map data may indicate whether the on-ramp merges with an existing lane of the highway. The map data may indicate whether the on-ramp continues as an extra lane on the highway. The map data may indicate which existing lane of the highway becomes a lane of the off-ramp.

One of the above-described traffic conditions is a traffic queue. Not all traffic queues may be determined to be traffic conditions in block 2102. For example, the traffic queue may need to satisfy a severity condition to be determined as a traffic condition. Satisfaction could be determined in one or more ways by the host vehicle 10 or the provider of the dynamic traffic data. For example, the traffic speed or flow may need to be below a threshold. The traffic density may need to be above a threshold. Inter-vehicular distance may need to be below a threshold. The threshold(s) may need to be exceeded for more than a threshold distance (e.g. traffic queue length) and/or frequency. Travelling between two points on the highway may need to take an above-threshold journey time. A spatial and/or temporal change in one or more of these variables may need to indicate worsening conditions rather than improving conditions. For instance, traffic density ahead of the host vehicle 10 may need to be increasing relative to a current traffic density, rather than falling. Checking the above variable(s) ensures that a traffic queue is distinguished from temporary and normal fluctuations in traffic flow. This reduces the likelihood of false positives.

At block 2104, the method comprises associating the traffic condition 2000 with a first lane of the highway. The information may have sufficient resolution, granularity and/or detail to enable the traffic condition 2000 to be associated with a specific lane of a highway, as described earlier. Similarly, the information may be substantially live and updated frequently as described earlier. The first lane may or may not be the lane on which the host vehicle 10 is planned to travel by the path planning algorithm.

The traffic condition 2000 may need to be associated with fewer than all lanes in the first direction. In the case of lane closures, the information may indicate this directly by indicating which lanes are closed and/or which are open.

In the case of traffic queues, the control system 200 or provider of the dynamic data may be configured to determine a relative severity of the traffic condition 2000 associated with the first lane compared to other lanes in the first direction. If the difference in severity is not significant, no association with the first lane may be made and the method may terminate. For example, if a difference in severity is above a threshold for a subset of lanes to indicate increased traffic/queuing in the subset of lanes, the traffic condition 2000 may be associated with the subset of lanes. Alternatively or additionally, if the severity condition is satisfied for a subset of the lanes and not others, then the traffic condition 2000 may be associated with the subset of lanes.

In some examples, the method may further comprise associating the traffic condition 2000 with a junction. For example, the method may comprise determining the location associated with the junction. The method may compare the location associated with the junction with one or more locations associated with the traffic condition 2000. The method may determine that the traffic condition 2000, such as a traffic queue, starts before and ends at or not after the location associated with the junction. This association between the locations enables a determination to be made that the traffic queue is associated with the junction. When such an association is made, block 2204 may associate the traffic condition 2000 with the lane(s) determined to facilitate access to/from the junction. In the case of an off-ramp, the determination may be that a traffic queue in the first lane is for leaving the highway at the junction. In the case of an on-ramp, the determination may be that the traffic queue is on the first lane for allowing traffic on the on-ramp to enter the first lane, or even that the traffic queue is on the on-ramp itself.

At block 2106, the method comprises causing control of a direction of the host vehicle 10 before the host vehicle 10 reaches the location of the traffic condition 2000, in dependence on the traffic condition 2000 being associated with the first lane.

The control may cause the host vehicle 10 to change lane from one of the plurality of lanes to another of the plurality of lanes. In some use cases, the lane change may be to increase a separation from the first lane where the traffic condition 2000 is. The host vehicle 10 may change into a lane that is expected to have better traffic flow. In other examples, if the traffic condition 2000 is for leaving the highway at a junction and the navigation route leaves the highway at the junction, the lane change may be to get into the first lane or at least change lanes towards the first lane. The control may be performed by one or more of the output signals described above. In some situations, a lane change may not be necessary. For example, the host vehicle 10 may already be in the most advantageous lane.

The lane change may be performed earlier than normal. The lane change may be performed at a greater time and/or distance from the traffic condition 2000 than a lane change associated with the vehicle overtaking function.

In some examples, a parameter of the nearside bias function may be changed, such as the threshold time of the nearside bias function described earlier. The threshold time could be extended due to the association. This enables a lane change to an offside lane to be performed earlier than normal. If the lane change is to a nearside lane the lane change may be performed even earlier than the nearside bias function would require.

Additionally or alternatively, the earlier-than-normal lane change may be implemented by changing a parameter of the lane change algorithm. For example, the threshold size of an available space associated with the space availability signal could be varied. The threshold could be lowered to enable a more assertive lane change. It is therefore likely that the lane change will be performed earlier than normal.

In some examples, the earlier-than-normal lane change may be performed in dependence on a specific location of the traffic condition 2000. The specific location could be of the back of a traffic queue, a junction sign, or a lane closure warning sign, depending on the traffic condition 2000. Advantageously, the location could be of the first of several junction signs or the first of several lane closure warning signs, because attentive other road users tend to change lanes once they have seen the first sign rather than once the junction or closure is in sight.

The control may be implemented once the host vehicle 10 is within a threshold proximity (distance/time) to the location.

Once the host vehicle 10 has performed the required lane change, the method may optionally comprise inhibiting one or more parameters of the lane change algorithm, such as the vehicle overtaking function. The nearside bias function may be inhibited if the host vehicle 10 is in an offside lane. For example, the vehicle overtaking function may be inhibited from checking for at least certain opportunities to overtake other road users, if such manoeuvres would cause the host vehicle 10 to lose its advantageous position on the highway. An overtaking manoeuvre back into the lane that the host vehicle 10 just left may be inhibited. Leaving the lane may be inhibited in the situation where the first lane is for a junction off-ramp to be used by the host vehicle 10. Overtaking slower road users could be prohibited altogether, for example when the host vehicle 10 has entered a traffic queue in the first lane for leaving the highway at a junction. The inhibition may be removed once the traffic condition 2000 is passed by the host vehicle 10.

In some examples, the host vehicle 10 may be controlled between block 2102 and block 2106, or between block 2104 and block 2106, to make the lane change easier. For example, the host vehicle 10 may be controlled to seek or maintain a traffic position laterally adjacent a space in a neighbouring lane of an above-threshold size. In some examples, a traffic position may be sought with above-threshold sized spaces in both of the neighbouring lanes to either side of the current lane, if a direction of a lane change has not yet been decided.

FIG. 9 illustrates a method 2200. Block 2202 is the same as block 2102. Block 2204 is the same as block 2104. Block 2210 is the same as block 2106. The method 2200 selects a most appropriate lane to change to, at block 2206. The method 2200 reduces the impact of a false positive determination at block 2202/2204 by introducing a decision block 2208.

Block 2206 relates to a specific selection of another lane as a target lane for the lane change. Block 2206 is shown to be performed after block 2204, but not necessarily in all examples.

In a use case in which the traffic condition 2000 is to be avoided, a criterion for selecting a lane may be to reduce travel time. In one example implementation, the method may comprise selecting the target lane in dependence on a determination that traffic density, speed, flow and/or journey time in the another lane is more favourable than in a different one or more of the plurality of lanes such as the lane the host vehicle 10 is currently in or planned to be in.

In a use case in which the traffic condition 2000 is to not be avoided, such as joining a traffic queue for leaving a junction, the method may comprise selecting the target lane in dependence on a navigation constraint. The navigation constraint may be defined by the navigation route. The navigation constraint may require exiting the highway at a predetermined junction. If the traffic condition 2000 is determined to be for leaving the highway at the junction as described above, the selected target lane may be the lane or lanes that enable access to leaving the highway at the junction.

In some examples, the target lane selection may be constrained by one or more other constraints. One constraint may be from the nearside bias function which requires a nearside lane to be selected except for overtaking. Another constraint may be to avoid carpool-only or public transport-only lanes if the host vehicle 10 is not permitted to use such lanes.

Before the method progresses to from block 2206 to block 2208, preparatory steps may be performed. For example, the speed of the host vehicle 10 may be controlled in dependence on the space availability signal as described above, to find opportunities for a lane change. Indicator lights of the host vehicle 10 may be flashed. The lane position may be biased off-centre in the direction of the target lane.

The method 2200 progresses to block 2208. The lane change (block 2210) is performed in dependence on a confirmation at block 2208 of the traffic condition 2000. In an example, the confirmation may be performed by the host vehicle 10 using information from the sensing means of the host vehicle 10. The concept of verification from the short-range high-trust sensing mode (the sensing means) is described earlier. The verification may comprise, for example, checking the data from the sensing means to look for at least one feature associated with the traffic condition and expected from block 2202. The feature may define a trigger condition for the lane change. Example features are described above, such as the presence of the back of a traffic queue, a first lane closure warning sign, or a first junction sign.

In some examples, a plurality of said features and/or a change in at least one of the features is assessed by trend analysis. For example, falling traffic speed, rising density, or a combination thereof may be determined by trend analysis. This enables an early confirmation that the traffic condition exists, before the host vehicle 10 is sufficiently close to the traffic condition that satisfaction of the severity condition can be determined using the sensing means alone.

Alternatively or additionally to using the sensing means, the confirmation may be performed by the host vehicle 10 using information from communication with another road user proximal to the traffic condition. Such communication may be V2V. The another road user may be proximal to the traffic condition wherein the another road user comprises sensing means and the traffic condition is within the first sensing range of the sensing means of the another road user.

The back of the traffic queue may be detected by analysing the dynamics of other road users. For instance, a decreasing speed or decreasing inter-vehicular distance may be observed at around the expected location of the back of the traffic queue, in the first lane.

The lane change may be performed without delay upon verification, such as within about two seconds, to ensure that the host vehicle 10 reacts quickly and before other road users box the host vehicle 10 in.

If the feature associated with the traffic condition is not verified via the sensing means, the method may instead progress to block 2212 in which the host vehicle 10 stays in its current lane when it otherwise would have changed lane. This advantageously means that a false positive determination/association will not result in unexpected vehicle behaviour. This reflects that the dynamic data may not be a reliable indicator of traffic conditions compared to the sensing means. At block 2212, any lane changes are performed in the regular non-early manner, unaffected by the earlier determination and association steps.

Alternatively or in addition to performing blocks 2204 and 2206 before block 2208, blocks 2204 and 2206 may occur between blocks 2208 and 2210. This is to provide greater certainty, of which lane(s) are associated with the traffic condition and/or which lane to select. This is because the sensing means or V2V information from block 2208 may provide greater certainty that the dynamic data from block 2202.

Figure 10:
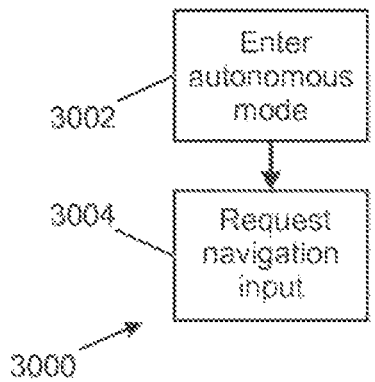
FIG. 10 illustrates an example of a method.
Figure 11:
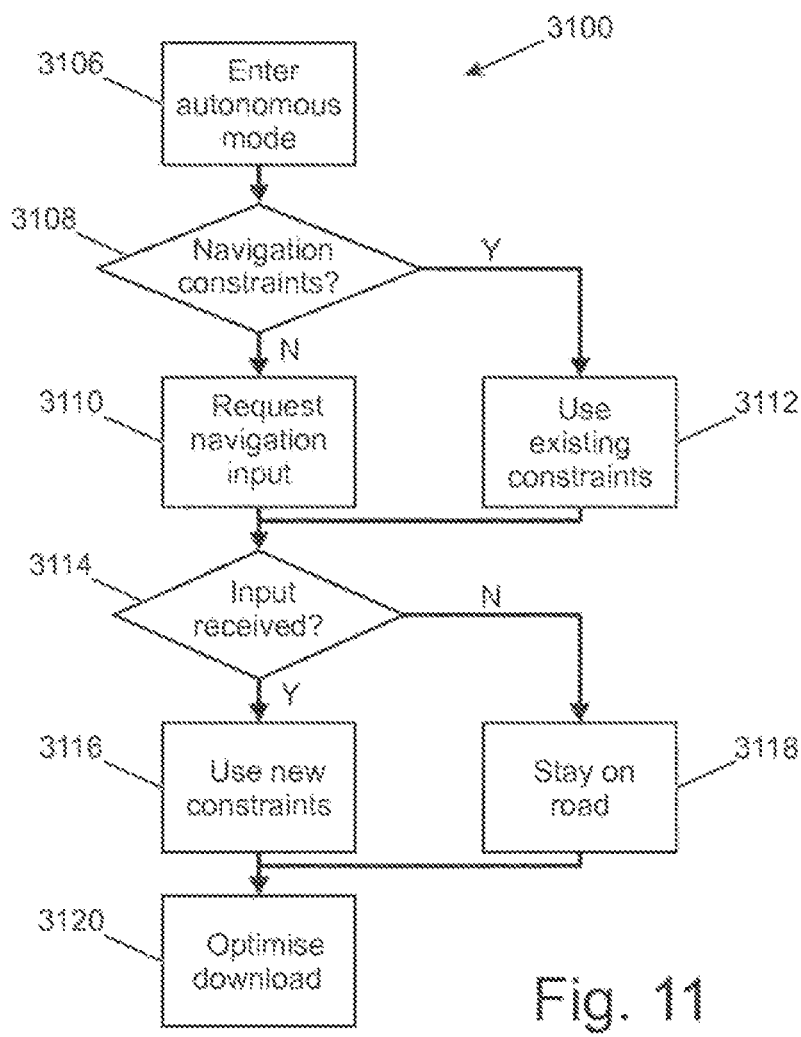
FIG. 11 illustrates an example of a method.

With reference to FIGS. 10 to 11, there is provided a method 3000, 3100 for controlling the host vehicle 10 operable in the autonomous mode (and, in some examples, operable in the non-autonomous mode), the method comprising: causing 3002, 3106 the host vehicle 10 to enter the autonomous mode in response to a user activation signal during driving of the host vehicle 10; and in dependence on the user activation signal, causing 3004, 3110 a request for user navigation input from an occupant of the host vehicle 10.

By way of context, in the autonomous mode the occupant may not be required to keep one or more hands on the steering wheel as mentioned earlier. Further, driver distraction function criteria may be inhibited. Therefore, requesting the user navigation input after the user activation signal, rather than before the user activation signal, advantageously enables the occupant to take their hands off the steering wheel and/or look away from the windscreen to make the requested user navigation input, if permitted by the autonomous mode.

FIG. 10 illustrates the example method 3000. At block 3002, the method comprises causing the host vehicle 10 to enter the autonomous mode in response to a user activation signal during driving of the host vehicle 10. The user activation signal may be as described earlier. The user activation signal may have been received in response to the availability signal as described earlier. Causing the host vehicle 10 to enter the autonomous mode may comprise implementing the transition phase as described earlier. Once the transition phase is complete, the control system 200 controls the host vehicle 10 in the autonomous mode.

At block 3004, the method comprises causing a request for user navigation input from an occupant of the host vehicle 10, in dependence on the user activation signal. The occupant may be the driver. The request for user navigation input may be performed once the host vehicle 10 has entered the autonomous mode, for example the request may be output once the transition phase is complete.

Accepted user navigation inputs may comprise navigation constraints. For example, the requested user navigation input may comprise a location. The location may comprise at least one of: a destination; or a waypoint.

In some examples, the location may comprise a location associated with transitioning from the autonomous mode to the non-autonomous mode. The location associated with transitioning from the autonomous mode to the non-autonomous mode may be a location at which the above-described further signal indicative of a requirement to switch from the autonomous mode to the non-autonomous mode is expected to be received. For example, the location associated with transitioning from the autonomous mode to the non-autonomous mode may be indicative of a change of driving environment. The change of driving environment may comprise a change from a highway to another category of road. The change of driving environment may comprise a junction. The junction may comprise an off-ramp to be used for following a navigation route. This may be advantageous if the autonomous mode is not available for a whole journey, for example if it is only available for the highway portions of a journey.

In some examples, the requested user navigation input may comprise a navigation route. For example, the route may comprise a route to avoid. The route may comprise a route to select from a plurality of available routes for reaching a location.

The request may take the form of an HMI prompt. For example, the request may be presented on a display that is normally used by the navigation subsystem, such as the centre console display or instrument cluster display. The request may be presented subtly such that existing functions displayed on the display are not concealed. For example, if the request is displayed proximal to an area of the display presenting a function such as a map, the request presentation may not overlie the area or may be at least translucent. The area may be resized to accommodate the request. This means that if the occupant is reliant on the function such as the map and does not wish to make a user navigation input, the request is less likely to impair the occupant's use of the function and therefore distract them.

A user navigation input made in response to the request may comprise a confirmation response that a specific user navigation input will be made, for example a one-touch press of a touchscreen user interface element or a voice command. This may update an HMI to a state for receiving the specific user navigation input. For example, a navigation interface may then be presented.

Alternatively, the request itself may comprise the navigation interface, so the occupant can make a specific user navigation input immediately. In this example, the specific user navigation input is the confirmation response.

The navigation interface may enable a location to be entered. The navigation interface may enable locations to be searched using one or more keywords. The navigation input may be configured to receive a user navigation input that specifies the relevant location, route, etc.

The request may time out if no user navigation input is received within a predetermined time. The predetermined time may be in the order of seconds or minutes. A user navigation input before the timeout may require fewer user inputs and/or simpler user inputs and/or provides a larger area of an input device, e.g. touchscreen, in which to make user inputs, compared to the situation in which a user navigation input is made after the time out.

If the request times out, an alert may be transmitted to the occupant via HMI, e.g. alerting them that the host vehicle 10 in the autonomous mode will stay on a current road unless or until a user navigation input is received.

If the further signal indicative of a requirement to switch from the autonomous mode to the non-autonomous mode is received, the request may be removed from the HMI in dependence thereon.

The method may make suggestions to assist with making a user navigation input. The method may comprise processing information indicative of a pattern of use of the host vehicle 10. The information may be from the machine learning algorithm as described earlier. The pattern of use may comprise a single past journey of the host vehicle 10 or a plurality of past journeys of the host vehicle 10.

The method may suggest one or more locations and/or routes.

At least one of the suggestions may be dependent on processing information indicative of a user schedule.

Information indicative of a user schedule may comprise, for example, calendar information. The calendar information may comprise events. The events may comprise metadata such as location metadata. Location metadata may include a direct location reference such as a geographical address, or a location may be inferred from other metadata. For example, if an event is marked as 'holiday' or 'work from home', suggestion of a workplace location may be inhibited.

The information indicative of a user schedule may have been input into the host vehicle's infotainment system. In some examples, the host vehicle 10 may obtain the information from a user electronic device via a connection of the host vehicle 10 to the user electronic device. The user electronic device may be a mobile phone or the like. In some examples, the host vehicle 10 may obtain the information from an off-board service (e.g. calendar app) subscribed to by the user, via telematics.

At least one of the suggestions may be dependent on processing information indicative of a pattern of use of the host vehicle.

The temporal information indicative of a temporal pattern of use of the host vehicle 10 may be used. The suggested one or more locations may comprise a location toward which the host vehicle 10 is travelling. The locations may be ones which the host vehicle 10 has been to before. The suggested one or more locations may comprise a location visited at a recurring time and/or day and/or date. The suggested one or more routes may comprise a route towards or along which the host vehicle 10 is travelling, and/or has travelled before.

In an example, the method may comprise determining that the host vehicle 10 has travelled from point A to point B and is now travelling back from point B to point A. This may be indicated by the direction and/or route of the current journey compared to the direction and/or route of the last journey, or the last journey(s) starting from point A. In some examples, point A may be a default location, marked in the map data by metadata such as 'home'.

The suggestion may be influenced by a machine learning tool such as probabilistic forecasting. Different locations may be assigned different probabilities. The probability is a probability that the host vehicle 10 is heading towards that location. The probability may be determined by one or more parameters such as whether the host vehicle 10 is travelling towards or away from a location (i.e. direction); a route followed by the host vehicle 10; the time; the day; the date; or who is detected to be driving the host vehicle 10. Each parameter may define a probability score for each location based on the pattern of past use of the host vehicle 10. The location with the highest combined probability score may become a suggested location. For example, if the current day is a weekday, the time is before 9 am, and the host vehicle 10 is heading towards a location most frequently travelled to on weekdays before 9 am, that location may be suggested. The location may likely be a workplace. The location with the highest probability may be the only suggested location or may be more prominently presented than other locations. The probability scores may be weighted, for example based on age. Older information may comprise a lower weighting so that the host vehicle 10 will adapt to changes such as moving house or workplace.

At least one of the suggestions may be dependent on processing information pushed from a third-party service. The third-party service may comprise an advertising service, an events service, or a combination thereof. Therefore, the user may be presented with suggestions to travel to relevant events or venues.

The user navigation input may take the form of the confirmation response confirming at least one suggested location/route.

An option to manually enter a location/route may be presented alongside the one or more suggestions or if no confirmation is received, in case the suggestion(s) do not correspond to the user's intentions.

FIG. 11 illustrates a method 3100. Block 3106 is the same as block 3002. Block 3110 is the same as block 3004. The method 3100 defines an example detailed implementation of the method 3000. The method 3100 also optionally comprises an additional function of optimising a download of dynamic data, at block 3120.

Upon entering the autonomous mode at block 3106, block 3108 comprises determining whether navigation constraints have already been determined for a current journey of the host vehicle 10. The navigation constraints may comprise a navigation route. The navigation constraints may be in response to an earlier user navigation input.

Determining whether navigation constraints are already in use may comprise determining whether the host vehicle 10 is actually obeying the navigation constraints. For example, if the host vehicle 10 is off-course the occupant may have decided not to follow the navigation route.

Block 3108 may be performed before or after block 3106.

The determination of block 3108 may be positive ('Y' in FIG. 11) if navigation constraints are currently set in the navigation subsystem. In some examples, it may further be required that the navigation constraint is actually being obeyed as mentioned above. If the determination is positive, the existing navigation constraints are used for the autonomous mode, at block 3112. If the determination is negative, the method progresses to block 3110 to request the user navigation input. The request may be in the manner described above.

At block 3114, it is determined whether the user navigation input has been received in response to block 3110. The determination may be positive if a sufficient user navigation input has been received to enable a new navigation constraint to be defined, such as a navigation route. In response to a positive determination, the method proceeds to block 3116 in which new navigation constraints, defined in dependence on the user navigation inputs, are used for the autonomous mode. In response to a negative determination, the method proceeds to block 3118 in which the autonomous mode causes the host vehicle 10 to remain on a highway on which the host vehicle 10 is currently driving until handover to the non-autonomous mode. This may be accompanied by an alert as described above.

The method 3100 optionally comprises block 3120, which comprises optimising a download process. This is described below.

Figure 12:
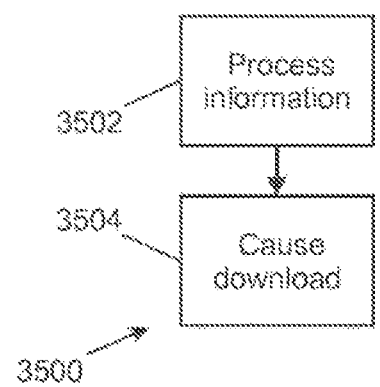
FIG. 12 illustrates an example of a method.

With reference to FIGS. 11-12, there is provided a method 3500. The method 3500 may be an example sub-routine for performing block 3120 of FIG. 11 or may be independent from the methods of FIGS. 10 and 11. The method comprises processing 3502 information indicative of a pattern of use of the host vehicle 10; and causing 3504 downloading of dynamic map data and/or dynamic traffic data from a remote information source 302 in dependence on the processing.

By way of context, at least some dynamic data may need to be updated (downloaded) sufficiently frequently that it is unlikely that the download can always be performed while the host vehicle 10 is parked using a short-range communication network. Therefore, at least some downloads may need to be performed while the host vehicle 10 is in a travelable state. The download may be performed while the host vehicle 10 is being driven in the autonomous mode and/or the non-autonomous mode. The download may be at least partially over a cellular network.

Unfortunately, cellular networks have locations and/or times of inhibited connectivity. Service blind spots may occur in locations such as tunnels or mountainous regions. Quality of service can also drop at peak times. The host vehicle 10 may have limited opportunities to perform the download. In extreme cases, a very high proportion of the host vehicle's service life will be spent driving through blind spots of cellular coverage. Without frequent downloads, some autonomous mode features may become unreliable, such as the algorithms described earlier that utilise dynamic data (e.g. lane centring algorithm, nearside bias function, path planning algorithm, etc.). If the download were attempted at predetermined times, it would be unlikely that any predetermined time would correspond with a time when the host vehicle 10 has a good likelihood of success of completing the download. Therefore, by performing the download in dependence on the pattern of past use of the host vehicle 10, the chance of success of the download is improved.

At block 3502, the method 3500 comprises processing information indicative of a pattern of use of the host vehicle 10. At least some of the information may be as described earlier, for example in connection with the machine learning algorithm and/or block 3004 of FIG. 10.

The information indicative of a pattern of use of the host vehicle 10 may comprise driving information associated with past driving of the host vehicle 10. Relevant driving information includes at least one of: past routes of the host vehicle 10; past locations at which the host vehicle 10 has previously been; past speeds of the host vehicle 10; the temporal pattern of use of the host vehicle 10; or the like. Example locations may comprise individual map positions, areas such as cells or communities, or sections of roads. Example temporal pattern information may record the times of past use of the host vehicle 10. The temporal pattern information may bin the times into distinct time bins (intervals).

The information may be indicative of a pattern of use of the host vehicle 10 associated with other tasks, such as downloading the dynamic data. The information may comprise download information indicative of one or more past download attempts. The past download attempts may comprise attempts to download/update the dynamic data. In some examples, the past download attempts may comprise downloads/updates of other software components, to expand the available training dataset. In some examples, the past download attempts may comprise test downloads of arbitrary payloads, to expand the available training dataset.

Block 3502 may comprise a training phase. Block 3502 may comprise a task phase. Block 3502 may comprise both a training phase and a task phase.

The training phase may produce and/or update a set of training data. The training phase may correlate download information with driving information. The training phase gathers useful download success/failure statistics which enables the task phase to be performed more accurately, and efficiently due to fewer attempts.

For example, as new/updated download information is received, it may be binned into a location bin (position, area or route section) associated with the download information to update the training data. Additionally or alternatively, the download information may be binned into a time interval bin associated with the download information to update the training data. The training phase may be performed on an ongoing basis during the service life of the host vehicle 10. The training phase may be performed on-board the host vehicle 10, or off-board in a cloud system, another vehicle, or any other server. Off-board training data may be acquired by the host vehicle 10 via V2V or V2I communication.

In an example implementation, the download information may indicate a time and/or a location at which a condition associated with downloading the dynamic data is not satisfied. The condition may be associated with one or more characteristics of the past download(s). Example characteristics may include one or more of: availability of cellular network coverage at the particular time or location; an indication of one or more past successful downloads at the particular time or location; or a characteristic indicative of a time taken to perform the download, at the particular time or location. The characteristics are therefore indicative of a quality of service.

A characteristic indicative of one or more past successful downloads may comprise an indication of whether a download completes successfully. A characteristic indicative of a time taken to perform the download may comprise an indication of a rate of data transfer, a cumulative time taken of the download, a number of retries of the download, or a combination thereof. A characteristic indicative of availability of cellular network coverage may comprise an indication of a number of users of a cell associated with the download (cell traffic), a signal strength of a connection to the cell, an error rate, or a combination thereof. The cell may be a current cell and/or one or more expected cells along a navigation route of the host vehicle 10.

For example, the condition may not be satisfied if the download fails to complete successfully; if a rate of data transfer is below a threshold; if an error rate is above a threshold; if a number of users of a cell associated with the download is too high; if a number of retries of the download exceeds a threshold; if the time taken to perform the download exceeds a threshold; or a combination thereof.

The download information may be associated with the host vehicle 10 and/or with another vehicle which downloaded dynamic data. The use of information from other vehicles enables sharing of download statistics (training data of other vehicles), to provide better training data.

During the training phase, certain times and/or locations may be associated with frequent non-satisfaction of the condition. The association may be defined as an above threshold number of non-satisfactions of the condition for that time/location. The threshold may be absolute or relative to other times/locations. In an example, the association may be defined as a higher relative number of non-satisfactions of the condition compared to other times/locations. The download should not be attempted in such locations and/or at such times. A relative threshold beneficially provides a degree of optimization, if the download has to be performed within a set time.

Additionally or alternatively, the correlation may comprise determining a time and/or a location at which the condition is satisfied. The association may be defined as a below-threshold number of non-satisfactions of the condition for that time/location. The download should be attempted at these times/locations.

The task phase may comprise applying at least the training data to a download scheduling process, such that the dynamic data download is scheduled in dependence on the prediction phase.

In some, but not necessarily all examples, the task phase may comprise applying both real-time information and the training data to the download scheduling process. Real-time information may be associated with current or expected values of the training data, such as the cell traffic. The real-time information may be obtained by the host vehicle 10 from a third party by V2V or V2I communication.

The download scheduling may be performed on-board of off-board the host vehicle 10 similarly to the training phase, depending on whether the download is performed using a push or a pull approach. There are various ways in which the training data could be applied to a download scheduling process, discussed below.

In an implementation, the training data may control when/where the host vehicle 10 is in a first mode which permits downloads. The information may control when/where the host vehicle 10 is in a second mode which inhibits downloads. In one example, in the second mode a download may continue, be paused or cancelled if it is underway, but cannot commence if it is not already underway. A download may commence or un-pause when entering the first mode.

If the download is performed according to a push approach, push messages from the external information source may be rejected or ignored when/where the second mode is active. Push messages may be accepted when/where the first mode is active.

If the download is performed according to a pull approach, no pull messages may be sent to the external information source when/where the second mode is active. Pull messages may be sent when/where the first mode is active.

In an example implementation, the training data may be used to assign triggers for transitioning between the first mode and the second mode.

The trigger may comprise a location. For example, the training data and/or the real-time information may indicate that the condition is not satisfied or satisfied at specific known location(s). The known location is a download blind spot if the condition is not satisfied. The download blind spot may comprise an area or section of a road/route such as a tunnel or an area/cell associated with a low likelihood of download success, such as a high (above-threshold) demand area/cell.

The trigger for switching to the second mode may comprise a first location. The first location may be proximal to the known location such as proximal to an entry to the blind spot, for example the tunnel entrance.

The trigger for switching to the first mode may comprise a second location. The second location may be proximal to a known location such as proximal to an exit from the blind spot, for example the tunnel exit.

If only one of the first location or the second location corresponds to a known location from the training data, the other location may be a predetermined assumed distance from the known location.

The trigger may comprise a time. For example, the training data and/or the real-time information may indicate that the condition is not satisfied or satisfied at specific known times. For example, the network service is poor if the condition is not satisfied and good if the condition is satisfied. The network service may be poor between specific known times such as 6 pm-10 pm.

The trigger for switching to the second mode may be a first time. The first time may be proximal to the known time such as proximal to 6 pm.

The trigger for switching to the first mode may be a second time. If the network service is good after 10 pm, the second time may be proximal to the specific known time for good network service. If only one of the first time or the second time corresponds to a known time from the training data, the other time may be a fixed period from the known time.

The trigger may be dependent on both time and location. For example, the download may commence at a first location but not a second location if the host vehicle 10 is at the first location at a first time, but may not commence at the first location if the host vehicle 10 is at the first location at a second time. At the second time, a different location such as the second location may be more appropriate, or no location may be appropriate.

In some implementations, the scheduling of the download may be dependent on a specific journey. The journey may be a known journey or an expected journey. The journey may be a known journey if the occupant has already entered user navigation inputs to define a journey. The journey may be an expected journey when the navigation system has not yet received a user navigation input.

An expected journey may comprise an expected route, destination and/or timing of use of the host vehicle 10. The prediction could use the machine learning tool described above to predict the expected journey, for example. The training data may be interrogated for download information that applies to the expected journey. In an example, the location(s)/time(s) for the expected journey may correspond to some location(s)/time(s) for which download information is available. Then, a start time of the download may be scheduled for a specific location/time along the expected journey.

If the journey is a known journey, the process may be as described above except the prediction of the expected journey is not required.

If the journey is one that the occupant regularly makes, such as a commute, a large amount of download information may be available for that journey, so the method can be performed accurately. In an example, the temporal pattern information may indicate that the occupant completes a journey from location A to location B between the hours of 07:00 and 09:00 on weekdays, and a return journey from location B to location A between the hours of 17:00 and 19:00 on weekdays. Past download statistics indicate that condition is satisfied at a particular section of the route between locations A and B, or a return journey.

In some examples, the download schedule may be constrained by one or more scheduling constraints. An example scheduling constraint could implement a lower limit on update frequency, for example. The limit could be a time limit, a number of ignored push requests, a number of inhibited pull requests, or the like. The download schedule may need to operate within the scheduling constraints.

If the processing in block 3502 indicates that a scheduling constraint cannot be met, the download may be attempted immediately or scheduled for a time/location normally associated with the second mode just in case the download works. In some examples, if the scheduling constraint is not met, a notification may be provided to the occupant (via HMI for example) that the dynamic data may be out-of-date. The notification may recommend that the update may be performed by other means such as by connecting to a reliable network, e.g. wired connection or wireless local area network.

The dynamic traffic data download may differ from the dynamic map data download in various ways. The dynamic traffic data may be updated at a different rate from dynamic map data. For example, the dynamic traffic data may be updated more often than the dynamic map data.

In some examples, the update frequency of dynamic traffic data may be in the order of minutes. In some examples, the update frequency of the dynamic traffic data may be in the order of hours.

However, the update frequency of dynamic map data may be in the order of days. In other examples, the update frequency of the dynamic map data may be more regular (e.g. hours), or less regular (e.g. months).

In some examples, each dynamic traffic data download may have a different file size from each dynamic map data download. Optionally, the scheduling of the dynamic traffic data may therefore differ from the scheduling of the dynamic map data. The thresholds for satisfaction of the condition associated with downloading the dynamic data may differ. The trigger may differ. The scheduling constraints may differ. The planned start time/location of the download may differ.

At block 3504, the method comprises causing the download from the remote information source 302 in dependence on block 3502. For example, the download may commence upon occurrence of the required trigger.

A download may be scheduled predictively, for example the start time of the download may have been scheduled to start at a future time/location, based on when/where the host vehicle 10 is expected to be in the first mode. Alternatively, a download may be scheduled reactively, for example certain times/locations may be unavailable for download while the host vehicle 10 is in the second mode, without scheduling a particular download start time.

The manner of the download may be as described earlier in connection with the telematics control unit 304.

In the preceding examples, the output signals (i.e. speed/direction of vehicle) of the autonomous mode are not controlled in dependence on block 3502. In other examples, the method may comprise controlling one or more of the output signals in the autonomous mode, in dependence on block 3502. For example, the host vehicle 10 may be slowed to allow more time to complete a download. The host vehicle 10 may follow or avoid a particular route in dependence on a likelihood of success of the download.

In the preceding examples, the download scheduling is dependent at least on information indicative of past use of the host vehicle 10 and/or indicative of downloads. Additionally, the download scheduling may be dependent on map data. The map data may indicate one or more locations associated with poor network coverage. For example, the map data may indicate the locations of tunnels. The map data may indicate the locations of valleys or mountainous areas.

The download scheduling may even be dependent on weather data indicative of weather proximal to the vehicle/route/location/time, as there is a correlation between SOTA download success and atmospheric conditions. Certain weather conditions may trigger the second mode.

Although the principles described above are for dynamic data for use in the autonomous mode, at least some of the principles are applicable to the download of other software components.

Figure 13:
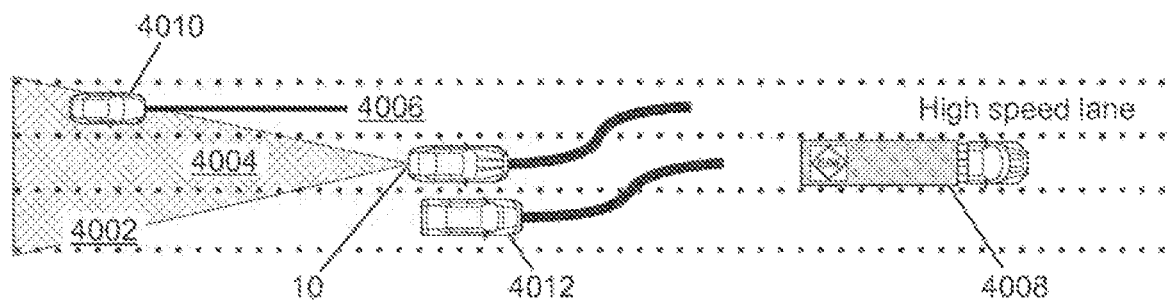
FIG. 13 illustrates an example of an overtaking manoeuvre.
Figure 14:
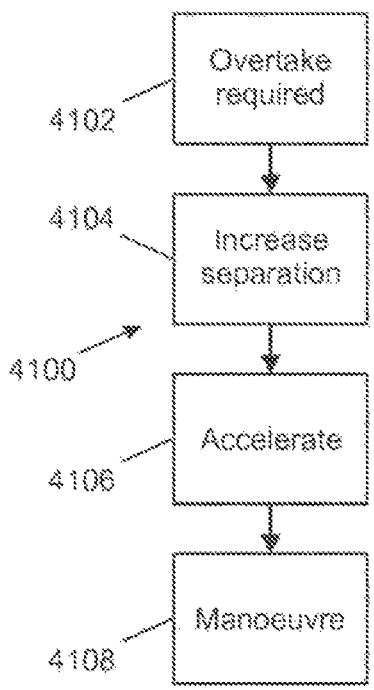
FIG. 14 illustrates an example of a method.
Figure 15:
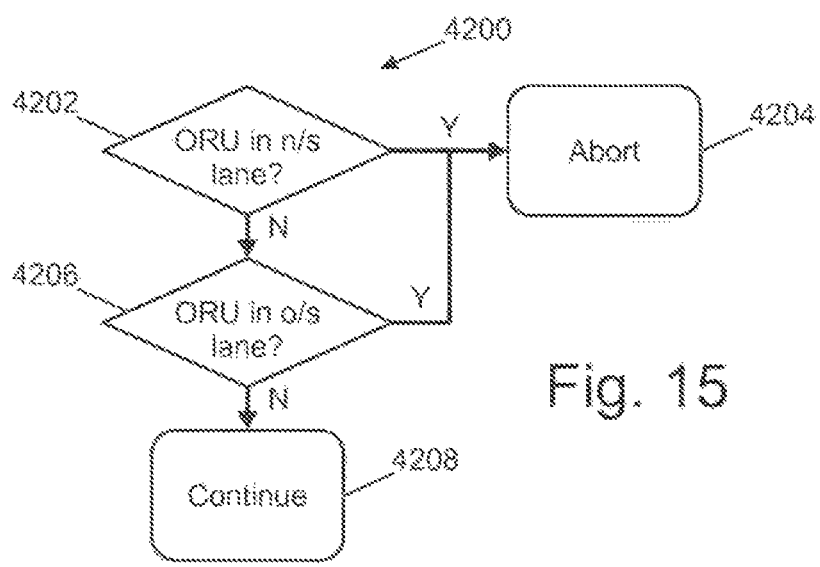
FIG. 15 illustrates an example of a method.

With reference to FIGS. 13 to 15, there is provided a method 4100, 4200 for controlling the host vehicle 10 operable in the autonomous mode (and, in some examples, operable in the non-autonomous mode), the method comprising: determining 4102 a requirement for the host vehicle 10 within a first lane 4004 to manoeuvre into a second lane 4006 to overtake a road user 4008; causing 4104 an increase of separation of the host vehicle 10 from the road user 4008 in dependence on the determination; subsequently causing 4106 acceleration of the host vehicle 10 towards the road user 4008, such that the host vehicle 10 achieves a higher speed than the road user 4008; and causing 4108 a manoeuvre of the host vehicle 10 into the second lane 4006 to perform the overtake. The second lane 4006 may be for travel in the same direction as the first lane.

By way of context, consider for example the use case of FIG. 13. The host vehicle 10 in a first lane 4004 needs to overtake another road user 4008. The other road user 4008 may be at least partially in the first lane 4004 or entering the first lane 4004 downstream of the host vehicle 10 and may be travelling slower than the host vehicle 10. The overtake requires a manoeuvre into the second lane 4006. The second lane 4006 may be an offside lane for higher speed vehicles. Overtaking on the inside, i.e. in a third nearside lane 4002, may be prohibited, or not in other examples.

Some vehicle overtaking functions may commence acceleration after the manoeuvre. It would be beneficial if the host vehicle 10 could be at a desired speed when entering the second lane 4006, to match speeds and not inconvenience other road users.

Further, some prior vehicle overtaking functions may commence acceleration without first increasing the separation to the other road user 4008. The increase in speed that can be achieved is therefore less due to the limited available acceleration space behind the road user 4008 to be overtaken.

Further, some vehicle overtaking functions fail to protect their 'slot' in a line of traffic in the first lane 4004 in case of a late abort of the manoeuvre. As shown in FIG. 13, a road user 4012 in the third (nearside) lane 4002 may enter the former slot of the host vehicle 10 in the first lane 4004 as soon as the host vehicle 10 has started the overtaking manoeuvre. Consequently, late-aborting the overtaking manoeuvre may be difficult to negotiate.

The present methods seek to alleviate at least some of the above problems. The present methods of FIGS. 14 and 15 may be implemented as a sub-routine of the lane change algorithm and/or the vehicle overtaking function, in an example.

The method 4100 comprises, at block 4102, determining a requirement for the host vehicle 10 within a first lane 4004 to manoeuvre into a second lane 4006 to overtake a road user 4008.

Determining the requirement to overtake the road user 4008 may comprise detecting the road user 4008. The road user 4008 may be detected to be in the planned path of the host vehicle 10 downstream of a current location of the host vehicle 10. The road user 4008 may be travelling in a same direction as the host vehicle 10. The road user 4008 may be in a field of view of one or more front sensors of the sensing means. The road user 4008 may be at least partially in the first lane 4004 (in the first lane 4004, entering the first lane 4004, or straddling the first lane 4004 and another lane). The overtake may be determined as unnecessary if the road user 4008 is determined to be exiting the first lane 4004.

Determining the requirement to overtake the road user 4008 may comprise detecting a parameter indicative of a rate of closure of the host vehicle 10 to the road user 4008. The parameter may be indicated by the range detection means 310. The parameter may indicate the separation of the host vehicle 10 to the road user 4008. The rate of closure may be indicated by determining the change of separation with respect to time. In some examples, the exact speed of the road user 4008 may be known. The requirement to overtake the road user 4008 may be determined when an overtaking condition is satisfied. For example, the condition may require the rate of closure to be above a threshold. The condition may require the difference in speeds to be above a threshold. The condition may require the threshold time associated with the nearside bias function to be below a threshold.

Determining the requirement to overtake the road user 4008 may be followed by determining an opportunity to overtake the road user 4008. Determining an opportunity to overtake the road user 4008 may be dependent on detection of a space to the side of the road user 4008, such as an offside lane for passing the road user 4008. Determining an opportunity to overtake the road user 4008 may be dependent on detection of a space ahead of the road user 4008 if visible to the sensing means, so that the host vehicle 10 can move back to the nearside after the overtake. Determining an opportunity to overtake the road user 4008 may be dependent on the space availability signal as described earlier. Front, rear and/or side sensors of the sensing means may be used for determining the opportunity. If there is an opportunity, the method 4100 continues. If not, the method 4100 exits.

At block 4104, the method comprises a separation phase. The separation phase comprises causing an increase of separation of the host vehicle 10 from the road user 4008 in dependence on the determination. This gives the host vehicle 10 a run-up so that an even higher overtaking speed can be achieved.

The increase of separation may comprise decelerating the host vehicle 10. In some examples, the increase of separation may comprise allowing the road user 4008 ahead of the host vehicle 10 to accelerate faster than the host vehicle 10. The host vehicle 10 may stay in the first lane 4004 during block 4104.

The target speed of the host vehicle 10 at the target separation may be no less than a predetermined minimum. The predetermined minimum may be substantially the speed of the road user 4008 to be overtaken. In other examples the predetermined minimum may substantially be a minimum speed of the road on which the host vehicle 10 is travelling. The above preserves momentum, is within the expectation of the occupant or other road users and improves comfort. The rate of change of separation and/or one of its derivatives may be constrained for comfort and predictability of the manoeuvre to other road users.

The target amount of increased separation may be a fixed or variable (context-specific) separation behind the road user 4008. The variable amount of increased separation may be calculated as part of block 4104. The calculation may take into account at least one speed-dependent variable associated with the host vehicle 10 and/or the road user 4008, such as speed. The calculation may comprise calculating a target. The target may comprise a target speed of the host vehicle 10 at a target position. The target position may correspond to the position at which the host vehicle 10 substantially enters the second lane 4006. The target position may correspond to a position behind the road user 4008 at which the host vehicle 10 must substantially leave the first lane 4004. The distance of the target position behind the road user 4008 may be calculated. The distance may be sufficient to enable the host vehicle 10 to slow and match the speed of the road user 4008 in the event of an aborted overtake, without collision or causing a performance index associated with safety to exceed a threshold.

The target speed at the target position may be dependent on a speed of the road user 4008 to be overtaken. The target speed may be greater than the speed of the road user 4008 to be overtaken. The target speed may be a predetermined amount greater than the speed of the road user 4008 to be overtaken, for performing the overtake quickly. However, the target speed may be constrained by a detected speed limit.

Calculating the target amount of increased separation may also be dependent on acceleration of the host vehicle 10. The acceleration may correspond to a target acceleration (torque demand) of the host vehicle 10. The target acceleration may be for reaching the target speed at the target position for entering the second lane 4006. The target acceleration may be less than a maximum capable acceleration of the host vehicle 10.

Other variables could also be taken into account when calculating the increased separation. For example, the time taken to accelerate from the target separation position to the target position for entering the second lane 4006 may be constrained.

With knowledge of factors such as the target speed of the host vehicle 10 at the target separation, the speed of the road user 4008 to be overtaken, the acceleration of the host vehicle 10, the time taken, etc., the target amount of increased separation can be determined.

Further variables may also affect the increased separation. For example, at least one variable associated with at least one follower road user behind the host vehicle 10 may be taken into account. The other road user may be in the first lane 4004 or another nearside lane 4002. The variable may be indicative of a deceleration capability of the follower road user. The variable may be indicative of a reaction time of the follower road user. The variable may be indicative of a separation of the follower road user from the host vehicle 10. The variable may be indicative of convergence or divergence of the follower road user and the host vehicle 10. The variable may change the target amount of increased separation. For example, a proximal follower road user may reduce the target separation. The variable may change the target speed of the host vehicle 10 at the target separation. For example, the target speed may be no slower than the speed of the follower road user. The variable may change the constrained rate of change of separation or one of its derivatives. For example, the separation may change at a slower rate when a follower road user is proximal to the host vehicle 10. These calculations reduce the chance that follower road users will be inconvenienced and reduce the chance that they will attempt to overtake the host vehicle 10, rendering the second lane 4006 inaccessible.

The example variables may comprise a variable associated with infrastructure. For example, the variable may be indicative of changed braking distance. An example of such a variable may be indicative of road surface friction. The variable may distinguish between wet and dry surfaces. This information may be obtained from weather data, an environment characteristic, a road sensor, or even which vehicle driving mode is activated. When road surface friction is lower, factors such as the deceleration capability, reaction time, separation of the follower road user, target position, target speed(s), amount of separation, may be changed to account for the associated increase of braking distance.

At block 4106, the method comprises an acceleration phase. The acceleration phase comprises causing acceleration of the host vehicle 10 towards the road user 4008, such that the host vehicle 10 achieves a higher speed than the road user 4008.

At least part of the acceleration phase takes place in the first lane 4004. The host vehicle 10 may continuously accelerate between the position associated with the target amount of separation and the target position for entering the second lane 4006. Optionally, the acceleration may continue even once the host vehicle 10 has changed lane into the second lane 4006.

The change of acceleration from the end of the separation phase to the start of the acceleration phase may be smoothed to reduce jerk. For example, the acceleration may increase from a value at the end of the separation phase to the target value non-instantaneously.

During the separation phase and/or the acceleration phase, the method may cause the host vehicle 10 to automatically flash the turn signals (indicators) facing the second lane 4006, so that it is clear to any follower road users why the separation is increasing.

During the separation phase and/or the acceleration phase, the method may control the lane centring algorithm to cause the host vehicle 10 to change its lateral position towards the lane boundary between the first lane 4004 and the second lane 4006, to enable the sensing means to 'peek' around the road user 4008 to be overtaken. A substantial portion of the host vehicle 10, such as greater than 50%, may remain in the first lane 4004 until the target position for entering the second lane 4006 is reached, to 'guard' the host vehicle's current slot in traffic and discourage other road users such as road user 4012 from entering the slot.

At block 4108, the method comprises causing a manoeuvre of the host vehicle 10 into the second lane 4006 to perform the overtake. The path of the manoeuvre may be planned by the path planning algorithm. Specifically, the path may be required by the lane change algorithm. Specifically, the path may be required by the vehicle overtaking function.

Once the road user 4008 has been overtaken, the nearside bias function may seek an opportunity to change lanes back into a nearside lane such as the first lane 4004.

In some, but not necessarily all examples the method 4100 is implemented in dependence on detection of the speed limit of the road. For example, the amount of separation may depend on the speed limit. The separation may increase for higher speed limits such as derestricted roads to facilitate an increased run-up and therefore achieve a higher target speed at the target position for entering the second lane 4006. In some examples, the method 4100 is implemented if the speed limit is derestricted or exceeds a threshold and is otherwise not implemented.

With reference to FIGS. 13-15, there is provided a method 4200. The method 4200 may be an example sub-routine of the method 4100 of FIG. 14 or may be independent from FIG. 14. For example, the method 4200 may be a sub-routine of the lane change algorithm or vehicle overtaking function.

The method 4200 is a method for checking whether one or more abort conditions for changing lane is satisfied. The method 4200 comprises checking 4202, 4206 whether one or more abort conditions is satisfied, wherein if the one or more abort conditions is not satisfied, the host vehicle 10 completes 4208 the manoeuvre into the second lane 4006. One or more of the checks may be performed before the host vehicle 10 manoeuvres into the second lane 4006. If the one or more abort conditions is satisfied, the host vehicle 10 aborts 4204 the manoeuvre and remains in the first lane 4004.

Upon satisfaction of an abort condition, the method 4100 may abort the lane change and the host vehicle 10 may change its speed if necessary to resume following the road user 4008 in the first lane 4004 at a prescribed inter-vehicular distance. The lateral position of the host vehicle 10 may change from the position offset towards the second lane 4006 in a direction towards the centre of the first lane 4004, if necessary. One or more of the checks of abort conditions may be performed during the separation phase and/or the acceleration phase.

In FIG. 15, block 4202 relates to a first abort condition and block 4206 relates to a second abort condition. In other examples, any number of abort conditions may be checked, and in any order.

The first abort condition relates to a situation such as that shown in FIG. 13. The host vehicle 10 may be in a first lane 4004 which is not the most nearside lane. The host vehicle 10 may be changing lane to a second lane 4006 which may be offside of the first lane 4004. The lane change may be for any purpose, although checking the first abort condition is particularly advantageous in the situation when the lane change is for overtaking a road user 4008 or other solid object in the first lane 4004 whether moving or not. The road comprises a third lane 4002 neighbouring the first lane 4004, which may be offset to an opposite side of the first lane 4004 compared to the second lane 4006. Therefore, the third lane 4002 may be a nearside lane. The first abort condition is useful when there is the third lane 4002.

Satisfaction of the first abort condition may be determined by checking the third lane 4002 for another road user 4012 converging with or alongside the host vehicle 10.

'Alongside' relates to the situation in which the host vehicle 10 and other road user 4012 would make contact or a performance index associated with safety would exceed a threshold if they laterally converge. Lateral convergence would occur if the host vehicle 10 aborts the lane change after the other road user 4012 has commenced or completed changing lane from the third lane 4002 to the first lane 4004. Therefore, at least part of the road user 4012 may be laterally parallel to the host vehicle 10, or at least laterally parallel to the current slot in traffic of the host vehicle 10, wherein the current slot acts as an abort space into which the host vehicle 10 enters if the lane change is aborted.

'Converging' relates to the situation in which the other road user 4012 is expected to be alongside or within a prescribed longitudinal separation, for example because the other road user 4012 is currently behind the host vehicle 10 but is travelling faster than the host vehicle 10. In some examples, the other road user 4012 in the third lane 4002 may be ahead of the host vehicle 10 and travelling slower. The prescribed longitudinal separation may be a separation from the host vehicle 10 or from the abort space. The method may comprise determining whether the trajectory of the converging road user 4012 will result in the other road user 4012 being alongside or within the prescribed separation from the host vehicle 10 before the host vehicle 10 has committed to the (lateral) overtake or lane change. Committing to an overtake relates to the host vehicle 10 being unable to abort the overtake and move back into the first lane 4004 without colliding with the road user 4008/object to be overtaken, or without a performance index associated with safety exceeding a threshold. Committing to a lane change relates to the host vehicle 10 being substantially in the second lane 4006 such that the host vehicle 10 no longer has right of way in the first lane 4004.

If a road user 4012 in the third lane 4002 is converging with or alongside the host vehicle 10, the first abort condition is satisfied or is capable of being satisfied. Optionally, the first abort condition may be satisfied or is capable of being satisfied by a converging road user 4012 if the road user 4012 in the third lane 4002 is expected to be alongside the host vehicle 10 or within the prescribed separation before the host vehicle 10 has committed to the lane change.

In some, but not necessarily all examples, satisfaction of the first abort condition may require additional information about the road user 4012, such as whether a turn signal of the road user 4012 towards the first lane 4004 is being used, and/or whether the road user 4012 is laterally moving towards the first lane 4004.

The first abort condition may be checked before the second abort condition. The first abort condition may be the first of all the abort conditions to be checked. This advantageously ensures that the host vehicle 10 is able to retain its space in traffic in the event of satisfaction of any other abort condition. In other examples, the abort conditions can be performed in a different order or any order.

Satisfaction of the second abort condition may be determined by checking for another road user 4010 within the second lane 4006. The check may comprise checking if the road user 4010 in the second lane 4006 is converging with the host vehicle 10. The second abort condition may be capable of being satisfied when the road user 4010 in the second lane 4006 is expected to need to change its speed or course in dependence on the lane change. The second abort condition may be capable of being satisfied if the road user 4010 in the second lane 4006 is expected to be alongside the host vehicle 10 or within a prescribed longitudinal separation from the host vehicle 10, before the host vehicle 10 has committed to the lane change.

The first and/or second abort conditions may be checked one or more times during the separation phase and/or the acceleration phase. Advantageously, the second abort condition may be checked during the acceleration phase. The second abort condition may be checked immediately prior to committing to the overtake (e.g. less than approximately one second) such that if the second abort condition is satisfied the host vehicle 10 is able to slow down within the first lane 4004 without colliding with the road user 4008 to be overtaken or causing a performance index associated with safety to exceed a threshold.

As can be seen from FIG. 15, if all of the abort conditions are not satisfied, the method proceeds to block 4208 to complete the manoeuvre into the second lane 4006, and if any one of the abort conditions is satisfied, the method proceeds instead to block 4204 which aborts the lane change so that the host vehicle 10 remains in the first lane 4004.

With reference to FIG. 15, there is provided a method for controlling a host vehicle 10 operable in an autonomous mode, the method comprising: determining a requirement for the host vehicle 10 within a first lane 4004 to manoeuvre into a second lane 4006; checking whether an abort condition is satisfied, wherein satisfaction of the abort condition is determined by checking a third lane 4002 for another road user 4012 converging with or alongside the host vehicle 10 before the host vehicle 10 manoeuvres into the second lane 4006, wherein the third lane 4002 is on an opposite side of the first lane 4004 to the second lane 4006; and if the abort condition is satisfied, causing the host vehicle 10 to remain in the first lane 4004. The manoeuvre may be as described for FIG. 14 or different. The second abort condition is optional in FIG. 15.

Figure 16:
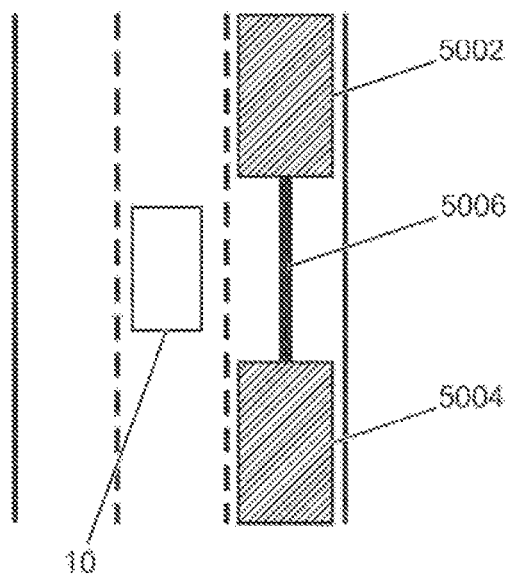
FIG. 16 illustrates an example of a host vehicle and an abnormal vehicle on a road.
Figure 17:
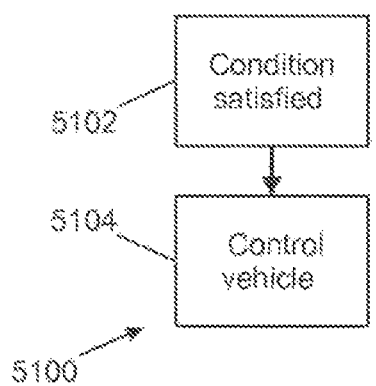
FIG. 17 illustrates an example of a method.

With reference to FIGS. 16 and 17, there is provided a method 5100 for controlling the host vehicle 10 operable in the autonomous mode (and, in some examples, operable in the non-autonomous mode), the method comprising: determining 5102 whether a condition is satisfied, wherein satisfaction of the condition requires at least an indication that a change of separation between at least two objects 5002, 5004 external to the host vehicle 10, is a value or is within a range; and inhibiting 5104 a change of lanes of the host vehicle 10 if the condition is satisfied.

Checking the change of separation is an indirect way of checking for a relationship between the objects 5002, 5004 such as whether the objects 5002, 5004 are coupled 5006 to one another. This can determine if the objects 5002, 5004 are separate vehicles or parts of a single vehicle.

Consider the example scenario in FIG. 16 in which the host vehicle 10 in autonomous mode plans to change lane and checks for another road user in the target lane. The road user may be an abnormal vehicle. For example, the abnormal vehicle may be abnormally long.

A front object 5002 ahead of the host vehicle 10 may be in the field of view of the sensing means such as a front sensor and/or front corner sensor of the host vehicle 10. The front object 5002 may be recognised by the control system 200 as at least a portion of a road user. The front object 5002 may be recognised as at least a portion of a heavy goods vehicle, such as a tractor unit.

A rear object 5004 behind the host vehicle 10 may be in the field of view of the sensing means such as a rear sensor and/or rear corner sensor of the host vehicle 10. The rear object 5004 may be recognised by the control system 200 as at least a portion of a road user. The rear object 5004 may be recognised as at least a portion of a heavy goods vehicle, such as a trailer portion, e.g. trailer axle. The objects may be classified using any appropriate object detection, recognition and/or classification algorithms inherent to autonomous driving.

In FIG. 16, an intermediate object 5006 is coupled to the front object 5002 and to the rear object 5004. The intermediate object 5006 may be longer than the front and rear objects 5002, 5004. The intermediate object 5006 may be difficult to detect. The intermediate object 5006 may be outside the field of view of any of the sensing means of the host vehicle 10. For example, the intermediate object 5006 may be too high, too low, and/or the host vehicle 10 may not comprise any sensing means configured as a side sensor (a sensor with its field of view laterally oriented sideways relative to forward travel of the host vehicle 10). If the intermediate object 5006 is to the side of the host vehicle 10, it may not be readily detectable. Alternatively, the intermediate object 5006 may be in the field of view of the sensing means, but it may be difficult to distinguish from the surrounding environment or difficult to classify.

The intermediate object 5006 may comprise cargo. The cargo may be slender bodied such as a structural beam or wind turbine blade. The cargo may be a cargo that needs to be carried by a special load vehicle. The intermediate object 5006 may be high above the ground. For example, the height of the intermediate object 5006 may be 1.5 metres or higher. The cargo may be long such as longer than 15 metres or longer than 20 metres.

Additionally or alternatively, the intermediate object 5006 may comprise a trailer. Examples of trailers which can be difficult to detect or recognise include trailers for special load vehicles. The trailer may be slender bodied. An example is a beam-shaped trailer. Such trailers may be used by special load vehicles such as wind turbine blade transporters.

Another difficult trailer design is a trailer with a low deck, because the deck level may be below the tops of the road wheels of the trailer axle and/or the tractor unit. For example, the trailer may comprise one or more goosenecks. The trailer may be a lowboy trailer. Further, the trailer may be empty of any cargo which may reduce chances of detection.

The length of the intermediate object 5006 may be substantially longer than most heavy goods vehicles, even up to 60 metres or more. Therefore, the front object 5002 may be significantly spaced from the rear object 5004.

Another difficult situation can arise if the trailer comprises cargo recognisable as one or more vehicles. The presence of vehicles on a trailer should be distinguishable from a line of traffic. Spaces between the vehicles on a trailer are therefore not viable gaps in traffic for a lane change.

Another difficult situation can arise if the intermediate object 5006 comprises a long towing means such as a cable, wherein the front object 5002 is towing the rear object 5004.

It would be advantageous to verify that the front and rear objects 5002, 5004 are coupled, instead of or to verify direct detection of the intermediate object 5006 by the sensing means. This provides a more accurate picture of the environment in which the host vehicle 10 is driving. The method described herein provides this advantage, enabling two seemingly independent objects to be classified as coupled. The coupled objects would be coupled by an assumed intermediate object 5006, and therefore classified as one (long) road user.

The result of this detection can be used to influence one or more of the algorithms for controlling speed and/or direction of the host vehicle 10. The method herein can usefully be implemented as an abort condition for the lane change algorithm. The method can control whether the space availability signal is transmitted.

The method 5100 begins with block 5102. Block 5102 comprises determining whether a condition is satisfied. Satisfaction of the condition requires at least an indication that a change of separation between two or more objects is a value or is within a range.

The indication of a change of separation may be expressed as a speed or a change of distance.

The value may be substantially zero. The range may be within one kilometre per hour of zero. The range may be within half a kilometre per hour of zero. The range may define the precision of 'substantially zero'. In some examples, the order of magnitude of the range endpoints/the value may correspond to the order of magnitude of the highest resolution of the change of separation that is capable of being determined using the sensing means, i.e. the smallest detectable change of separation using the sensing means. Therefore, the condition may be at least capable of being satisfied if it is determined using the sensing means that the objects are static relative to each other, and not if any movement is detected.

Some movements may be filtered out or the value/range may be predetermined to be broad enough to ignore such movements, through calibration or the like. Movements to be ignored or filtered may be defined as small movements such as one or more of: small longitudinal movements, e.g. lost motion in mechanical connection points; small vertical movements, e.g. suspension undulation; or small lateral movements, e.g. the front object 5002 of a long vehicle has a different turning circle from the rear object 5004.

Checking the change of separation may be with respect to one component of motion only. The component may be the longitudinal component of motion. In some examples, lateral and/or vertical components of motion may be taken into account. In some examples, a substantial lateral and/or vertical change of separation may indicate that the objects are uncoupled. Therefore, a threshold longitudinal, lateral and/or vertical change of separation may be defined, above which the objects are determined to be uncoupled. The range or value as mentioned above may be for one or more of: the longitudinal component; the lateral component; the vertical component; or a resultant thereof.

Satisfaction of the condition may require the separation to be at the required value or within the required range for at least a predetermined time. The predetermined time may be fixed and in the order of seconds. In some examples, the predetermined time may correspond to the whole time the objects have been sensed by the sensing means and monitored as part of the method 5100. The separation may need to be continuously at the value or within the required range. If the separation is not the value or is outside the range even briefly/once, this may be sufficient to determine that the objects are not coupled.

The movements may be determined relative to a vehicle coordinate system or a transformed ground coordinate system. Road curves and other environment characteristics may be compensated for using the map data/dynamic data/sensing means, to filter out motions such as navigating curves.

Block 5102 may be performed continuously, at predetermined intervals, or triggered by a trigger such as a change of environment characteristic or a navigation constraint. For example, block 5102 may be triggered by a requirement to perform a manoeuvre. More specifically, block 5102 may be triggered by the lane change algorithm determining a requirement to perform a lane change.

Additionally or alternatively, the condition may be checked when a specific pair or specific larger group of objects is detected to reduce false positives and reduce computational burden, or the condition may be checked for all possible pairs of objects. The check may be performed when one or more of the objects is classified as at least a portion of a heavy goods vehicle.

Satisfaction of the condition associated with whether the change of separation is a value or within a range may be dependent on one or more criteria, set out below, to reduce false positives. In some examples, the criteria could be used to identify specific object groups to check against the condition, to reduce computational burden. Any object groups that do not meet the one or more criteria may not be checked. In some examples, satisfaction of the condition may require one or more of the criteria to be satisfied.

An example criterion requires at least one of the objects to be ahead of the host vehicle 10 and another of the objects to be behind the host vehicle 10. The criterion may require that the objects are not adjacent to the side of host vehicle 10.

Another example criterion requires the objects to be within a first threshold distance of each other. The first threshold distance may be a predetermined value such as a value from the range approximately 20 metres to approximately 100 metres.

Another example criterion requires the objects to be spaced apart by more than a second threshold distance. The second threshold distance is less than the first threshold distance. The second threshold distance may be a predetermined value such as a value from the range approximately 8 metres to approximately 30 metres.

Another example criterion requires the objects to be in an adjacent (directly neighbouring) lane to a lane of the host vehicle 10, wherein the lane and adjacent lane are for travel in a same direction. This criterion may further require that the adjacent lane is the target lane for a lane change.

Another example criterion requires the objects to be initially classified as belonging to separate road users. The criterion may further require that at least one of the objects is initially classified as at least a portion of a heavy goods vehicle. The criterion may further require that at least one of the objects is classified as a tractor unit. The criterion may further require that the other object to be compared with the tractor unit is other than a tractor unit, such as a trailer axle. This reduces the chance of mistaking a platoon of vehicles in adaptive cruise control or cooperative adaptive cruise control as coupled objects.

If the condition is satisfied, the method proceeds to block 5104, which controls the host vehicle 10 in dependence on whether the condition is satisfied. In some, but not necessarily all examples block 5104 may inhibit a change of lanes or other required manoeuvre in the autonomous mode if the condition is satisfied. In some examples, satisfaction of the condition may prevent or override a signal to change lane associated with the lane change algorithm. For example, satisfaction of the condition may increase the threshold size of the space associated with the space availability signal. If the condition is not satisfied, the lane change or other required manoeuvre may be permitted using normal parameters such as the normal threshold size of the space.

In some examples, block 5104 may adjust the lane position of the host vehicle 10 away from the road user, or even change lanes away from the road user. This reduces the likelihood of contact due to encroachment of a portion of the long road user into the current lane of the host vehicle 10 when the long road user navigates a road curve.

Block 5104 may change a required separation distance of the host vehicle 10 from a lead road user in a same lane as the host vehicle 10 which the host vehicle 10 is following. The change may be an increase. Block 5104 may change a required separation distance of the host vehicle 10 from a rear object 5004 following the host vehicle 10.

Block 5104 may control a speed of the host vehicle 10 to enable the group of objects to pass the host vehicle 10. The control may comprise a speed decrease or a lesser speed increase than the objects. Once the rear-most object has passed the host vehicle 10 with sufficient separation distance, the host vehicle 10 may be able to change lane into the lane occupied by the group of objects.

Block 5104 may control a speed of the host vehicle 10 to cause the host vehicle 10 to pass the objects. The control may comprise a speed increase or lesser speed decrease than the objects. The change may cause the host vehicle 10 to pass in front of the front object 5002. Once this is completed with sufficient separation distance, the host vehicle 10 may be able to change lane.

In some examples, block 5104 may inhibit a manual change of lanes in the non-autonomous mode by outputting a visual, audible and/or haptic warning to the occupant or by overriding the steering control actuator.

Even if the condition is satisfied at block 5102, the condition may continue to be checked. For example, if the separation of the objects subsequently changes such that the separation is no longer the value or within the range, it is concluded that the objects cannot be coupled so control reverts to normal. For example, the inhibition may be removed.

Figure 18:
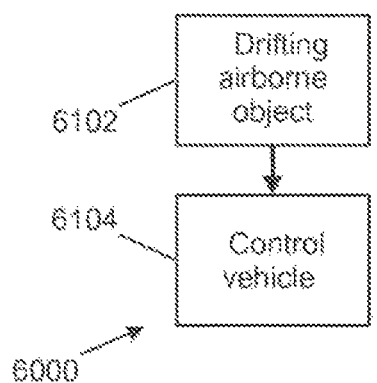
FIG. 18 illustrates an example of a method.

With reference to FIG. 18, there is provided a method 6000 for controlling the host vehicle 10 operable in the autonomous mode (and, in some examples, operable in the non-autonomous mode), the method comprising: determining 6102 whether at least one object detected in a path of the host vehicle 10 satisfies one or more criteria of a drifting airborne object; wherein control 6104 of a direction and/or speed of the host vehicle 10 is dependent on the determining.

The object may be an overrunable object. That is, if the host vehicle 10 collides with the object, no damage will occur to the host vehicle 10. The object may be lightweight. The object may be deformable; therefore, the size of the object may be unimportant. For example, the object may comprise a bag such as a plastic bag, a balloon, a small piece of vegetation, a sheet, or the like. The object may have a high surface area relative to its mass. Therefore, the object may be capable of drifting in the wind and/or in wakes behind vehicles.

Block 6102 may comprise detecting the object using the sensing means. Determining whether the object is a drifting airborne object may be dependent on the detected type of object. The type of object may be determined by recognition and/or classification as described herein. The determination may not be required if the object is classified as a road user, infrastructure or other heavy object. The determination may be required if the object is difficult to classify or its movements are not consistent with those of a heavy non-overrunable object. The determination reduces uncertainty regarding whether the object is overrunable.

The object may be in the path of the host vehicle 10 if at least part of the object intersects the path of the host vehicle 10 as determined by the path planning algorithm, such that collision between the object and at least part of the host vehicle 10 is expected to occur. On a highway, at least part of the object may be in the same lane as the host vehicle 10, or in a target lane. If the object is not in the planned path, the determination may not be required.

An example of checking the criteria for an airborne drifting object comprises determining whether the object is airborne. The object may be airborne if the object is wholly airborne, i.e. no part is touching the ground. In some examples, the object may be determined to be airborne even if the object is partly in contact with the ground. For example, the locations of the portion(s) of the object that are in contact with the ground, relative to the putative centre of mass of the object, may indicate that the forces between the object and the ground are not in static equilibrium. Therefore, if the object were not airborne then different portions would be in contact with the ground.

In order to determine whether the object is airborne, the method may determine a ground plane and determine that the object is airborne with respect to the ground plane. The ground plane may be determined with reference to map data and/or dynamic data and/or the sensing means. In some examples, the map data may include topographical information. In some examples, the ground plane may be extracted using optical flow analysis). The ground plane may be extracted from a depth map or point cloud.

The position of the object relative to the ground plane may be determined using the sensing means. Lidar is particularly suitable. For example, the range detection means 310 and/or flow field analysis may enable the position to be determined. The position includes at least height above the ground plane. In some examples, the position may be in three dimensions.

An example of checking the criteria for an airborne drifting object comprises determining the kinematic behaviour of the object. This may indicate whether the object is drifting. It is possible that a drifting object may bounce, roll or tumble along the ground. Drifting is distinguished from heavy objects bouncing, rolling or tumbling along the ground because drifting relates to the object at least partially floating, for example being substantially carried by the air for normal windspeeds such as from approximately 0.1 m/s or from 1 m/s. Drifting is influenced not only by the mass of the object but also by a shape parameter such as its aerodynamic drag coefficient. Therefore, determining that an object is drifting is indicative that the object may be lightweight. This is indicative that the object may be overrunable.

Determining the kinematic behaviour may comprise comparing movement of at least a portion of the object with an expected trajectory of the object. The expected trajectory may assume that the object is stiff so tumbles or bounces when it contacts the ground. The expected trajectory may assume that the object is sufficiently heavy to ignore aerodynamic effects, or above a certain mass. Differences may suggest the object is drifting.

The expected trajectory may comprise falling under gravity. For example, a heavy airborne object would be expected to fall to the ground with an acceleration of 9.81 m/s$^2$ in the vertical component.

If more variables are taken into account for the expected trajectory, the comparison will more accurately distinguish a drifting airborne object from other objects.

The expected trajectory may comprise continuing motion in a direction of initial motion. For example, the object may be initially moving with a velocity component parallel to the ground plane, such as 1 m/s. Motion may be expected to continue in that direction.

The expected trajectory may take into account changes in trajectory associated with contact between the object and an object such as the ground or another vehicle. For example, if the object contacts the ground it may be expected to bounce into the air or tumble. If the object does not bounce or tumble according to an expected bouncing or tumbling trajectory, this may indicate a drifting object.

The expected trajectory may take into account expected losses in velocity/kinetic energy due to various factors such as air resistance, ground friction, or the contact effects.

In some examples, at least one aerodynamic property of the object such as area, centre of pressure, shape or angle of attack may even be determined and taken into account for the expected trajectory, which may help to isolate the effect of mass from the effect of drag coefficient.

If the host vehicle 10 comprises sensing means or weather data indicative of a windspeed and/or direction (corrected for the motion of the host vehicle 10), this may be taken into account for the expected trajectory.

If the movement of the object is different from the expected trajectory, the object may be drifting.

A difference that may result in a determination of a drifting airborne object comprises a change of one or more components of acceleration compared to the expected acceleration in that component according to the expected trajectory. For example, the object may accelerate in a direction different from a direction of gravitational pull while the object is airborne.

A difference that may result in a determination of a drifting airborne object comprises the change being an increase. Increased acceleration compared to expectation is indicative that the kinetic energy of the object may be increasing so the object may be drifting.

Determining that the object is a drifting airborne object may be deterministic or probabilistic. In some examples, each time one of the criteria are satisfied, a probability indicator that the object is a drifting airborne object may increase. The higher the probability, the less the cost of maintaining a path of the host vehicle 10 and colliding with the object. In other examples, satisfaction of a required number of the criteria may result in a deterministic classification of the object as a drifting airborne object.

In some examples, determining whether the object is a drifting airborne object may define just a part of a process for determining whether the object is overrunable. The classification or probability score may also take into account other criteria such as deformability of the object for an overall determination of whether the object is overrunable. Deformability may be assessed by analysing deformations or contortions of the object. Deformability may be assessed by analysing a change of shape of the object as detected by the sensing means, compared to expectation. For example, the surfaces of a plastic bag may appear to shear or fold relative to each other due to the action of wind.

Another example part of the process may be dependent on detecting deviations of other road users from expected trajectories (e.g. lane following) using the sensing means, and correlating the deviations with the detected location and/or trajectory of the object. If other road users are avoiding the object, the object may not be overrunable.

At block 6104, the control of a direction and/or speed of the host vehicle 10 is dependent on block 6102.

In some examples, block 6104 may comprise changing a cost of performing one or more actions in dependence on the result of block 6102, in a performance index (cost function) associated with the path of the host vehicle 10.

In some examples, the control system 200 may lower the cost associated with continuing on the planned path in dependence on the expected contact with the object. This may comprise lowering the cost of continuing on the planned path or raising the cost of deviating from the planned path. If the cost of changing direction such as changing lane is higher, for example due to insufficient space for the host vehicle 10, the host vehicle 10 may stay on the planned path. The cost may however be high enough to avoid the object if there is reasonable space for the host vehicle 10 to manoeuvre around the object (e.g. space availability).

Considering an example use case, an adjacent lane may have a space which can accommodate the host vehicle 10. The space may be relatively small, leaving just a few vehicle lengths to the lead and following road users. The space may be smaller than the threshold space required for the space availability signal. If the object is overrunable/a drifting airborne object, the host vehicle 10 will not change lanes. If the object is not, the host vehicle 10 will change lanes.

In some examples, the control system 200 may lower the cost of maintaining a current speed of the host vehicle 10 in dependence on the expected contact with the object. This may comprise lowering the cost of maintaining a current speed or raising the cost of braking.

The cost-based approach advantageously means that the host vehicle 10 is less likely to take an evasive action but may do if it is very safe to do so.

In some examples, if the object is deterministically classified as overrunable/a drifting airborne object, the host vehicle 10 may take a deterministic action such as continuing on its planned path and/or not lowering its speed.

Figure 19:
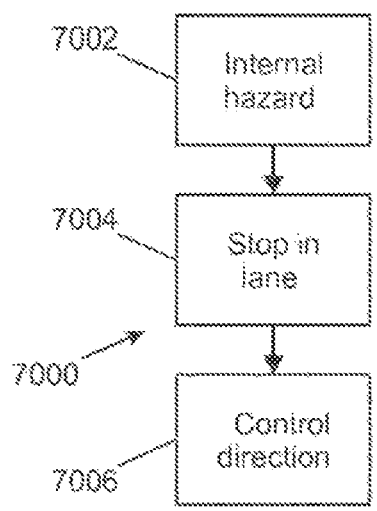
FIG. 19 illustrates an example of a method.

With reference to FIG. 19, there is provided a method 7000 for controlling the host vehicle 10 operable in the autonomous mode (and, in some examples, operable in the non-autonomous mode), the method comprising: determining 7002, 7004 that the host vehicle 10 must stop at least partially within a lane, in response to an internal hazard associated with the host vehicle 10; and causing 7006 control of a direction of the host vehicle 10 to cause the host vehicle 10 to stop in a position laterally offset from a centre of the lane, in dependence on the determination.

The method 7000 comprises, at block 7002, receiving information associated with a changed user characteristic and/or a changed vehicle characteristic. For example, the information may be indicative of an internal hazard associated with the host vehicle 10. The indication of an internal hazard may be received by the control system 200 or may be determined by the control system 200 itself.

Internal hazards are defined earlier. For example, the internal hazard may be responsive to a changed user characteristic and/or vehicle characteristic. They are distinct from external hazards that are associated with changed environment characteristics such as traffic lights, traffic queues, approaching emergency services vehicles, etc. They are also distinct from non-hazards such as navigation constraints. Further, the internal hazard requires the host vehicle 10 to stop (come to a halt).

As described earlier, an internal hazard based on a changed vehicle characteristic may comprise a fault with the host vehicle 10. For example, the fault may comprise one or more of: power failure; communication failure; or sensing means failure.

As described earlier, an internal hazard based on a changed user characteristic may comprise an occupant (e.g. driver) of the host vehicle 10 being determined as non-responsive. The driver may be determined to be non-responsive in dependence on the driver being detected as unconscious and/or in dependence on a failure by the driver to take control of the host vehicle 10 during the handover process from the autonomous mode to a non-autonomous mode of the host vehicle 10. For example, the driver may fail to take the prompted action.

As described earlier, propulsive torque availability by a prime mover of the host vehicle 10 may be inhibited. Propulsive torque refers to positive torque.

The inhibited torque availability could be due to a change of vehicle characteristic as described earlier. For example, the change could comprise a fault as described such as the prime mover becoming inoperable. Therefore, the host vehicle 10 may need to coast to a stop. In some examples, the inhibited torque availability could be for various reasons for the internal hazard, not necessarily limited to a fault. For example, the inhibition could comprise a limit on how much and/or for how long propulsive torque is available for stopping the host vehicle 10. The limit could comprise a time limit and/or a distance limit. In an implementation, once the limit is reached, propulsive torque may no longer be available.

The cause of the inhibited availability may occur at the prime mover and/or the drivetrain, so the limited availability of propulsive torque refers to propulsive torque measured at the road wheels.

If the host vehicle 10 comprises a plurality of prime movers, the torque availability may be inhibited for all of the prime movers or for a smaller subset, such as a combustion engine of a hybrid electric vehicle.

The method 7000 comprises, at block 7004, determining that the host vehicle 10 must stop at least partially within a lane, in response to block 7002. The lane in this case is a lane that is open to traffic, as opposed to a hard shoulder. The lane may be the lane which the host vehicle 10 is currently in, or a different lane. The lane may be chosen as a most nearside or a most offside lane because in either of those lanes, the host vehicle 10 can at least partially pull off the highway for safety. The most nearside may be preferred. The most offside lane may be the lane which does not share its offside boundary with another lane for traffic in the same direction. The most nearside lane may be the lane which does not share its nearside boundary with another lane for traffic in the same direction.

If a current lane of the host vehicle 10 is not the most nearside lane, the above requirement to select a nearside available lane may also cause the host vehicle 10 to change lane into the most nearside available lane, in the process of stopping. If the nearside lane is not available due to expected or encountered difficulty of changing into the nearside lane, an offside lane may be selected. The offside lane may be the most offside lane. In some examples, the nearside lane may be unavailable according to traffic detected by the sensing means, or traffic data.

Block 7004 may be the result of a first determination that the host vehicle 10 must stop, which is in response to block 7002, and a second determination that a designated stopping location (target stop location) separate from the lane cannot be reached.

The second determination that the designated stopping location cannot be reached may be made in dependence on available propulsive torque. If propulsive torque is not inhibited, the second determination may not be made. If propulsive torque is inhibited, the second determination may be made.

Checking for a designated stopping location may comprise searching for a hard shoulder and/or an emergency refuge area and/or a layby. Such locations are designated for stopping at least because they are not open to traffic and/or may be for emergencies only.

In some examples, a designated stopping location may correspond to a lane that allows stopping in lanes. In some examples, a designated stopping location may correspond to a parking space. However, the host vehicle 10 may not always be on such a road. The host vehicle 10 may be on a highway.

Checking for a designated stopping location may comprise selecting the designated stopping location from a plurality of candidate stop locations. The designated stopping location and/or plurality of candidate stop locations may be determined by processing map data and/or dynamic map data, and/or by analysing information from the sensing means.

Checking for a designated stopping location may comprise determining at least one constraint for when and/or where the host vehicle 10 must stop; and determining the designated stopping location only if the location of the designated stopping location satisfies the constraint. The constraint may require the designated stopping location to be proximal to the host vehicle 10. The constraint may comprise a time and/or distance limit. The limit may be dependent on whether propulsive torque availability is inhibited and/or by how much it is inhibited. The limit may be dependent on whether energy availability for powering hardware responsible for the driving task in the autonomous mode is inhibited and/or by how much it is inhibited. The limit may comprise a hard limit or be implemented as part of a cost function.

If no designated stopping location is found satisfying the constraint(s), the second determination may be made, so a stop in lane is required. For example, the host vehicle 10 may be on a stretch of highway with only soft verges and no hard shoulder or refuge location.

If a designated stopping location is found satisfying the constraint(s), the second determination may be not made so a stop in lane is not required. The host vehicle 10 may stop at the designated stopping location.

The method 7000 comprises, at block 7006, causing control of a direction of the host vehicle 10 to cause the host vehicle 10 to stop in a position laterally offset from a centre of the lane, in dependence on block 7004.

The lateral offset enables the host vehicle 10 to present less of an obstruction to other road users in the lane. The lateral offset may override a lane position set by the lane centring algorithm, such as the centre of the lane. The amount of lateral offset may be measured relative to the lateral position the host vehicle 10 would be in under control of the lane centring algorithm.

Block 7006 may comprise determining in which direction to laterally offset the host vehicle 10. The determination may be between whether to offset is the nearside direction or the offside direction. This enables the host vehicle 10 to further minimise disruption to other road users.

The lateral direction may be determined in dependence on detection of which lateral boundary of a road comprising the lane is closest to the host vehicle 10. The detection may be which of the nearside boundary of the most nearside lane and the offside boundary of the most offside lane is laterally closest to the host vehicle 10. The lateral direction may be nearside if the most nearside lane is laterally closest to the host vehicle 10. The lateral direction may be offside if the most offside lane is laterally closest to the host vehicle 10. The lateral offset may be towards the lane boundary closest to a lateral edge of the road. In some examples, the nearside direction is preferred even if the most offside lane is laterally closest to the host vehicle 10.

The lateral direction may be determined in dependence on detection of how many lane changes are required to reach each of the lateral boundaries. The lateral offset may be towards the boundary associated with fewer required lane changes. In some examples, if the internal hazard is associated with one side of the host vehicle 10 (e.g. fault of sensing means at left or right side of the vehicle) the lateral offset direction may be to the non-fault side of the host vehicle 10.

In some examples, the amount of lateral offset may be sufficient to cause at least a portion of the host vehicle 10 to straddle over a lateral boundary of the lane for stopping in, when the host vehicle 10 has stopped. In some examples, the lateral offset may be capable of bringing the entire host vehicle 10 over the lateral boundary of the lane and onto a verge, however this may not always be possible. The amount of lateral offset may be fixed or may be variable.

The amount of lateral offset may be controlled to create the potential for an emergency corridor. The amount of lateral offset may depend on other road users and/or a traffic condition. If there is congestion, e.g. above-threshold traffic density, the lateral offset may be controlled to ensure that the stopped host vehicle 10 would not protrude into any emergency corridor created by the other road users. This may occur even if an emergency corridor does not exist at the time the host vehicle stops.

The amount of lateral offset may be constrained by at least one constraint.

An example of the constraint relates to the terrain that will be under at least a portion of the host vehicle 10 if the host vehicle 10 is to cross over a lateral boundary of the lane for stopping in. The method may comprise determining at least one property of terrain detected to a side of the lane for stopping in. The side of the lane may correspond to a side of the lateral offset (left or right). The terrain to be analysed may be in the region outside the lane laterally beyond the lateral boundary of the lane. The region to be analysed may be directly to the side of the host vehicle 10 and may optionally extend ahead of the host vehicle 10. The region to be analysed may comprise the verges. The verge may be a soft verge or paved.

The property of the terrain may comprise an indication of surface roughness. Surface roughness may be indicated by any surface unevenness detected by the sensing means or even a dedicated terrain sensor. An average roughness parameter, a change in relief, and/or a minimum-to-maximum height difference may be taken into account. The surface roughness indication may be for determining whether a known ride height parameter associated with the host vehicle 10 is sufficient to prevent grounding and/or to ensure that all the host vehicle 10 road wheels are in contact with the ground.

The property of the terrain may comprise an indication of surface friction. Surface friction may be indicated by a detected terrain type or a weather-dependent parameter detected by the sensing means and/or weather data. Weather dependent parameters enable a determination of whether the terrain may be muddy and/or snowy and/or icy. If so, surface friction may be low. Detectable terrain types may comprise at least one of: a paved surface, grass, mud, ruts, rocks, or sand.

The amount of lateral offset may be constrained in dependence on the property of the terrain. A lower surface friction may reduce the offset. A higher surface roughness may reduce the offset. The reduced offset may reduce the likelihood of problems with traction when moving the host vehicle 10 later.

The planned speed of the host vehicle 10 may be constrained in dependence on the property of the terrain. Specifically, the speed as the lateral offset increases may be controlled. More specifically, the speed as the host vehicle 10 crosses the lateral boundary of the lane and onto the verge may be controlled. The method may reduce the speed of the host vehicle 10 as the host vehicle 10 crosses the lateral boundary of the lane, to compensate for the lower surface friction and/or higher surface roughness of the verge.

Detection of low surface friction and/or high surface roughness may also cause the control system 200 to drive the host vehicle 10 further to try and detect a region with higher surface friction and/or lower surface roughness for stopping in. For example, a stop location may be determined in dependence on projecting the region of detection of terrain information for a distance ahead of the host vehicle 10, so that the most suitable stop location can be determined that enables a higher or highest lateral offset.

Determining the terrain properties may be performed at any time or may commence upon satisfaction of a low speed condition. For example, the terrain properties may be determined after the host vehicle 10 has commenced slowing. The determination may occur when the speed of the host vehicle 10 is below a value but not when the speed is above the value. This is because if the host vehicle 10 is moving past the terrain at a high speed, it may be difficult to detect the terrain for a given sampling rate of the sensing means. The accuracy of the determined terrain properties may increase as the speed of the host vehicle 10 reduces.

Another example constraint on the amount of lateral offset is associated with objects that may obstruct door opening. For example, the method may comprise determining that at least one object detected to a side of the lane is an obstruction to opening of a door of the host vehicle 10. The side of the lane may be the side of the lateral offset as disclosed above. The object may comprise a traffic barrier such as a guard rail or may be any other solid object detectable by the sensing means.

The amount of lateral offset may be dependent on the determined object. For example, the amount of lateral offset may be constrained by a minimum required opening envelope of the door, wherein the opening envelope is sufficient for an occupant to exit the host vehicle 10. The method may determine the proximity (e.g. lateral proximity) of the host vehicle 10 and/or minimum opening envelope to the obstruction and may control the lateral offset to not exceed a value that reduces the opening envelope of the door to below the minimum opening envelope.

The minimum opening envelope of the door may be known to the control system 200. The minimum opening envelope may simply comprise a lateral distance from a reference point on the host vehicle 10 that is predetermined to be sufficient to enable an occupant to exit the host vehicle 10. In some examples, the envelope may follow the three-dimensional contours of the door and/or vehicle body, to enable a determination of the three-dimensional opening size for the occupant to exit the host vehicle 10.

In some examples, the host vehicle 10 may detect when one or more occupants have exited the host vehicle 10 and may then move the host vehicle 10 to further increase the lateral offset even though it will become difficult to open the door. An automatic door closer may ensure that the door is closed before the host vehicle 10 moves closer to the object. Some propulsive torque would need to be available. This feature would further reduce inconvenience for other road users.

Detection of the object such as the traffic barrier may also cause the host vehicle 10 to drive further to try and detect a region which permits a greater lateral offset, for example where the object is absent or set back further from the lane boundary.

The rate of change of the lateral offset may be controlled for a smooth and gradual increase of lateral offset or may be variable as the host vehicle 10 slows. The method may comprise changing the rate at which the host vehicle 10 laterally deviates from the centre of the lane towards the target lateral offset.

In some examples, the lateral offset may commence increasing just as the host vehicle 10 is about to stop, in the final few metres/seconds/ms$^{-1}$ before the host vehicle 10 is at a halt. The lateral offset may commence increasing after braking commences, if braking is employed to slow the host vehicle 10 in response to blocks 7002 and 7004. This is because braking with different road wheels on different surfaces is poor for stability, and braking while turning is also poor for stability or braking traction.

The rate of change of lateral offset may be dependent on a distance. The distance may comprise a distance from a target stopping location. The distance may comprise a longitudinal distance. The rate may increase when closer to the target stopping location. This ensures that the host vehicle 10 behaves predictably within traffic for longer.

The rate of change of lateral offset may be dependent on a speed. The speed may comprise a speed of the host vehicle 10. The rate may increase when speed is lower. This ensures that before increasing the rate of offset a more accurate detection of terrain properties can be obtained.

The rate of change of lateral offset may be dependent on a position. The position may correspond to the amount of lateral offset. The position may correspond to a position of the host vehicle 10 relative to a lane boundary and/or a verge. The rate may decrease in dependence on the host vehicle 10 crossing the lane boundary and onto the verge. This may reduce the chance of skidding.

The rate may further depend on the terrain properties and/or the presence of the object. If the terrain properties are optimal and/or an object is not present, the rate may be higher for at least a portion of the lateral offset manoeuvre.

In view of the above, the host vehicle 10 presents less of an obstruction when stopped.

Figure 20:
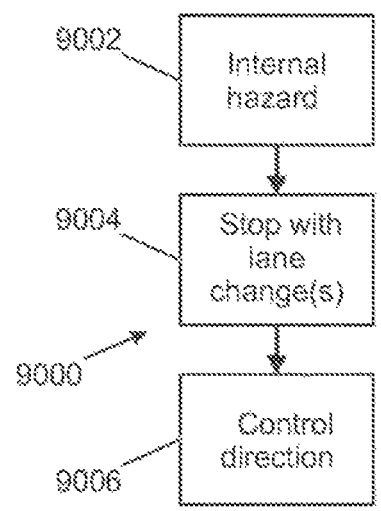
FIG. 20 illustrates an example of a method.

With reference to FIG. 20, there is provided a method 9000 for controlling the host vehicle 10 operable in the autonomous mode (and, in some examples, operable in the non-autonomous mode), the method comprising: determining 9002, 9004 that the host vehicle 10 must stop, in response to an internal hazard associated with the host vehicle 10, wherein propulsive torque availability by a prime mover of the host vehicle 10 is inhibited at least between the determination that the host vehicle 10 must stop and the host vehicle 10 stopping; and causing 9006 control of a direction of the host vehicle 10 to cause the host vehicle 10 to perform at least a lane change from a first lane to a second lane while stopping.

The method 9000 comprises block 9002 in which it is determined that the host vehicle 10 must stop, in response to an internal hazard associated with the host vehicle 10. The reason for block 9002 may be the same as for block 7002. In this example, but not necessarily all examples, block 9002 is restricted to the instance in which propulsive torque availability by the prime mover is inhibited. The inhibited propulsive torque and reasons for the inhibited propulsive torque may be as described earlier, particularly in relation to block 7002.

The method 9000 comprises block 9004 in which it is determined that at least one lane change is required, in response to block 9002.

Determining that at least one lane change is required may comprise determining that at least one lane change is required for reaching a designated stopping location (target safe stop location). Determining the designated stopping location may be as described above in relation to the 'second determination' of block 7004.

A designated stopping location may be found that satisfies the constraint(s) as described in relation to block 7004. In this example, at least one of the constraint(s) may be dependent on the inhibited propulsive torque availability, such as a constraint on how far the host vehicle 10 can coast without propulsive torque. Therefore, the designated stopping location is set as the target stop location of the host vehicle 10.

Determining that the lane change is required may comprise determining whether the target stop location is in a different (second) lane from a current (first) lane of the host vehicle 10. If the target stop location is in a different lane, then a lane change may be required. The number of lane changes required to facilitate access to the target stop location may be determined. For example, if the host vehicle 10 is on the most offside lane on a three-lane per-direction highway then two lane changes are required to facilitate access to the hard shoulder.

In some examples, no designated stopping location may be found that satisfies the constraint. In this case, the lane changes may be for reaching a most nearside lane. The lane changes may be for reaching a lane at which the lateral offset can be increased as described in relation to the method 7000. In some, but not necessarily all examples, the lane changes may be for reaching a most offside lane for the reasons described above for the method 7000.

The method 9000 comprises block 9006 in which the control system 200 causes control of a direction of the host vehicle 10 to cause the host vehicle 10 to perform the required lane change while stopping.

Implementation of the lane change may be governed by the relevant algorithms such as the lane change algorithm and the path planning algorithm. The control may therefore be traffic-aware as described earlier. In some examples, the threshold size for the space availability signal may be reduced in dependence on the internal hazard, compared to if there is no internal hazard. This facilitates easier slotting through traffic. Further, spaces that would require acceleration greater than achievable with the maximum (inhibited) propulsive torque to reach the space, may be ignored. For example, the host vehicle 10 may be constrained to only utilise spaces available via coasting and/or braking.

In some examples, the control may be governed by the speed control algorithm. Although propulsive torque availability may be inhibited, braking may be available. The method may attempt to perform the one, some or all of lane change(s) prior to increasing braking of the host vehicle 10 to reduce a speed of the host vehicle 10. That way, the deferred braking ensures that the host vehicle 10 has more momentum available for re-trying lane changes in the event in which lane changes are difficult. The braking status prior to the increased braking may be comprise no braking, a level of braking from before the internal hazard was determined, or a below-threshold level of braking.

The braking may be deferred in all situations or in dependence on what caused the internal hazard. For example, if the internal hazard was caused by an electrical power failure of a power supply, the backup power supply may not provide much power for simultaneous braking and steering.

Not only may initial braking be deferred, but in some examples the braking may be reduced or eliminated each time a steering input is made.

Figure 21:
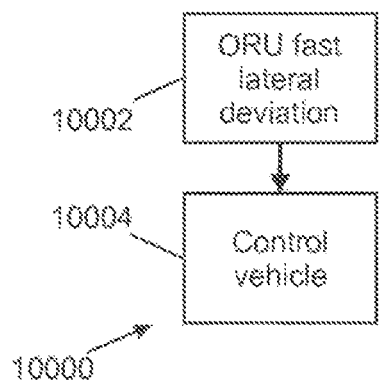
FIG. 21 illustrates an example of a method.

With reference to FIG. 21 there is provided a method 10000 for controlling the host vehicle 10 operable in the autonomous mode (and, in some examples, operable in the non-autonomous mode), the method comprising: determining 10002 one or more characteristics associated with at least one road user ahead of the host vehicle 10 changing its lateral position away from a current lane of the host vehicle 10, wherein at least one of the characteristics is associated with a rate of change associated with the road user changing its lateral position; and causing 10004 anticipatory control of at least one subsystem of the host vehicle 10 in dependence on the determination, such that a potential undetected hazard in the current lane can be mitigated.

By way of context, consider the use case in which the host vehicle 10 is travelling on a road such as a highway. The host vehicle 10 follows a second road user directly ahead of the host vehicle 10 with a specified separation and adapts to any changes in speed of the second road user. The separation could be approximately two seconds, for example. The second road user may block a view to one or more sensors of the sensing means, particularly if it is a heavy goods vehicle. Therefore, those sensors may be unable to perceive an external hazard such as stopped vehicles in the lane ahead of the host vehicle 10 and ahead of the second road user.

If such a hazardous object exists, particularly on a highway at high speeds, then road users ahead of the host vehicle 10 will perform evasive manoeuvres by braking and/or swerving. If evasive manoeuvres are detected by the sensing means, particularly a pattern of swerving by multiple road users ahead of the host vehicle 10, then the host vehicle 10 may have information indicative of an external hazard. The information would indirectly indicate the external hazard by enabling detection of the effect of the external hazard on other road users before the external hazard has entered the line of sight of the sensing means of the host vehicle 10. The external hazard may be detectable before the second road user directly in front of the host vehicle 10 has performed an evasive manoeuvre.

The method 10000 comprises, at block 10002, determining one or more characteristics associated with at least one road user ahead of the host vehicle 10 changing its lateral position away from a current lane of the host vehicle 10, wherein at least one of the characteristics is associated with a rate of change associated with the road user changing its lateral position.

To the extent that 'at least one road user' covers one road user only, that road user may not be the second road user (directly ahead of the host vehicle 10). This is because by the time the second road user performs an evasive manoeuvre there may be an undesirably short time to react. However, if multiple road users are monitored for their characteristics, the second road user may or may not be one of them.

The characteristics may be determined from information obtained by the control system 200. The information may be from the sensing means of the host vehicle 10. All the road users whose characteristics are determined may be required to be in the same lane as each other. The road users may be required to be in the same lane as the host vehicle 10.

The road users may be indicated by the information because one or more sensors of the sensing means has a direct or indirect line of sight to at least portions of the road users.

A direct line of sight may comprise a line of sight directly through a glasshouse of the second road user to the further road users, if the second road user has a glasshouse. The line of sight may be through the rear and front windows of the second road user. The direct line of sight may be to sensing means mounted above the waist of the host vehicle 10.

The line of sight may be below an underside of the second road user. In this case, the one or more sensors may be below the waist of the host vehicle 10, and/or on the bumper.

At least a portion of the field of view of the one or more sensors may be front facing, i.e. in the direction of travel of the host vehicle 10.

An indirect line of sight may comprise a propagation path with one or more reflections. The reflection may be on the road surface, another road user or infrastructure, or a combination thereof. Various sensing means may be capable of detecting a concealed object via reflections. For example, the radar 306 could be tuned to propagate a radio wave pattern around/under the second road user. The radio waves may reflect on the road under the second road user and therefore provide a means for detecting concealed objects ahead of the second road user.

The above techniques enable the motions of at least one to three road users ahead of the second road user to be monitored, even if they are somewhat occluded by the second road user. In some examples, a road user ahead of the second road user may only be detectable once it has commenced a change of lateral position.

At least one of the one or more characteristics of block 10002 is associated with a rate of change associated with the road user changing its lateral position, such as lateral acceleration and/or lateral jerk. The one or more characteristics may comprise at least one additional characteristic too. An example additional characteristic may be associated with braking of the road user.

The change of lateral position may be away from the current lane of the host vehicle 10, which may be the current lane of the road user. The change of lateral position may cause the road user to fully enter a different lane and/or fully leave the current lane.

In some examples, the change of lateral position may be smaller and the road user may remain within the lateral boundaries of the current lane. This may indicate small debris or a pothole to one side of the lane, which can be avoided without leaving the lane entirely. Therefore, smaller (e.g. below-threshold) changes of lateral position may reduce the cost to the host vehicle 10 of staying in the current lane.

The rate of change associated with the change of lateral position may comprise lateral jerk. Jerk is a useful characteristic for discriminating between evasive manoeuvres and aggressive or sporty driving. Aggressive or sporty drivers may change their lateral position with a high rate of lateral acceleration but relatively low jerk, since jerk tends to destabilise vehicles. In some examples, both lateral jerk and lateral acceleration may be taken into account.

In some examples, the method may proceed to block 10004 if the rate of change (lateral acceleration and/or lateral jerk) exceeds a threshold (subject to any other checks), and not if the threshold is not exceeded. Alternatively, the method may proceed to block 10004 regardless by controlling a cost of a cost function in dependence on the characteristics in block 10002.

To further reduce the chance of false positive detections of evasive manoeuvres, the characteristic may be associated with a similarity of lateral motions by a plurality of road users ahead of the host vehicle 10 changing their lateral positions as described above. The plurality of road users includes the road user(s) mentioned above, and optionally the second road user. The similarity of lateral motions may be determined using a similarity algorithm. The similarity may be checked using regression techniques, classification techniques, ranking techniques, and/or any other appropriate technique. The characteristics for which similarity is determined may comprise one or more of: rates of change associated with the changing their lateral positions such as lateral jerk and/or lateral acceleration; lateral velocities; lateral displacements caused by the changing their lateral positions; path followed; when and/or where the changing their lateral positions begins, etc.

Combinations of the above characteristics and/or selections of techniques may be selected to establish a pattern of behavior of the road users that is associated with/consistent with waves of lateral motion. The term 'wave' is borrowed herein from traffic wave theory, although applied in this case to lateral motions rather than headways. The evasive manoeuvres of multiple road users may define a wave. In a wave, the front-most road user will change its lateral position, then the next road user, and then the next. The lateral position changes may be in the same direction (left or right). In some examples the wave may be stationary relative to the road, such as when the hazard is a stationary obstacle. In some examples the wave may move with the traffic, such as when the hazard is a very slow-moving road user driving the correct way. In some examples the wave may move against the traffic, such as when the hazard is caused by wrong-way driving. The similarity algorithm may be calibrated to determine the similarity when waves of lateral motion occur. For example, lateral manoeuvres performed by the road users in a same direction, in a certain order and at a certain location, may result in similarity being determined.

In some examples, the method may proceed to block 10004 (subject to any other determinations) if the similarity is determined and/or is within a similarity threshold (e.g. range), and not if no similarity is determined.

To further reduce the chance of false positive detections of evasive manoeuvres, block 10002 may comprise determining whether the one or more characteristics are associated with non-evasive lateral movement. The method 10000 may not proceed to block 10004 if the characteristics are associated with non-evasive lateral movement.

Determining whether the characteristics are associated with a non-evasive lateral movement may be dependent on the dynamic map data or the map data. One or more characteristics of the lateral movements such as direction (left or right) and/or location relative to the highway, may be compared with information in the map data. The information may comprise junction information. The junction information may comprise junction location information. The junction location information may indicate the location of a junction, or at least the off-ramp of the junction. The junction information may indicate the direction of lateral motion (left or right) required to exit the highway onto the junction. If the direction and/or location of the lateral movements is consistent with the direction and/or location of the junction, the method 10000 may not proceed to block 10004. Consistency may be determined when the directions are the same and the locations are indicative that the lateral movements may be to leave the highway at the junction. For example, the locations of the manoeuvres and of the junction may be within a threshold proximity. The locations may be specific to a lane required to access the junction.

However, if the direction and/or location of the lateral movements is not consistent, the lateral movements may indicate evasive manoeuvres to avoid queues forming onto the main carriageway. Inconsistent directions comprise lateral movements in the offside direction of the highway when approaching the start of an off-ramp. In this situation, the method may proceed to block 10004.

Further, even if the movements are consistent with junctions, high jerk lateral motions as described above may still indicate evasive lateral movements. In this case, the method may proceed to block 10004.

Determining whether the characteristics are associated with a non-evasive lateral movement may be dependent on a confidence condition. The confidence parameter may relate to a combined probability or the like. This is useful if a plurality of the characteristics is analysed. Some characteristics such as lateral jerk and characteristics that satisfy the similarity requirement may carry a higher confidence score than others. A minimum threshold combined probability may be required to satisfy the confidence condition. If satisfied, the method 10000 may proceed to block 10004. If not, the method may not proceed to block 10004.

The above determination of whether the manoeuvres are evasive or non-evasive may be calibrated/trained to ensure that block 10004 is only performed if there is likely to be a potential unseen hazard which the road users are evading. As mentioned above, the potential unseen hazard could be a road user. However, the potential unseen hazard could be any hazard such as a pedestrian or any other solid object. In some examples, the potential unseen hazard could be a liquid object such as a deep puddle. The potential unseen hazard could even comprise smoke.

In some examples, the method may estimate the location of the potential unseen hazard, such as which lane it is associated with. The potential unseen hazard may be in the current lane because road users in the current lane are deviating out of the current lane. Collision would therefore occur if the host vehicle 10 maintained its path without evasion. In some examples, the potential unseen hazard could be in another lane but causes lateral motions in multiple lanes as road users try to maintain safe side separation from each other.

A putative object corresponding to the potential undetected hazard could be placed into the algorithms of the control system 200 when the method is ready to proceed to block 10004. For example, the putative object could be created in the cost function associated with path of the host vehicle 10. This may increase the cost of maintaining a path of the host vehicle 10 (e.g. centred in current lane) compared to adopting a laterally changed path similar to the road users. It may be difficult to know the exact location of a potential undetected hazard, but if the road users moved to the left then the putative object may be not to the left of where the road users started (e.g. lane centre), and if the road users moved to the right then the putative object may be not to the right. If some road users moved to the left and others to the right, the putative object may be in the lane centre.

In some, but not necessarily all examples, the method may determine whether a potential undetected hazard is likely to be static or moving, in dependence on processing information indicative of movement of the wave of lateral movements of the other road users (see discussion above).

Block 10004 comprises causing anticipatory control of at least one subsystem of the host vehicle 10 in dependence on the determination, such that a potential undetected hazard in the current lane can be mitigated.

The anticipatory control may be of any one or more subsystems of the host vehicle 10 in any way that reduces the likelihood and/or severity of impact in the event that the potential undetected hazard is real. The anticipatory control may comprise at least a preparatory step associated with a pre-crash protocol. The anticipatory control may comprise at least one of the following actions: increasing seatbelt tension; adjusting an electronically adjustable seat to an optimal position for airbag effectiveness; closing one or more windows; reducing a brake pad lost motion; applying braking force; increasing a following distance behind a road user ahead of the host vehicle 10; causing an adaptive suspension system to adjust damping and/or ride height; adapting directional headlamps to increase illumination of the potential undetected hazard; using hazard lights; or reducing a speed of the host vehicle 10.

In some examples, the lateral position of the host vehicle 10 may change away from the lane centre and in the direction of the lateral movement of the analysed road users of block 10002.

The host vehicle 10 may stay within the lane boundaries of the current lane unless or until the hazard is confirmed by direct detection.

Increasing the following distance may comprise braking and/or accelerating less than the second road user. The speed of the host vehicle 10 may decrease. The increased following distance provides more stopping distance in the event of later required emergency braking.

Applying braking force and/or reducing the brake pad lost motion may comprise pre-filling the hydraulic system associated with the brake control actuator. The brake pads may be brought closer to the friction surfaces (e.g. discs, drums) to improve responsiveness. In some examples, a small amount of braking may be applied, not sufficient to perceptibly slow the host vehicle 10.

In some examples, the impact of a false positive detection may be decreased. A scale of the anticipatory control may be dependent on the characteristics of block 10002. For example, a higher confidence score, similarity or value may increase the scale of anticipatory control. Increasing the scale may comprise performing more of the above actions. The actions which are less likely to be perceptible may require a lower certainty that a hazard exists than actions which are likely to be perceptible. Increasing the scale may comprise performing any variable aspects of the selected action(s) by a greater amount. For example, the following distance may increase more. In an example implementation, when there is less certainty of a hazard, the host vehicle's response may be imperceptible to its occupants. When there is a more certainty of a hazard, the host vehicle 10 may perceptibly slow.

In some examples, the scale of anticipatory control is constrained by an occupant constraint. The occupant constraint may be factory predetermined and/or may be dependent on an operating mode of the host vehicle 10. The occupant constraint may comprise a comfort target. The comfort target may comprise a limit or performance index on a parameter such as jerk, deceleration, headway and/or minimum speed. Operating modes may comprise a comfort mode, a dynamic mode, a sport mode, and/or a track mode. Each mode may define comfort targets for a plurality of the parameters.

Although the above method 10000 has been described in relation to lateral motions, it would be appreciated that the concept could apply to motions other than lateral motions. The concept could apply to vertical motions. The method 10000 may determine whether vertical motions are indicative of a pot-hole or overrunning an object. For example, braking of the second road user could be anticipated by detecting braking of road users ahead of the second road user.

Although the above method 10000 has been described in relation to road users in the current lane of the host vehicle 10, the concept could apply to road users in a different lane from the host vehicle 10. Consider the situation in which the hazard is in the different lane, and the road users are laterally changing position towards the current lane of the host vehicle 10. A cost for moving into the different lane may be increased in dependence on the determination. The host vehicle may change its lateral position to provide space for road users laterally changing their position towards the current lane. The host vehicle may perform the anticipatory control as mentioned above.

Figure 22:
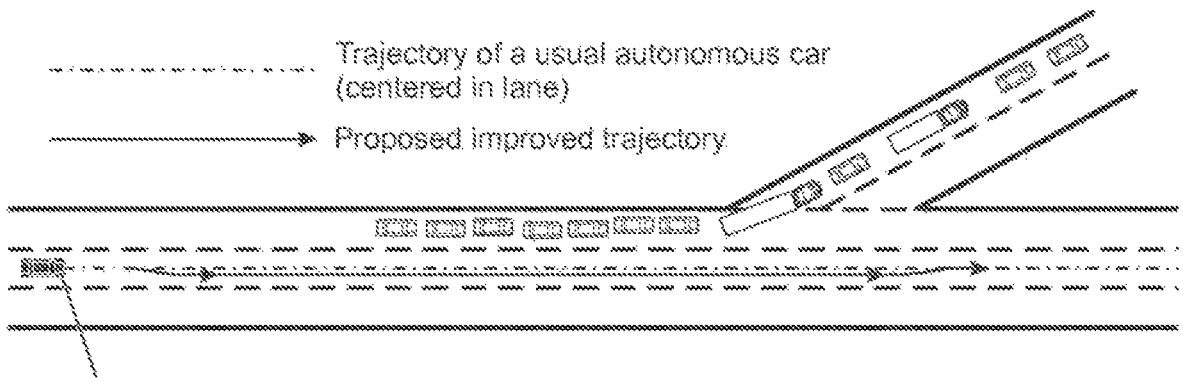
FIG. 22 illustrates an example trajectory of a host vehicle.
Figure 23:
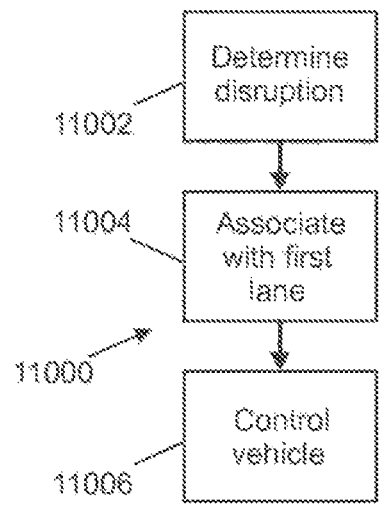
FIG. 23 illustrates an example of a method.

With reference to FIGS. 22 and 23, there is provided a method 11000 for controlling the host vehicle 10 operable in the autonomous mode (and, in some examples, operable in the non-autonomous mode), the method comprising: determining 11002 a traffic disruption; associating 11004 the traffic disruption with a first lane; and causing 11006 control of a direction of the host vehicle 10 to cause the host vehicle 10 to increase a lateral offset of the host vehicle 10 from a centre of a current lane of the host vehicle 10, wherein the current lane is the same as or is adjacent to the first lane, wherein the lateral offset is in a direction away from the first lane, while remaining within the current lane, in dependence on the associating.

A typical lane centring algorithm may implement a function such as a cost map that favours a centred lane position. If the cost of adjusting lane position to be off-center is favourable compared to being centred, then the predetermined lateral position of the host vehicle 10 may change to the lower cost off-center position. The cost map may be changed in dependence on side separation from other road users or the lane change algorithm. However, it would be beneficial if the lane centring algorithm could adjust vehicle position pre-emptively in dependence on traffic disruptions, to increase its lateral separation.

At block 11002, the method comprises determining a traffic disruption. A traffic disruption may impede progress of vehicles at the location of the traffic disruption. For example, the traffic disruption may comprise a traffic condition such as a traffic queue, and/or a closed lane. The traffic disruption may impede traffic flow or speed. The traffic disruption may be associated with a plurality of other road users, for example the traffic disruption may comprise a traffic queue.

However, the term traffic disruption is not limited to such situations. Traffic disruptions include, for example, various environments associated with a high speed difference and a small lateral separation from other road users. For example, the traffic disruption may be associated with passing or being passed by an object at a high speed with a high speed difference. Such environments may not necessarily be an impediment to traffic flow or speed. However, such environments may disrupt visibility of the road ahead, and/or may not leave a wide lateral safety margin. See for example the 'trajectory of a usual autonomous car' in FIG. 22, which stays in the centre of a lane adjacent to a lane of stopped traffic queuing for an off-ramp, leaving only a narrow lateral safety margin.

Examples of traffic disruptions include one or more of: a traffic condition; a junction; temporary street furniture (e.g. traffic cones); closure of a lane; a vehicle filtering (lane splitting) through traffic such as a motorcycle or pushbike, or an emergency services vehicle; or a wide load vehicle. The traffic condition may comprise a slow-moving or stopped traffic queue or a closed lane. In some, but not necessarily all examples, the junction, temporary street furniture and/or lane closure may only be a traffic disruption if associated with a traffic queue at or approaching its location.

The traffic disruption may be beyond the first sensing range of the host vehicle 10 or within the first sensing range. For example, the information may indicate traffic disruptions beyond the first sensing range and within the second farther sensing range. The information may comprise the map data and/or dynamic data as described earlier.

In some examples, the information for determining the traffic disruption in block 11002 may comprise one or more of the following earlier described features: the map data, comprising information on the junction; the road sign information, comprising information on the junction and/or the closure of a lane; the dynamic map data, comprising information on the closure of a lane; or the dynamic traffic data, comprising information on the traffic condition. This enables traffic disruptions beyond the first sensing range to be determined.

In some examples, the information utilised in block 11002 may comprise one or more of: information from the sensing means (particularly one or more front and/or rear sensors) on the host vehicle 10 with line of sight to the traffic disruption and/or one or more other road users.

Less predictable traffic disruptions such as wide load vehicles and filtering road users may be detected using the sensing means. The rear sensor may detect filtering road users. A road user may be determined as a filtering road user in dependence on at least one of: a position of the filtering road user; a classification of the filtering road user; a swarm behaviour of traffic around the host vehicle 10. The position may comprise a position straddling multiple lanes. The classification may recognise the road user as an emergency services vehicle and/or a classification that a light signal corresponds to that of an emergency services vehicle. The classification may recognise motorbikes and/or push bikes. The swarm behaviour may comprise road users around the host vehicle 10 adjusting their lateral positions to create a corridor for the filtering road user.

A road user may be determined as a wide load vehicle in dependence on a width of the road user. If the width is above a threshold, the road user may be a wide load vehicle. The front sensor could detect wide load vehicles.

The wide load vehicle and/or filtering vehicle may communicate its presence to the host vehicle 10 via vehicle-to-vehicle communication.

The road sign information may be derived from information sensed by the sensing means, or from the map data and/or dynamic map data comprising the road sign information. Metadata or image data may indicate the purpose and/or any markings on the road signs, for interpretation by the control system 200. The road signs may be permanent road signs. In some examples, the dynamic map data may comprise road sign information to enable temporary signs such as lane closure warning signs to be determined, which are typically temporary and occur during roadworks and/or at certain times of day or in response to hazardous obstructions such as crashed vehicles.

The information on the junctions may comprise information on locations associated with junctions such as junction locations, on-ramp locations, off-ramp locations, or a combination thereof. The map data may indicate whether traffic on the on-ramp has to merge with traffic in an existing lane of the highway. The map data may indicate whether the on-ramp continues as an extra lane on the highway. Likewise, the map data may indicate whether traffic has to leave an existing lane to use an off-ramp. The map data may indicate whether an existing lane of the highway becomes a lane of the off-ramp. These indications may be distinguishable from the detail of the map data such as road markings.

One of the above-described traffic conditions is a traffic queue. Not all traffic queues may be determined to be traffic conditions in block 2102. For example, the traffic queue may need to satisfy a severity condition to be determined as a traffic condition. Satisfaction could be determined in one or more ways by the host vehicle 10 or the provider of the dynamic traffic data. For example, the traffic speed may need to be below a threshold. The traffic density may need to be above a threshold. Inter-vehicular distance may need to be below a threshold. The threshold(s) may need to be exceeded for more than a threshold distance (e.g. traffic queue length) and/or frequency. Travelling between two points on the highway may need to take an above-threshold journey time. A spatial and/or temporal change in one or more of these variables may need to indicate worsening conditions rather than improving conditions. For instance, traffic density ahead of the host vehicle 10 may need to be increasing relative to a current traffic density, rather than falling. Checking the above variable(s) ensures that a traffic queue is distinguished from temporary and normal fluctuations in traffic flow. This reduces the likelihood of false positives.

The temporary street furniture may be detected directly using the sensing means, or indirectly using the dynamic data. The temporary street furniture may comprise traffic cones or temporary barriers, for example. For example, the dynamic map data may indicate that a lane closure is associated with roadworks which may be necessary and sufficient for a detection of street furniture.

In some examples, the traffic disruption may be detected by other means, such as V2V or V2I communication with the host vehicle 10.

At block 11004, the method comprises associating the traffic disruption with a first lane. The first lane may be a lane of a plurality of lanes for travel in a first direction, on the road or highway on which the host vehicle 10 is travelling. The information may have sufficient resolution, granularity and/or detail to enable the traffic disruption to be associated with a specific lane of a highway, as described earlier. Similarly, the information may be substantially live and updated frequently as described earlier. The first lane may or may not be the lane on which the host vehicle 10 is planned to travel by the path planning algorithm.

The traffic disruption may be associated with the first lane specifically, as opposed to all lanes in the first direction. In the case of lane closures, the information may indicate this directly by indicating which lanes are closed and/or which are open.

In the case of traffic queues, the control system 200 or provider of the dynamic data may be configured to determine a relative severity of the traffic disruption associated with the first lane compared to other lanes in the first direction. If the difference in severity is not significant, no association with the first lane may be made and the method may terminate. For example, the relative severity may be determined by determining which lanes satisfy the severity disruption and/or by comparing the magnitudes of variables as disclosed above in relation to block 2102. For example, if a difference in magnitudes is above a threshold for a subset of lanes to indicate increased traffic/queuing in the subset of lanes, the traffic disruption may be associated with the subset of lanes. Alternatively or additionally, if the severity disruption is satisfied for a subset of the lanes and not others, then the traffic disruption may be associated with the subset of lanes.

In some examples, the method may further comprise associating the traffic disruption with a junction. For example, the method may comprise determining the location associated with the junction. The method may compare the location associated with the junction with one or more locations associated with the traffic disruption. The method may determine that the traffic disruption, such as a traffic queue, starts before and ends at or not after the location associated with the junction. This association between the locations enables a determination to be made that the traffic queue is associated with the junction. When such an association is made, block 11004 may associate the traffic disruption with the lane(s) determined to meet the junction to facilitate access to/from the junction. In the case of an off-ramp, the determination may be that a traffic queue in the first lane is for leaving the highway at the junction. In the case of an on-ramp, the determination may be that the traffic queue is on the first lane for allowing traffic on the on-ramp to enter the first lane, or even that the traffic queue is on the on-ramp itself.

Associating temporary street furniture with the first lane may comprise determining that the temporary street furniture is at least on a lane boundary of the first lane, optionally protruding into the first lane beyond the lane boundary. This may be detected directly using the sensing means. However, in some examples, this may be detected by associating the roadworks with a lane directly neighbouring the first lane. Then it may be assumed that temporary street furniture is present.

Associating a filtering road user with the first lane may be dependent on one or more of: the position of the filtering road user; the swarm behaviour. One of the lanes that is being straddled may be the first lane. The swarm behaviour may comprise creating a corridor for the filtering vehicle that is at least partially in the first lane.

Associating a wide load vehicle with the first lane may comprise determining an indication that a lateral edge of the wide load is within a threshold proximity of a first side (lateral boundary) of the first lane and/or at least partially intrudes into the first side of the first lane.

At block 11006, the method comprises causing control of a direction of the host vehicle 10 to cause the host vehicle 10 to increase a lateral offset of the host vehicle 10 from a centre of a current lane of the host vehicle 10, in dependence on block 11004. A rate of lateral deviation associated with the increase of lateral offset may depend on a comfort condition. The comfort condition may impose a performance index limiting jerk and/or acceleration.

The current lane may be adjacent to the first lane. This is shown in FIG. 22. The increased lateral offset is also illustrated as the 'proposed improved trajectory'. The lateral offset is in a direction away from the first lane. The additional lateral offset from the traffic condition provides various advantages as mentioned above. In the case of FIG. 22, if the host vehicle 10 needs to suddenly change its lateral position further, e.g. a vehicle unexpectedly pulls out of the first lane into the current lane, the amount of required lateral deviation, particularly jerk, is reduced because the host vehicle 10 is already laterally offset away from the first lane.

As shown in FIG. 22, the lateral offset may be gradually increased as the host vehicle 10 approaches the traffic disruption. The lateral offset increases pre-emptively, before host vehicle 10 and the traffic disruption are at the same location. The lateral offset may then be gradually decreased after the traffic disruption has passed or been passed. The lateral offset may gradually decrease until the traffic disruption-independent lane position is reached (e.g. lane centre).

In some, but not necessarily all examples, the current lane may be the first lane. If the host vehicle 10 is in the first lane, the host vehicle 10 may plan a lane change which starts with drifting laterally towards a target lane as per block 11006. That way, if the host vehicle 10 has to stop/match traffic disruption speed before a space availability signal has been received, the host vehicle 10 will not have to make large steering inputs to pull out of the first lane and into the target lane.

The host vehicle 10 in its laterally offset position may remain within the boundaries of the current lane, to comply with applicable highway law. Therefore, in some examples the lane change algorithm is not triggered in the method 11000. In some examples, the host vehicle 10 in the laterally offset position may be no closer than approximately 10 cm to 20 cm to the closest lateral boundary of the current lane while the host vehicle 10 is in the laterally offset position. The range may define a maximum threshold proximity to the lateral boundary, to avoid confusing other road users in an adjacent lane on the other side of the lateral boundary, regarding the intentions of the host vehicle 10. In some examples, the amount of lateral offset may be constrained by a required minimum lateral separation distance from a road user within the adjacent lane. If the road user in the adjacent lane is detected passing or adjacent to the host vehicle 10, the amount of lateral offset may be reduced by the constraint.

The lateral offset may depend on a detected lateral offset of one or more other road users ahead of and/or behind the host vehicle 10. The host vehicle 10 may obey the swarm behaviour of the other road users.

In the example where a road user is filtering through traffic, the direction of the lateral offset may be away from the path of the filtering vehicle. The amount of lateral offset may be controlled to create a corridor of threshold width to allow a filtering vehicle to pass the host vehicle 10. The threshold width may be less for a motorcycle or push bike than for an emergency services vehicle. If the lateral separation of the host vehicle 10 from another road user adjacent the host vehicle 10 exceeds the threshold width, the lateral offset (if any required) may be sufficient.

Implementing block 11006 may comprise modifying the lane centring algorithm. For example, a cost of following a path that is not laterally offset away from the first lane may exceed the cost of following a path that is laterally offset away from the first lane.

Considering the example of a junction, the control system 200 may be configured to determine in dependence on navigation information whether the traffic disruption is to be avoided. The traffic disruption may be a traffic condition such as a traffic queue.

The control system 200 may determine whether the host vehicle 10 is to exit the highway at the junction. The first lane may meet the junction as described above. If the host vehicle 10 is to remain on the highway, the lateral offset may be away from the first lane as described above, such as shown in FIG. 22.

If the host vehicle 10 is to exit the highway at the junction and the host vehicle 10 is in the first lane already, no lateral offset may be implemented. In some examples, lateral offset may be increased in the direction of the junction, to signal an intention to leave the highway at the junction. If the host vehicle 10 is to exit the highway at the junction and the host vehicle 10 is not in the first lane, a lane change may be implemented into the first lane. The lane change may be as described in relation to the method 2100, 2200. The lateral offset may be towards the first lane and in advance of the lane change, to signal an intention to leave the highway at the junction.

Considering the example of a filtering vehicle, the control system 200 may be configured to determine if the host vehicle 10 is able to pull over, crossing the lane boundary of the current lane. In some situations, the applicable highway law takes precedence over allowing emergency services vehicles through. For example, the host vehicle 10 may be prohibited from crossing the lateral boundary of the current lane when there is no adequate space for a lane change. The host vehicle 10 may be prohibited from travelling too slowly. The control system 200 may be configured to implement block 11006 if the host vehicle 10 is unable to pull over. If the host vehicle 10 is able to pull over, the lateral offset may be beyond the lateral boundary of the lane and into a verge or adjacent lane.

Considering the example of the lane closure, the offset is in a direction away from the first lane. The increased lateral offset therefore reduces any laterally evasive manoeuvring required by the host vehicle 10, if road users pull out of the first lane just before the lane closure location, leaving little time for reaction.

Considering the example of the temporary street furniture, the offset is in a direction away from the temporary street furniture.

In some examples, the lateral offset of block 11006 may be accompanied by a change of speed of the host vehicle 10. The change of speed may be to reduce a speed difference between the host vehicle 10 and the traffic disruption. The change of speed may comprise deceleration of the host vehicle 10. The deceleration may comprise friction braking, overrun braking and/or regenerative braking. The host vehicle 10 may decelerate to a reduced target speed for passing the traffic disruption. The reduced speed further reduces the sensation of high speed because the host vehicle 10 may still be laterally quite close to the traffic disruption, even at the offset position.

In some jurisdictions and road types, an emergency corridor may need to be created when vehicles stop, even if there is no approaching emergency services vehicle. Therefore, the lateral offset may be temporarily overridden by an emergency corridor function when the host vehicle 10 is stopping, for instance in stop-start traffic.

In some examples, the control system 200 may cause further control of the host vehicle 10 to change lane to a second lane that is to a same side of the centre of the current lane as the lateral offset. The lateral offset may therefore be in preparation for the lane change. The lateral offset may be while the control system 200 waits for the space availability signal which is received when the traffic-aware lane change algorithm determines a threshold space (gap) in traffic in the second lane.

In some examples, block 11006 may be performed subject to confirmation that the traffic disruption exists, from a confirmation block equivalent to block 2208 of the method 2200.

Figure 24:
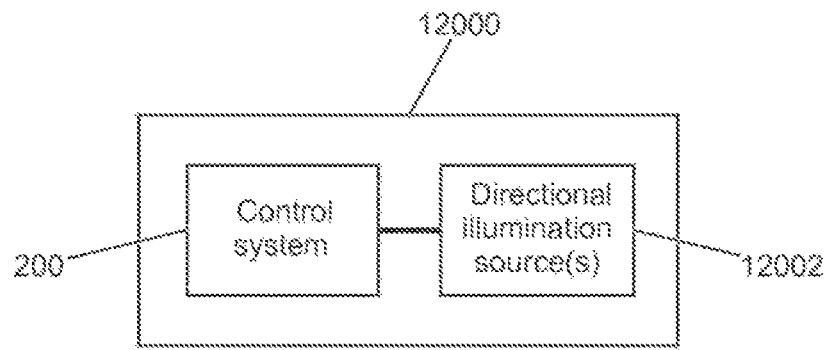
FIG. 24 illustrates an example of a system.
Figure 25:
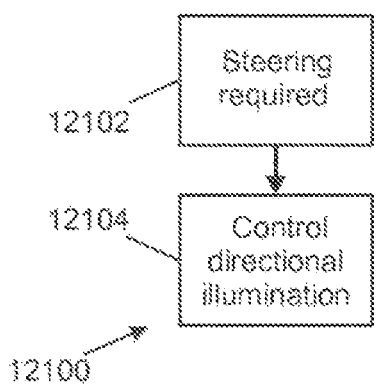
FIG. 25 illustrates an example of a method.

With reference to FIGS. 24 and 25, there is provided a method 12100 for controlling the host vehicle 10 operable in the autonomous mode (and, in some examples, operable in the non-autonomous mode), the method comprising: determining 12102 that a steering manoeuvre of the host vehicle 10 is required; and causing 12104 control of at least one directional illumination source 12002 to direct illumination towards an intended path of the host vehicle 10 associated with the steering manoeuvre, prior to commencement of the steering manoeuvre.

The directional illumination source 12002 may be for emitting light in the visible light spectrum. The directional illumination source 12002 may be for illuminating the environment external to the host vehicle 10. The directional illumination source 12002 may provide, at least in part, the function of a front headlamp of the host vehicle 10. The host vehicle 10 may comprise a directional illumination source 12002 to each lateral side of the host vehicle 10, proximal to the front bumper. The directional illumination source 12002 may be for a front headlamp module. In some, but not necessarily all examples, the front headlamp module may house the directional illumination source 12002 and other illumination sources for non-headlamp functions, such as turn signals. The directional illumination source 12002 may be operable in use to provide the function of at least a dipped beam and/or a full beam.

The directional illumination source 12002 may be directional to the extent that it enables a degree of automatic beam aim control. The automatic beam aim control may be along at least a horizontal plane. Relevant automatic beam aim control technologies comprise: directional headlamps; advanced front-lighting systems; glare-free high beam systems; and pixel light systems.

The directional illumination source 12002 may comprise a matrix lamp having a plurality of pixels. Such a lamp is within a class of lamps controllable using the technique known as a pixel light.

The plurality of pixels may be assembled on a common substrate or structure, or on a plurality of substrates or structures. The number of pixels may be in the order of tens. In some examples, the number of pixels may be in the order of hundreds. In some examples, the number of pixels may be in the order of thousands. In some, but not necessarily all examples, the pixels may comprise light emitting diodes.

The light (or other radiation) emitted by at least one of the pixels may have a direction defined by an optical axis which is different from the direction of light emitted by at least one other of the pixels. In some examples, the optical axes of each of the plurality of pixels may be oriented in a different direction relative to each other.

Each of the pixels may be associated with a distinct field of illumination with respect to the optical axis. When all of the pixels are illuminated, the edges of the fields of illumination of each pixel may overlap to create a smooth pattern of illumination.

The plurality of pixels may define a grid of pixels. The plurality of pixels may comprise pixels extending in a first direction. The plurality of pixels may also comprise pixels extending in a second direction. The second direction may be orthogonal to the first direction, or non-orthogonal. The field of illumination of the directional illumination source 12002 may be represented as a corresponding grid by the control system 200, wherein each pixel corresponds to a particular cell of the grid.

The horizontal extent of the maximum field of illumination of the directional illumination source 12002 as a whole (e.g. when the whole grid is illuminated) may be greater than 60 degrees with respect to the forward direction of the host vehicle 10. In some examples, the maximum width of the horizontal extent may be greater than approximately 170 degrees. In some examples, the maximum width of the horizontal extent may be greater than 200 degrees and less than 300 degrees. The headlamp module and the pixels may be shaped to enable this wide field of illumination.

The direction of the illumination may be controlled to the extent that different individual pixels or larger subsets (some, but not all) of the plurality of pixels may have a controllable intensity. Their intensities may be at least semi-independently controllable, optionally fully independently controllable. The intensity of at least one of the pixels may be semi or fully independently controllable compared to the intensity of at least one other of the pixels. In some examples, the one pixel and the other pixel may be directly neighbouring pixels. In some examples, any arbitrary one of the pixels is semi or fully independently controllable compared to any arbitrary other one of the pixels. The intensities may be controlled by an intensity map in the controller 202 or the like. The intensity map may correspond to the grid. It would be appreciated that when the intensity map changes, the effective direction of the smooth pattern of illumination changes.

The plurality of pixels may be operable under the control of any suitable controller to perform the method 12100, and optionally at least one of the following functions: dipped beam; full beam; directional headlamp (based on upcoming road curves and/or steering inputs); glare-free high beam (detects other road users and shades them from the high beam pattern by controlling pixel intensity).

In at least one example operating scenario, objects such as other road users within the grid of the field of illumination, recognised from the sensing means, may be matched with specific pixels by the controller 202. The intensity of the specific pixels can be controlled accordingly to highlight the road user or to shade road user.

With reference to FIG. 24, there may be provided a system 12000, comprising: the control system 200, including at least a first controller 202, wherein the at least a first controller is arranged to output a signal for causing control of the directional illumination source 12002; and the directional illumination source 12002 configured to receive the signal and to direct its output illumination in dependence on the signal. The signal may be associated with the method 12100.

With reference to FIG. 25, there is provided a method 12100 of controlling the directional illumination source 12002. The method may be performed by the control system 200. The method may control respective directional illumination sources on left and right sides of the host vehicle 10.

The method 12100 may be implemented at night when the illumination is likely to be visible. For example, the method 12100 may be performed when a headlamp function (dipped beam or full beam) is set to on, or to auto wherein ambient external light levels are low.

The method comprises, at block 12102, determining that a steering manoeuvre of the host vehicle 10 is required.

The requirement may be from any one of the earlier described algorithms, such as the lane change algorithm. Therefore, the steering manoeuvre may be required for changing lanes to satisfy a navigation constraint, to overtake another road user, or to move to a nearside lane.

The method may determine whether the lane change requires the host vehicle 10 to yield to any other road users in the target lane. Lane changes on most road types generally require the host vehicle to yield, because the host vehicle 10 has to cross a lateral boundary of the current lane of the host vehicle 10 and enter an adjoining lane. Any road users in the adjoining lane have right of way.

In some examples, if the steering manoeuvre is for another purpose such as navigating a curve in the road, in which the host vehicle 10 retains right of way and does not yield to other road users, the method may not proceed to block 12104.

In some examples, the method proceeds to block 12104 even if no actual road users with right of way are detected, just in case they are undetectable (e.g. driving with lights off). In other examples, the method does not proceed to block 12104 if no road users with right of way are detected, e.g. approaching the host vehicle 10 from behind at a greater speed than the host vehicle 10.

At block 12102, the controller 202 may receive or determine information indicative of the direction of the steering manoeuvre. For example, the information may be indicative of whether the steering manoeuvre is to the left or to the right. The information may be more detailed. The information may be indicative of a specific target lane associated with the lane change. The information may even be indicative of the specific path projected ahead of the host vehicle 10, as determined by the path planning algorithm for example.

At block 12104, the method comprises causing control of at least one directional illumination source 12002 to direct illumination towards an intended path of the host vehicle 10 associated with the steering manoeuvre.

Directing the illumination towards the intended path may be satisfied by directing illumination more leftwards if the direction of the steering manoeuvre is left, and more rightwards if the direction of the steering manoeuvre is right. If the more detailed information is available, the direction of the illumination may be more precisely controlled than the above binary example. Tens, hundreds, thousands, or substantially continuous levels of adjustment of direction of the illumination may be possible.

The direction may be controlled to align with the target lane if the target lane is known, and optionally to illuminate any intervening lanes to be crossed when reaching the target lane. If the specific path is known, the direction may be controlled to align with the specific path of the host vehicle 10 according to the path planning algorithm.

Directing the illumination may comprise determining one or more subsets of the plurality of pixels with fields of illumination aligned with the steering manoeuvre, e.g. pointing at the target lane and/or planned path. For example, the subset may be to the left or right side based on whether the steering is left or right. In some examples, the control system 200 may sense the target lane using the sensing means and determine which grid points of the field of illumination correspond to the target lane. The grid points may be matched to specific pixels. The subset of pixels may comprise at least the specific pixels and optionally further pixels around the specific pixels. The control system 200 may determine which grid points are intersected by the path. The subset of pixels may comprise at least the intersected pixels and optionally further pixels around the intersected pixels.

The subset contains fewer than the plurality of pixels and comprises one or more pixels.

The illumination is said to be directed in a particular direction at least when the intensity of light in that direction is greater than what it otherwise would have been in that direction had block 12104 not been performed. For example, the pixels in the subset may be activated or brightened. The intensities of pixels outside the subset may be unchanged or dimmed.

An advantage is that other road users may be warned of the intention of the host vehicle 10 to perform the steering manoeuvre. This may supplement a signal by turn signals of the host vehicle 10. In some examples, the illumination may be controlled to provide an even more distinctive message signalling other road users of the host vehicle's intention to perform the steering manoeuvre. These are described below.

A further advantage of the directed illumination is that the directed illumination may be within a field of view of the sensing means such as at least one visual (optical light) camera 308 of the host vehicle 10. An output of the visual camera 308 may be associated with at least one function for controlling autonomous driving in the autonomous mode. Therefore, the directed illumination assists with machine vision for autonomous driving.

The control system 200 may be configured to control a shape of at least one of the one or more beams in dependence on the determining that a steering manoeuvre is required. The beam refers to the aggregate beam formed by the subset of pixels. The shape may be a predetermined shape or may vary in dependence on parameters. For example, controlling the shape may comprise changing a width of the beam. In one example, controlling the shape may comprise causing the beam to project an arrow with an arrow head. The arrow may be projected onto the road surface or be controlled to be projected onto a vertical surface such as a traffic barrier. The arrow is a universally recognised symbol of a road user's steering intentions, so gives a clear warning to other road users.

The shape of the arrow projection may be controlled by anamorphosis so that the arrow meets certain geometric targets from the perspective of a rearward position in the target lane. The geometric targets may include a stem size, a head size, a stem to head ratio (width or length), a symmetry requirement, an appearance of being painted on the ground plane, or a combination thereof. The anamorphosis may maximise the ability of a road user in the target lane to see and interpret the arrow as an arrow. This is particularly useful if the arrow is aligned to the planned path of the vehicle and is very long, e.g. over 30 metres or over 60 metres. The arrow may be indistinguishable from other perspectives, for instance so that even if the arrow projects beyond a road user forward of the host vehicle in the target lane, the forward road user may not perceive the arrow. The anamorphosis could be applied to other shapes in other examples, however an arrow is a recognisable symbol of intended direction.

If the illumination comprises a shape such as an arrow, the illumination is said to be directed in a particular direction at least when the shape is in that direction. The shape may be controlled to have a greater intensity than the surrounding light. The contrast makes the shape discernible, so the average intensity of light in the particular direction does not necessarily have to be greater than in the other direction, as long as the shape is discernible. In some examples, the shape may be controlled to have a reduced intensity relative to the surrounding light so that the shape appears like a shadow.

In some examples, the control system 200 may be configured to cause one or more turn signals located on a side of the host vehicle 10 towards the direction of the required steering to illuminate in dependence on the required steering. The control system 200 may illuminate turn signals to the front of the host vehicle 10 (e.g. in the headlamp module), to the side (e.g. side repeater), and to the rear (e.g. in tail light module), but only to the side corresponding to the steering manoeuvre.

In some examples, the control system 200 may be configured to cause a periodicity associated with the illumination to be associated with a periodicity associated with the illumination of the turn signals. The periodicity may comprise a periodicity of an intensity of the illumination. The periodicity associated with the illumination may be in phase with the periodicity associated with the illumination of the turn signals. To provide an example, the intensity of at least the subset of pixels may be varied with a periodicity that matches the periodicity of the turn signals, wherein the intensity increases at substantially the same time that the turn signal intensity increases and/or wherein the intensity reduces at substantially the same time that the turn signal intensity reduces. This provides an even stronger association with the road user's intention to turn.

The periodicity of the intensity of the illumination may refer to a periodicity of turning the illumination on and off, or a periodicity of sweeping the illumination in the manner of a sweeping indicator (sweeping turn signal), depending on implementation.

Block 12104 may be implemented fewer than ten seconds before the host vehicle 10 crosses the lateral boundary of the current lane and into the target lane. This gives other road users a few seconds warning of the road user's intentions. In some examples, block 12104 may be triggered in response to the space availability signal or any other signal that external conditions are suitable for the steering manoeuvre.

Block 12104 may be completed prior to commencement of the steering manoeuvre. In some examples, block 12104 may continue after commencement of the steering manoeuvre. Block 12104 may end after the host vehicle 10 has crossed to the target lane or is within a threshold of completing the steering manoeuvre, or once the steering manoeuvre is complete. Example early abort conditions for block 12104 may comprise aborting the manoeuvre.

In some examples, the direction of the illumination may be controlled to give the appearance that the host vehicle 10 is driving into the illumination. Therefore, the illumination may take the approximate appearance of an illuminated path of the host vehicle 10. The illumination may be approximately aligned with the planned path of the host vehicle 10, for example a straight line or shape of the illumination may intersect a reference point along a clothoidal or sigmoidal planned path. The direction of the illumination may be controlled as the host vehicle 10 is steered, to ensure that the illumination remains in alignment with the planned path despite the changing angle of the host vehicle 10.

In the above examples relating to the directional illumination source, the host vehicle 10 comprises an autonomous mode. However, at least some of the above features are considered novel for vehicles without an autonomous mode. A controller of a non-autonomous vehicle may operate the directional illumination source reactively in response to steering inputs, or for predicted steering inputs in dependence on driver monitoring via a camera or other driver monitoring means.

With reference to FIG. 26, there is provided a method 13000 of controlling the host vehicle 10 operable in the autonomous mode (and, in some examples, operable in the non-autonomous mode), the method comprising: determining 13002 a requirement for a first manoeuvre comprising a lateral motion of the host vehicle 10; determining 13004 a requirement for a second manoeuvre comprising a lateral motion of the host vehicle 10, wherein the first manoeuvre and the second manoeuvre are non-simultaneous; and combining 13006 the first manoeuvre with the second manoeuvre to generate a third manoeuvre that is substantially continuous.

By way of context, prior autonomous vehicles may, for example, perform a manoeuvre such as changing lanes unnecessarily early on approaching a location for another manoeuvre such as following a change in road curvature, and consequently have to disturb the lateral acceleration of the occupants twice. Combining the manoeuvres avoids this.

At block 13002, the method comprises determining the requirement for the first manoeuvre comprising a lateral motion of the host vehicle 10. The first manoeuvre may comprise one or more lateral motions. The lateral motion may be a lateral motion from a vehicle-perspective. The lateral motion(s) may comprise a left motion, a right motion, or a combination thereof. Each lateral motion may impart perceptible lateral force on occupants of the host vehicle 10. The perceptible lateral force may comprise lateral acceleration and/or lateral jerk.

The first manoeuvre may be required by a first autonomous mode function of the host vehicle 10. The requirement may be determined by the lane change algorithm. However, the requirement may be determined by other algorithms in other examples. For example, the requirement may be determined by the lane centring algorithm. The requirement for the first manoeuvre may be to satisfy one or more requirements such as: the nearside bias function; a target lane position; a navigation constraint; avoiding a traffic queue; avoiding a lane closure; or any other of the requirements mentioned herein.

The term 'requirement' relates to at least an intent but does not imply that the host vehicle 10 necessarily has to perform the manoeuvre.

In an example, the first manoeuvre may comprise a lane change from a first lane to a second lane. The first and second lanes may be available for travel in a same direction of a road or highway. The direction of the lane change may be nearside or offside, as required.

In some, but not necessarily all examples, the first manoeuvre is a manoeuvre that can be advanced and/or can be delayed. The timing and/or rate of performing the first manoeuvre may be changeable. A lane change is an example of such a manoeuvre, because usually there is some flexibility over when to change lane. For example, the may determine whether to change to a nearside lane after overtaking another road user, in dependence on whether there is a road user behind the host vehicle 10. If there is no road user is following the host vehicle 10, there may be no urgency to change to a nearside lane. However, various constraints are defined later on in which it may not be desirable to advance or delay a lane change.

A lane change is an example of a manoeuvre that imparts at different times, lateral forces on an occupant of the host vehicle 10 in a first direction and in a second direction opposite the first direction, from a vehicle perspective. This is because the lateral force of the first manoeuvre may have an approximately clothoidal or sigmoidal shape when plotted with respect to distance or time. If the first manoeuvre is a rightwards lane change, a force to the right is experienced when leaving the first lane, and then a force to the left is experienced when aligning with a position in the second lane as required by the lane centring algorithm.

These opposite sign forces may be sufficiently high that the left-right oscillation may even be experienced while prior autonomous vehicles change lanes on curved roads. To give an example use case, the lateral g-force for the curved road may be −0.1 g. If the peak lateral positive g-force of a portion of the lane change is greater than +0.1 g, then the occupants may still feel a left-right oscillation if the net peak positive force is >0 g. The path of the host vehicle 10 in this situation would be the clothoidal or sigmoidal shaped path (lane change) superimposed onto a curved path (road curve). Aspects of the present method, defined below, improve comfort compared to this situation.

At block 13004, the method comprises determining the requirement for the second manoeuvre comprising a lateral motion of the host vehicle 10. The second manoeuvre may be a manoeuvre that imparts lateral forces on the occupant in at least the first direction, which may be left or right. In some examples, the lateral forces may be in both the first and second directions.

An example second manoeuvre is following at least part of a curve on the road on which the host vehicle 10 is travelling.

The curve may be a simple curve, a compound curve, a reverse curve, a deviation curve, or any other curve.

The second manoeuvre may be for the whole curve. Alternatively, the second manoeuvre may be for part of the curve such as a tightest section of a compound curve, one curve direction of the reverse curve, or one of the reverse curves of a deviation curve. The specific portion of the curve may be identified using a constraint (e.g. cost function) for reducing lateral force (e.g. effect of acceleration and/or effect of jerk). The second manoeuvre may therefore form part of a larger manoeuvre(s) assigned to the whole curve.

The second manoeuvre may be one that cannot be advanced and/or cannot be delayed. For example, the host vehicle 10 may leave the road if the second manoeuvre is not performed to tight tolerances. The host vehicle 10 needs to follow the curve. The host vehicle 10 may need to keep within lane boundaries. There may be limited freedom to choose a driving line through the curve, but this does not correspond to advancing or delaying the manoeuvre as defined herein.

In another use case, the second manoeuvre may be one that can be advanced and/or can be delayed. For example, the second manoeuvre may comprise another lane change or lane centring action.

Not all embodiments of the method relate to lane changes and curves. Other potential use cases include a requirement to pull out of a junction (first manoeuvre) onto a road with at least two lanes for travel in one direction, and then a requirement to change lane (second manoeuvre). In the case of roundabouts, the first manoeuvre could be leaving the roundabout and the second manoeuvre could be changing lane. If the roundabout has a multi-lane exit, the manoeuvres may be combined.

Notwithstanding that these other use cases exist; autonomous vehicles are regarded as particularly lacking capability of smoothly merging lane changes with road curves.

The method determines that the first manoeuvre and the second manoeuvre are non-simultaneous.

One of the manoeuvres may be at least initially scheduled to be performed earlier or later than the other, so that they are non-simultaneous, e.g. lane change on a straight road. As a result, performance of the manoeuvres would not fully overlap. If the second manoeuvre is for part of a curve, the first manoeuvre may have been scheduled for a different part of the curve, which may not be the 'optimal' point along the curve for reducing lateral force.

One of the non-simultaneous manoeuvres may follow the other. One may follow the other directly such that no other manoeuvres are scheduled between the first manoeuvre and the second manoeuvre. Alternatively, other manoeuvres may be scheduled between the first manoeuvre and the second manoeuvre.

In some, but not necessarily all examples, a second manoeuvre may be selected for combining with the first manoeuvre, from a plurality of candidate manoeuvres. A constraint (e.g. cost function) for reducing lateral force, may be used to select a manoeuvre as the second manoeuvre, in dependence on a target such as lowest lateral force. For example, a good candidate curve would be one with a relatively short curve radius, because the amount of potential lateral force peak reduction by applying the method 13000 could be greater.

The relevant information about the second manoeuvre and/or the first manoeuvre may be known from the map data, dynamic data, and/or sensing means. For example, although the curve radius may not be known directly, indications of curve radius may be obtained by any appropriate means such as plotting deviations of the lane centre from a straight line projected from the host vehicle 10, and/or by processing map data.

The requirement for the second manoeuvre may be determined by a different autonomous mode function from the first manoeuvre. In the case of a curve, the requirement for the second manoeuvre may be performed by the path planning algorithm. The requirement for the second manoeuvre may be to satisfy one or more constraints such as a target lane position.

At block 13006, the method comprises combining the first manoeuvre with the second manoeuvre to generate a third manoeuvre that is substantially continuous.

In the example in which the first manoeuvre can be delayed or advanced, the combining may comprise delaying or advancing the first manoeuvre. As a result, the first and second manoeuvres may be aligned. This may merge multiple lateral forces or jerks into fewer disturbances for the vehicle occupants.

The permissible delaying or advancing may be of the order of tens of seconds or more. By this time, the host vehicle 10 would normally have done the first manoeuvre had it not been combined with the second manoeuvre.

If the second manoeuvre can also be delayed or advanced, the combining may further or alternatively comprise delaying or advancing the second manoeuvre.

In some, but not necessarily all examples, more than two manoeuvres could be combined.

Combining the non-simultaneous manoeuvres does not mean that the manoeuvres must have identical start and end times, although they might. They may be combined such that one manoeuvre may be contained within the other and has a shorter duration. The manoeuvres have overlapping portions but may still have non-overlapping portions. In an example, at least two non-contemporaneous manoeuvres in which the end of one does not overlap the beginning of the next may be made contemporaneous so that the start and/or end of one occurs between the start and end of the next.

The third manoeuvre corresponds to the combined first and second manoeuvres. The combined manoeuvre is substantially continuous, at least to the extent that the combined first and second manoeuvres are performed in a smoother manner than a coincidental situation in which the first and second manoeuvres happened to be scheduled for the same location, e.g. lane change on a curve.

Combining the non-simultaneous manoeuvres may be subject to one or more constraints.

The constraint may comprise a navigation-dependent constraint. For example, the first manoeuvre may need to be performed before a certain location to enable the host vehicle 10 to continue along a planned navigation route. For instance, the lane change may need to be performed before an off-ramp is reached.

The constraint may be associated with reducing energy use of the host vehicle 10, such as an energy use cost function. The energy use constraint may inhibit combining the manoeuvres when energy use would increase. For example, if delaying the lane change would first require the host vehicle 10 to slow down for a road user in front (e.g. heavy goods vehicle), then the lane change should not be delayed as the extra acceleration required would adversely affect fuel economy.

The constraint may be associated with avoiding an object. The object may be a traffic queue, a lane closure, or another obstruction, recognised by the control system 200. The object may be static or moving. For example, the first manoeuvre may need to be performed before the object is reached.

If the constraint(s) cannot be satisfied, the method 13000 may terminate and wait for another first manoeuvre to be required.

Combining the first manoeuvre and the second manoeuvre may comprise delaying the first manoeuvre until after the requirement to perform the second manoeuvre is determined. The first manoeuvre may be delayed indefinitely for as long as the constraint(s) are satisfied. Alternatively, the first manoeuvre may be delayed until a time out is reached, to avoid occupant perception that the host vehicle 10 is disobeying applicable highway law. Delaying the first manoeuvre may comprise overriding the autonomous mode function that requested the first manoeuvre, e.g. the lane change algorithm.

Then, a decision may be made as to whether to combine the manoeuvres. If they cannot be combined, the first manoeuvre may be delayed further or performed without delay. If they can, block 13006 may be performed.

The combining decisions may be made in response to block 13002. In some examples, at least some combining decisions may be made at the beginning of a journey or at the beginning of use of the autonomous mode, if enough map data is available and a navigation route is available.

Combining the first manoeuvre and the second manoeuvre may comprise more than advancing or delaying one or both of the manoeuvres. Combining them may comprise smoothing lateral force on an occupant of the host vehicle 10 associated with the first and second manoeuvres. The smoothing may be pre-planned, for instance by the path planning algorithm. Therefore, the smoothing may further improve the occupant comfort for the substantially continuous third (combined) manoeuvre.

The smoothing may comprise smoothing a magnitude of the lateral force on the occupant of the host vehicle 10. The magnitude is lateral acceleration dependent. Therefore, lateral force magnitude can be reduced by smoothing lateral acceleration. Lateral acceleration may be smoothed by modifying the lateral position of a path of the host vehicle 10 to form a smoother path with less lateral acceleration.

The smoothing may comprise smoothing a rate of change of the lateral force on the occupant of the host vehicle 10. The rate of change is jerk dependent. Lateral jerk can be smoothed by modifying the lateral position of a path of the host vehicle 10 by modifying the lateral position of a path of the host vehicle 10 to form a smoother path with less jerk.

As mentioned previously, the first manoeuvre may comprise lateral motions in the first and second directions, and the second manoeuvre may comprise lateral motion at least in the first direction. The smoothing may comprise controlling a path of the host vehicle 10 to cause the lateral force that would be in the second direction to be inhibited. For instance, for a second manoeuvre with −ve lateral forces, >0 g lateral force for the third (combined) manoeuvre may be inhibited (reduced or removed). This may be achieved by changing lateral position for the first manoeuvre more slowly.

The smoothing may comprise controlling a path of the host vehicle 10 to cause the lateral force that would be in the second direction to be in the first direction (or zero at most). Using the above example, >0 g lateral force for the third (combined) manoeuvre may be prevented.

The smoothing may comprise controlling a path of the host vehicle 10 to cause all lateral forces for the third manoeuvre to act continuously in the first direction, wherein without the combining or the smoothing, the first manoeuvre would have comprised lateral force in the second direction.

The smoothing may be achieved by planning a path for the third (combined) manoeuvre to change a cornering (curve) radius for at least part of the second manoeuvre to perform at least part of the first manoeuvre. The entire first manoeuvre may be performed solely by gradually decreasing or increasing the curve radius for the second manoeuvre.

If the first manoeuvre comprises a clothoidal or sigmoidal path (e.g. lane change), and the second manoeuvre comprises a curved path (e.g. road curve), the third manoeuvre may comprise a substantially spiroidal path which is smoother than a curved clothoidal or sigmoidal path.

An example use case will be described, wherein the first manoeuvre is a lane change to the right, and the second manoeuvre is a left curve of the road. The third (spiroidal) manoeuvre starts by entering the left curve at a first curve radius. The spiroidal manoeuvre increases the curve radius. The spiroidal manoeuvre completes the lane change by decreasing the radius of the left turn to meet the target lane position at a tangent. The path followed is smooth and spiroidal. The path does not allow lateral force to be rightwards during the lane change, so that the occupants does not experience a change of force sign.

For a lane change to the left on a left curve, the spiroidal path may comprise decreasing then increasing the curve radius.

The path may further be smoothed to reduce the number of lateral force peaks. For instance, the spiroidal path may be optimised to avoid a sharp increase of curve radius then a sharp decrease of curve radius, which would cause lateral force peaks at the start and end of the lane change. The lateral forces may be controlled to merge multiple force peaks into a single curve, for instance a parabolic or gaussian lateral force curve.

A peak lateral force for the first manoeuvre may be merged with a peak lateral force for the second manoeuvre. For instance, the timing of a force peak associated with the lane change may be controlled to align with turn in to the curve.

The variance of lateral force may be reduced. For instance, a lateral force peak may be merged with a lateral force trough or peak of opposite sign. Therefore, the lateral forces may at least partially cancel each other out.

The force variance may be reduced by lengthening the duration over which the lateral force occurs. A small force over a long duration has a lower magnitude than a high force over a short duration.

The third manoeuvre may be planned with knowledge of the curve geometry. The lateral force for the third manoeuvre may be skewed in dependence on curvature information. Curvature information is indicative of variations in curvature of a particular road curve. Curvature information may be derived from map data and/or the sensing means. The lateral force may be skewed to reduce a parameter such as the number of lateral force turning points, the number of lateral force peaks, the number of changes of lateral force sign, or the lateral force variance. In an example, the curve radius of the road curve may change magnitude and/or sign with respect to length. The smoothing could skew (align) the lateral force to different locations along the curve, to reduce the parameter.

In view of the above examples, smoothing may be regarded as controlling the lateral force for the third manoeuvre to reduce a parameter such as one or more of: the number of lateral force turning points; the number of lateral force peaks; the number of changes of lateral force sign; or the lateral force variance.

The above examples refer to combining two lateral manoeuvres. The above principles may also apply to combining two longitudinal manoeuvres, such as reducing speed for a red traffic light (first manoeuvre) and reducing speed for a pedestrian that wishes to cross before the traffic light is reached (second manoeuvre). The above principles may apply to combining a lateral and a longitudinal manoeuvre.

With reference to FIG. 27, there is provided a method 14000 for the host vehicle 10 operable in the autonomous mode (and, in some examples, operable in the non-autonomous mode), the method comprising: determining 14002 a manoeuvre requirement indicative of a required manoeuvre of the host vehicle 10 to be performed; receiving 14004 environment information indicative of the environment in the vicinity of the host vehicle 10; determining 14006, in dependence on the manoeuvre requirement and the received environment information, that the required manoeuvre cannot be carried out while satisfying a first manoeuvring constraint; determining 14008 an intent manoeuvre to signal to another road user the intention of the host vehicle 10 to carry out the required manoeuvre; and causing 14010 the host vehicle 10 to complete the intent manoeuvre and the required manoeuvre in dependence on whether at least one second manoeuvring constraint is satisfied; wherein the second manoeuvring constraint associated with the intent manoeuvre is different from the first manoeuvring constraint associated with the required manoeuvre.

This assertive intent manoeuvre may help the autonomous vehicle to create manoeuvring opportunities, even in heavy traffic. The principles herein may be applicable to a highways-only autonomous mode, or an autonomous mode for a variety of road types.

Block 14002 comprises determining a manoeuvre requirement indicative of a required manoeuvre of the host vehicle 10 to be performed.

The required manoeuvre may be any manoeuvre that requires the host vehicle 10 to change its current speed or course or position in traffic, or a combination thereof. The manoeuvre may be required by one of the above described algorithms, such as the lane change algorithm.

The manoeuvre may be required by a navigation constraint and/or an environment characteristic from the environment information.

The manoeuvre may be to change lanes, to drive around an obstacle such as a parked vehicle, to enter a junction such as a roundabout, to enter a road from a slip road, or the like.

Block 14004 comprises receiving the environment information indicative of the environment in the vicinity of the host vehicle 10. The environment information may be from the sensing means. Information about objects, roads and other road users may be derived from the environment information.

Block 14006 comprises determining, in dependence on the manoeuvre requirement and the received environment information, that the required manoeuvre cannot be carried out while satisfying one or more constraints. The one or more constraints comprises at least a first manoeuvring constraint.

The one or more constraints may comprise one or more performance indices (cost functions). The first manoeuvring constraint may relate to at least one of the performance indices. Exclusive use of the first manoeuvring constraint of the one or more constraints can make the behaviour of the host vehicle 10 unusually unassertive compared to human drivers.

A detectable example in which the required manoeuvre cannot be carried out while satisfying the first manoeuvring constraint may comprise a traffic conflict. A traffic conflict comprises a situation in which an expected path of the host vehicle 10 and a current or expected path or location of another road user intersect each other, in such a way that the host vehicle 10 and the other road user would collide if they continued along their respective paths. The path of the other road user may be determined in dependence on tracking their trajectory and associating the trajectory with one or more available paths for the other road user. The speeds and/or rates of closure of the host vehicle 10 and the other road user may be determined to determine whether the paths intersect.

The first manoeuvring constraint may be capable of being satisfied in dependence on determining the absence of a traffic conflict, and not capable of being satisfied in dependence on determining the presence of a traffic conflict.

The first performance index may be configured such that the cost of continuing with the required manoeuvre and not yielding, is higher than yielding to the other road user. This would make the host vehicle 10 unassertive in traffic conflicts.

Yielding comprises creating or maintaining a space for the path of a road user, in other words not starting an action or aborting an action that is associated with the traffic conflict. Not yielding comprises starting or continuing an action or path associated with the traffic conflict such that the non-yielding road user blocks progress of the other vehicle involved in the traffic conflict.

The traffic conflict may be determined in dependence on traffic priority information indicative of which road users have priority. The traffic conflict may be determined in dependence on path information indicative of a path of the other road user.

The traffic priority information may indicate whether the host vehicle 10 has priority over the other road user. The traffic priority information may indicate whether the other road user has priority over the host vehicle 10.

The traffic priority information may be determined in dependence on the environment information and/or the map data. The traffic priority information may be dependent on one or more of: a location of an obstacle such as a parked car; road markings such as lane boundaries; road sign information, etc.

The host vehicle 10 may be determined not to have priority other the other road user in at least one of the following situations: the host vehicle 10 has to deviate its path to avoid an obstacle whereas the other road user does not have to deviate its path to avoid the/an obstacle; the host vehicle 10 has to cross a lane boundary whereas the other road user does not; a road sign indicates the host vehicle 10 to yield to the other road user. Whether the other road user has priority may be determined in an equivalent way.

The traffic conflict may be determined in dependence on the traffic priority information when at least one of the following is determined: both the host vehicle 10 and the other road user are determined to have priority over the other; a failure to identify which of the host vehicle 10 and the other road user has priority over the other has occurred; or one of the vehicles has priority over the other but priority is re-negotiable (discussed below).

The traffic conflict may not be determined if one of the vehicles has priority over the other but priority is not re-negotiable. This distinguishes non-deterministic traffic management in which traffic conflicts may arise, from deterministic traffic management such as traffic lights in which there is no 'conflict' as such. Non-deterministic traffic management enables road users to communicate with each other to manage traffic conflicts in which priority can be negotiated or re-negotiated (e.g. priority narrowing, chicanes, unmarked junctions). Deterministic traffic management comprises instructions establishing priority which must be obeyed, such that priority cannot be re-negotiated. The distinction between negotiable and non-negotiable priority may be made in dependence on road marking and/or road sign recognition, for example recognition of a red traffic light.

The path information associated with the path of the other road user may identify actions and/or paths available to the other road user. If none of the available actions or paths of the other road user create a conflict, then a traffic conflict may not be determined and therefore the first manoeuvring constraint may be satisfied.

If at least one of the available actions or paths of the other road user creates a traffic conflict, the traffic conflict may be capable of being determined. In some examples, the determination of a traffic conflict may be dependent on an indication of certainty associated with the available action or path that creates the traffic conflict. If the certainty of the conflict-creating path or action is above a threshold (fixed threshold, or relative to other paths/actions), the conflict-creating path may be determined as the expected path of the other road user, so the traffic conflict may be capable of being determined. In an example, while a road user approaches an area associated with the traffic conflict, the time available for a change of mind decreases. The severity of steering/braking/acceleration for a change of mind action increases. The certainty of a conflict-creating path/action may increase and/or the certainty of a non-conflict creating path/action may decrease. A probabilistic decision-making algorithm may be used. The algorithm may be trained in use with machine learning.

Continuous non-satisfaction of the first manoeuvring constraint over a long period of time may cause problems in situations when assertive driving is needed, such as rush hour. In some examples, the method may determine whether to proceed to block 14008 or allow continued non-satisfaction of the first manoeuvring constraint. This determination may be performed reactively in dependence on monitored past non-satisfaction of the first manoeuvring constraint, and/or predictively in dependence on expected continued non-satisfaction of the first manoeuvring constraint (e.g. from dynamic traffic data and/or sensing means). If excessive (e.g. above-threshold) non-satisfaction is determined, then the method 14000 may proceed to block 14008. If it is non-excessive, the method 14000 may continue to wait for satisfaction of the first manoeuvring constraint. This determination is useful in situations such as changing lanes when the host vehicle 10 is past the back of a traffic queue in the target lane, and such as entering a major road or roundabout with busy traffic from a yield location at a junction. These situations arise frequently in rush hour.

Rush hour calls for assertive driving because more road users are unwilling to 'give up' their position to another vehicle, and more road users break requirements or guidance in the applicable highway law, such as leaving a space for other traffic. The method 14000 enables assertive driving when required and is not necessarily limited to rush hour.

Block 14008 comprises determining an intent manoeuvre to signal to another road user the intention of the host vehicle 10 to carry out the required manoeuvre. In other words, an attempt will be made to carry out the required manoeuvre despite non-satisfaction of the first manoeuvring constraint. Communication with the other road user is needed. The another road user may be the other road user as described for the earlier blocks, associated with the traffic conflict.

The purpose of the intent manoeuvre is to instruct or at least encourage the other road user to yield to the host vehicle 10, in a substantially deterministic way.

The intent manoeuvre controls the dynamics of the host vehicle 10, as opposed to other visual or audible intent signals such as illuminating turn signals, illuminating brake lights, illuminating full-beams of headlamps, or sounding a horn. The applicable highway law may prohibit or discourage flashing of full beams or sounding of horns to negotiate priority. Brake lights may not be visible if the vehicles are side by side or in opposing directions. Headlamps may not be visible when approaching a road user from behind. Turn signals are a unique situation. Applicable highway law and the autonomous mode may not treat turn signals as deterministic. If both the vehicles involved in the traffic conflict use their turn signals at once, the intent manoeuvre may be useful to resolve ambiguity. If there are driveways or junctions nearby which are unrelated to the manoeuvre, detection of a turn signal may be associated with multiple potential paths or actions rather than a single path or action. An intent manoeuvre would help in this instance. Of course, detection or performance of the above visible or audible intent signals may nonetheless influence the determination of whether the first manoeuvring constraint is satisfied, and/or may supplement the intent manoeuvre.

The intent manoeuvre is distinct compared to the required manoeuvre, in that at least the magnitude of a dynamic characteristic of the host vehicle 10 is amplified to emphasise upcoming performance of the required manoeuvre. The intent manoeuvre is controlled to be perceptible to other road users, for example by an appropriate algorithm derived from experimental data on human perception. For example, a perceptible amount of dive, rebound or squat may be from approximately 3 cm to approximately 8 cm at a certain rate (cm/s). The intent manoeuvre signals the upcoming action of blocking the path of the other road user which is associated with the traffic conflict, so that the other road user will need to create or not enter a space associated with the required manoeuvre of the host vehicle 10.

In some examples, a machine learning algorithm may be trained as intent manoeuvres are performed, by analysing via the sensing means whether acknowledgement signals are returned from other road users in response to the intent manoeuvre. The acknowledgement signals may comprise submission manoeuvres as described below, and/or head or hand gestures such as nods and waves. The detection of acknowledgement signals reinforces that the dynamic characteristic is sufficiently amplified. The non-detection of acknowledgement signals trains the machine learning algorithm to further amplify the dynamic characteristic, up to a limit such as a comfort limit.

The dynamic characteristic which is controlled to be perceptible may comprise the amount of the dynamic characteristic, or the rate of change of the dynamic characteristic (how fast the dynamic characteristic changes), or a combination thereof.

The intent manoeuvre may signal a longitudinal dynamic characteristic such as acceleration or braking, or a lateral dynamic characteristic such as steering, or a combination thereof.

One way in which the longitudinal dynamic characteristic may be signalled is by controlling a change of speed of the host vehicle 10. The change may be a rate of change. The rate of change may be sufficiently high as to be perceptible to other road users.

Another way in which the longitudinal dynamic characteristic may be signalled is by controlling a suspension of the host vehicle 10. The longitudinal dynamic characteristic may comprise one or more of: dive; rebound; squat; weight transfer. Dive relates to compression of front suspension springs, which signals braking. Squat relates to compression of rear suspension springs, which signals acceleration. Squat may be performed while a vehicle is moving or stationary. Rebound relates to return of compressed suspension springs to a less compressed or uncompressed state. The front suspension may rebound when releasing brakes. The rear suspension may rebound when reducing engine output torque from a higher amount. Rebound may signal a change of mind if the vehicle is still moving. Weight transfer is the mechanism by which dive, rebound and squat occurs. The suspension may be controlled by controlling brake demand and/or torque demand.

One way in which the lateral dynamic characteristic may be signalled is by controlling a steering angle of one or more steerable road wheels of the host vehicle 10. For example, the host vehicle 10 may stop behind a parked car and turn its road wheels away from the area associated with the traffic conflict by an emphasised amount/rate. This is easier to do when the speed of the host vehicle 10 is low, for example within the range 0-10 kilometres per hour.

Another way in which the lateral dynamic characteristic may be signalled is by controlling a change of lateral position of the host vehicle 10. The change may be a rate of change. For example, if the host vehicle 10 quickly veers towards a path associated with the required manoeuvre, the intent may be clearly signalled.

Another way in which the lateral dynamic characteristic may be signalled is by controlling the suspension of the host vehicle 10, via weight transfer. The weight transfer may be lateral. The lateral weight transfer increases suspension compression on the side of the host vehicle 10 furthest from the centre of the turn while concurrently reducing compression or extending suspension on the side of the host vehicle 10 closest to the centre of the turn.

The emphasised nature of the intent manoeuvre may result in non-satisfaction of a condition associated with comfort. The comfort condition may be a comfort performance index, for example. The emphasised nature of the intent manoeuvre may not correspond to the lowest cost or a local minimum of the comfort performance index. The comfort condition may be for reducing one or more components of acceleration and/or jerk that would be felt by the occupant, for instance. Without the intent manoeuvre, the required manoeuvre could be performed while satisfying the comfort performance index, using smooth torque/steering outputs. However, smooth performance of the required manoeuvre would fail to provide a clear early signal of intent to the other road user. Therefore, the intent manoeuvre sends a clear signal encouraging the other road user to yield, at the expense of loss of comfort.

The determination of the intent manoeuvre may be in any appropriate way. For example, the determination may comprise selecting one or more intent manoeuvres to be performed from a plurality of available intent manoeuvres. Each of the plurality of intent manoeuvres may be stored in the electronic memory device. In another example, the determination of the intent manoeuvre may comprise adding a constraint or modification to a path of the host vehicle 10 associated with the required manoeuvre. The constraint would require the vehicle to perform the emphasised signal by performing the intent manoeuvre. Determining the intent manoeuvre would comprise planning the path in the constrained manner.

The intent manoeuvre may at least not veer the host vehicle 10 off-course compared to the path of the required manoeuvre or slow the host vehicle 10 down when it should be speeding up, which would be confusing to the other road user. The intent manoeuvre may even replace at least part of the required manoeuvre. As a result, the intent manoeuvre may carry out, at least in part, some of the driving control involved in the required manoeuvre.

For example, the determination of the intent manoeuvre may be configured such that if the required manoeuvre is in a first lateral direction (e.g. left) the intent manoeuvre is not in a second lateral direction (e.g. right). Therefore, intent manoeuvres associated with the second direction may be non-selectable. The determination of the intent manoeuvre may even be configured such that the intent manoeuvre is in the first lateral direction or is direction neutral (straight line).

For example, the determination of the intent manoeuvre may be configured such that if the required manoeuvre comprises one of accelerating or braking the intent manoeuvre is not the other of accelerating or braking. Therefore, intent manoeuvres associated with the other of accelerating or braking may be non-selectable. The determination of the intent manoeuvre may even be configured such that the intent manoeuvre includes the required one of acceleration or braking or is neutral (no change of speed).

The intent manoeuvre may be scheduled for prior to commencement of the required manoeuvre. Alternatively, the intent manoeuvre and commencement of the required manoeuvre may be substantially concurrent. The intent manoeuvre may be scheduled for after completion of a preceding manoeuvre. The intent manoeuvre may be scheduled in dependence on detection of other road users not associated with the traffic conflict. For example, the intent manoeuvre may be delayed until one or more vehicles preceding the other road user have passed, so that it will be clear to the other road user that the intent manoeuvre is signalling them rather than another road user. The intent manoeuvre may be scheduled in dependence on a reduction of one or more possible paths of the host vehicle 10. If there are many possible paths for the host vehicle 10, it may be difficult for the other road user to associate the intent manoeuvre with a particular one of those paths. For example, if the host vehicle 10 is to drive past a junction and then reaches the traffic conflict area, the intent manoeuvre may be scheduled for after the host vehicle 10 has driven past the junction, which reduces the number of possible paths at the time the intent manoeuvre is performed.

At block 14010, the method comprises causing the host vehicle 10 to complete the intent manoeuvre and the required manoeuvre in dependence on a modified version of the one or more constraints. The modification may comprise at least replacing the first manoeuvring constraint with a second manoeuvring constraint. The second manoeuvring constraint may be a modified first manoeuvring constraint. The second manoeuvring constraint may relax one or more requirements associated with the first manoeuvring constraint.

If the second manoeuvring constraint is not satisfied, at least the required manoeuvre may be not started or aborted. The intent manoeuvre may be not started or aborted. If the second manoeuvring constraint is satisfied, the intent manoeuvre may be performed and then the required manoeuvre may be performed. The second manoeuvring constraint may be checked continuously or multiple times during performance of the manoeuvres.

The second manoeuvring constraint may relate to at least a second performance index (cost function). The second performance index may be a modified version of the first performance index. The second performance index may relax one or more requirements of the first performance index.

The difference between the first and second manoeuvring constraints may be such that the required manoeuvre can be carried out despite the detected traffic conflict. The relaxation may not be sufficient to override all possible abort scenarios in which the required manoeuvre will be aborted. Therefore, the host vehicle 10 will perform the required manoeuvre in an assertive but cautious manner.

An example of a relaxed requirement is relaxing the requirement for a threshold space size, such that the space availability signal is output for a smaller space in traffic. The smaller space could be smaller than the host vehicle 10, for example.

The relaxed threshold space size may be dependent on the speed of at least one of the other road users between which the space exists. If the other road user is stationary, the threshold space size may be smaller than if the other road user is moving. This is because if they are moving, they are better able to open up a gap.

The threshold space size may depend on acceleration. If the rear other road user behind the space is decelerating, and/or if the front other road user in front of the space is accelerating, the threshold space size may be smaller as a gap is opening up.

The threshold space size may depend on an angle of the host vehicle relative to the other road users. If the host vehicle is at an angle such that the host vehicle needs to turn into the space, the threshold space size may be smaller. This is because merging into the space while turning requires less longitudinal space than the whole length of the host vehicle 10. For instance, if the host vehicle 10 starts at a right angle, the threshold space size may be greater than the width of the host vehicle 10 but not as long as the length of the host vehicle 10.

The relaxed requirement may comprise relaxing a requirement not to force the other road user to change its speed in response to performing the required manoeuvre. The relaxed requirement may comprise relaxing a requirement not to force the other road user to change its course in response to performing the required manoeuvre. The requirements and relaxed requirements may be monitored using any appropriate path information and trajectory information associated with the other road user, determined from environment information.

In another use case of changing lanes, a faster road user behind the host vehicle 10 may be approaching in the target lane. The relaxed requirement may enable the host vehicle to perform the intent manoeuvre (signalling) followed by the required manoeuvre to change lanes in a way that would cause the faster road user to slow down. The required lane change manoeuvre may be performed subject to checking whether the faster road user has a space in a further lane, so that the faster road user can change lane to the further lane as the host vehicle 10 changes lanes into their current path. If it is determined from the sensing means that the faster road user does not have sufficient space (e.g. threshold space size) in the further lane, the intent manoeuvre and required manoeuvre may not be performed. If it does have sufficient space, the manoeuvres may be performed. Checking the abort condition may comprise checking whether the faster road user still has sufficient space and/or is changing lanes into the further lane, as the host vehicle 10 begins to perform the required manoeuvre.

Additionally or alternatively to relaxing a requirement, the second manoeuvring constraint may differ from the first manoeuvring constraint in that satisfaction of the second manoeuvring constraint may be determined in dependence on detection of a response signal from the other road user in response to the intent manoeuvre. An example of a response signal is a submission manoeuvre, which is an intent manoeuvre that signals an intent to yield to the host vehicle 10. Response signals may include visual or audible intent signals such as those described above.

However, visual or audible intent signals may not be as reliable. For example, if the other road user flashes their lights, they may be instructing the host vehicle 10 to yield or they may be signalling the host vehicle 10 to proceed. Their brake lights or headlamps may not be visible. Their turn signals may be accidentally left on from a prior manoeuvre.

Sometimes, other road users may perform a visual or audible intent signal together with a submission manoeuvre, which provides more certainty, so both may be taken into account. The host vehicle 10 may proceed or continue with the required manoeuvre if the response signal is detected. In some examples, no submission manoeuvre or response signal is needed.

The other road user may be monitored repeatedly or continuously to ensure the response signal is followed by action corresponding to yielding to the host vehicle 10, whether emphasised or not. The action may be to create a space for the host vehicle 10 or maintain a space for the host vehicle 10. In the situation when the space needs to be created, the method may determine whether the other road user performs a space creation manoeuvre. The space creation manoeuvre is when a road user manoeuvres out of a trajectory or position associated with the traffic conflict and into a trajectory or position that creates space for the host vehicle 10. The space may comprise a corridor or other area for the host vehicle 10 to perform its required manoeuvre. Determining whether the other road user performs a space creation manoeuvre may comprise determining whether the other road user enters a putative give way (yield) position. The putative give way position may be marked by a distinct road marking, such as a give way line. In some examples, the putative give way position may be any position that ensures a clear corridor for the host vehicle 10 to perform the required manoeuvre.

In an example, if the certainty associated with the conflict-creating path continues to rise after the submission manoeuvre, then the second manoeuvring constraint may not be satisfied and the required manoeuvre may be aborted. For instance, if the other road user does not perform the space creation manoeuvre, the required manoeuvre may be aborted.

The control system 200 may be configured to determine whether a manoeuvre of the other road user is a submission manoeuvre. The determination may be configured to recognise whether the manoeuvre is emphasised, for example by an appropriate algorithm derived from experimental data on how much emphasis makes a manoeuvre significant.

The determination whether the manoeuvre of the other road user is a submission manoeuvre may be configured to recognise whether the manoeuvre is a submission manoeuvre or an intent manoeuvre. For example, the manoeuvre may be an intent manoeuvre if it increases a certainty that the other road user will take the path associated with the traffic conflict. The manoeuvre may be a submission manoeuvre if it increases the certainty that the other road user will yield to the host vehicle 10 by creating or not entering the area (e.g. corridor) required for the host vehicle 10 to perform the required manoeuvre.

One or more of the above mentioned longitudinal dynamic characteristics and/or lateral dynamic characteristics may be detectable to assist in the determination of whether a manoeuvre of the other road user is a submission manoeuvre.

The submission manoeuvre may be determined if the submission manoeuvre is performed before the space creation manoeuvre, or is performed during the space creation manoeuvre, or in either case.

Following completion of the required manoeuvre, the method 14000 completes and normal operation resumes. For example, the first manoeuvring constraint may be used instead of the second manoeuvring constraint, until the next time the method 1400 proceeds through block 14006.

In at least some of the above examples, it is explained how a host vehicle 10 may be capable of determining and performing an intent manoeuvre and how a host vehicle 10 may be capable of detecting an intent manoeuvre. It is explained how a host vehicle 10 may be capable of detecting a submission manoeuvre. With the above understanding of how a submission manoeuvre differs from an intent manoeuvre, it would be readily appreciated how a host vehicle 10 may be capable of determining and performing a submission manoeuvre. Therefore, with reference to FIG. 28, there may be provided a method 14500 for the host vehicle 10 operable in the autonomous mode (and, in some examples, operable in the non-autonomous mode), the method comprising: receiving 14502 environment information indicative of the environment in the vicinity of the host vehicle 10; identifying 14504 an intent manoeuvre indicative of an intention of another road user to perform a manoeuvre; determining 14506, in dependence on the received environment information and identified intent manoeuvre, a requirement for the host vehicle 10 to modify control of the host vehicle 10 to allow the another road user sufficient space to perform the manoeuvre; determining 14508 a submission manoeuvre to signal to the another road user that the host vehicle 10 is allowing the another road user sufficient space to perform the manoeuvre; modifying 14510 the control to allow the sufficient space; and causing 14512 the host vehicle 10 to perform the submission manoeuvre.

The control system 200 of the host vehicle 10 may be configured for one or both of the methods 14000, 14500. The methods 14000, 14500 are analogous in the transmitter-receiver sense.

'Sufficient space' as described for the method 14500 does not necessarily imply that the host vehicle 10 is aware of a first manoeuvring constraint or a second manoeuvring constraint of another road user, or exactly what manoeuvre is intended to be performed by the other road user. Sufficient space may be defined as an area or corridor that is large enough for the yield to be successful, i.e. the other road user can continue along a probable or possible path. A space may be sufficient at least when a collision is not inevitable. The host vehicle 10 may be configured to provide more than the minimum sufficient space to reduce a required precision of a manoeuvre of the other road user. The sufficient space could be lateral (e.g. road narrowing) and/or longitudinal (e.g. joining traffic queue).

For purposes of this disclosure, it is to be understood that the controller(s) 202 described herein can each comprise a control unit or computational device having one or more electronic processors 204. A vehicle and/or a system thereof may comprise a single control unit or electronic controller or alternatively different functions of the controller(s) may be embodied in, or hosted in, different control units or controllers. A set of instructions 208 could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium 210 (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The term 'if' is used herein in relation to the concept of conditional performance of a function 'if' a condition is satisfied. The term 'if' in this context means that the function is capable of being performed if the condition is satisfied and is not capable of being performed if the condition is not satisfied. Additional conditions (not stated) may also need to be satisfied before the function is performed. Therefore, although it may be that the stated condition is the only condition for performing some functions, the 'if' terminology herein does not limit to such scenarios. 'Separation', 'distance' and 'position' as disclosed herein are not intended to be limited to absolute values of distance. The terms can be normalised by speed. For instance, a separation or distance may be two seconds (at 10 metres per second).

The blocks illustrated in the Figures may represent steps in a method and/or sections of code in the computer program 208. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For the absence of doubt, the autonomous mode may be operable in non-highway roads.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a host vehicle operable in an autonomous mode, the control system comprising one or more controllers, the control system configured to:
    determine a bifurcation of a first lane into a plurality of lanes;
    select a target lane from the plurality of lanes;
    determine a lateral distance from a lane position within the first lane to a lane position within the target lane of the plurality of lanes, wherein the lateral distance is from a first target lane position between lateral edges of the first lane to a second target lane position between lateral edges of the target lane of the plurality of lanes;
    determine a longitudinal distance to a start of the target lane of the plurality of lanes; and
    cause control of a speed and/or a direction of the host vehicle as the host vehicle approaches the bifurcation, in dependence on the determined bifurcation, wherein the control is dependent on the longitudinal distance and the lateral distance.

2. The control system of claim 1, wherein the one or more controllers collectively comprise:
    at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the host vehicle to perform the determining and the causing the control.

3. The control system of claim 1, wherein the start of the target lane of the plurality of lanes is associated with a start location of a road marking denoting a lateral edge of the target lane of the plurality of lanes.

4. The control system of claim 1, wherein the control causes the host vehicle to follow a curve-shaped planned path, wherein a first end of the curve is colinear with a lane position within the first lane and a second end of the curve is colinear with a lane position within one of the plurality of lanes.

5. The control system of claim 1, configured to plan a path to enter the target lane, wherein the target lane is selected in dependence on at least one of:
  a requirement to select a nearside available lane;
  a constraint associated with a derivative of lateral displacement of the host vehicle with respect to longitudinal displacement of the host vehicle or time; or
  a navigation constraint.

6. The control system of claim 1, wherein the control of the direction comprises causing a steering subsystem of the host vehicle to control steering of the host vehicle to follow a planned path of the host vehicle determined in dependence on the processing.

7. A method for controlling a host vehicle operable in an autonomous mode, the method comprising:
  determining a bifurcation of a first lane into a plurality of lanes;
  selecting a target lane from the plurality of lanes;
  determining a lateral distance from a lane position within the first lane to a lane position within a target lane of the plurality of lanes, wherein the lateral distance is from a first target lane position between lateral edges of the first lane to a second target lane position between lateral edges of the target lane of the plurality of lanes;
  determining a longitudinal distance to a start of target lane of the plurality of lanes; and
  causing control of a speed and/or a direction of the host vehicle as the host vehicle approaches the bifurcation, in dependence on the processing, wherein the control is dependent on the longitudinal distance and the lateral distance.

8. A vehicle comprising the control system of claim 1.

9. A control system for a host vehicle operable in an autonomous mode, the control system comprising one or more controllers, the control system comprising computer software that, when executed by the one or more controllers, causes the host vehicle to perform the method of claim 7.

10. A non-transitory, computer-readable storage medium storing instructions thereon that, when executed by one or more electronic processors, causes the one or more electronic processors to carry out the method of claim 7.

11. A method for controlling a host vehicle operable in an autonomous mode, the method comprising:
  determining a bifurcation of a first lane into a first bifurcated lane and a second bifurcated lane;
  selecting a target one of the first bifurcated lane and the second bifurcated lane;
  determining a lateral distance from a lane position within the first lane to a lane position within the target one of the first bifurcated lane and the second bifurcated lane, wherein the lateral distance is from a first target lane position between lateral edges of the first lane to a second target lane position between lateral edges of the target one of the first bifurcated lane and the second bifurcated lane;
  determining a longitudinal distance to a start of the target one of the first bifurcated lane and the second bifurcated lane; and
  causing control of a speed and/or a direction of the host vehicle as the host vehicle approaches the bifurcation, in dependence on the processing, wherein the control is dependent on the longitudinal distance and the lateral distance.

12. The method of claim 11, wherein the bifurcation of the first lane into the first bifurcated lane and the second bifurcated lane is determined prior to the selecting of the target one of the first bifurcated lane and the second bifurcated lane.

13. The method of claim 12, wherein either the first bifurcated lane or the second bifurcated lane is selected as the target one after the first bifurcated lane and the second bifurcated lane are determined.

14. The method of claim 13, wherein the method includes:
  in response to determining the first bifurcated lane and the second bifurcated lane, selecting the target one as a selected target lane, wherein the selected bifurcated lane is the target one of either the first bifurcated lane or the second bifurcated lane; and, in response to selecting the selected bifurcated lane as either the first bifurcated lane or the second bifurcated lane, determining the lateral distance from the lane position within the first lane to the lane position within the selected target lane.

15. The method of claim 11, wherein each of the lateral distance and the longitudinal distance is determined in response to selecting the target one of the first bifurcated lane and the second bifurcated lane.

16. The control system of claim 1, wherein the bifurcation is determined based on lane boundaries or other lane or geometric road information contained in predetermined geometric map data.

17. The control system of claim 1, wherein the lateral distance is determined from predetermined geometric map data concerning a road having the first target lane and the second target lane.

18. The control system of claim 1, wherein the longitudinal distance is determined from predetermined geometric map data concerning a road having the first target lane and the second target lane.

19. The control system of claim 1, wherein the lateral distance is determined by:
  determining a first lateral separation parameter based on the first lateral lane position and a reference point;
  determining a second lateral separation parameter based on the second lateral lane position and the reference point; and
  determining the lateral distance based on the first lateral separation parameter and the second lateral separation parameter.

20. The method of claim 11, wherein the causing control of the speed and/or the direction of the host vehicle includes performing an action to control the speed and/or direction of the host vehicle.

* * * * *